(12) United States Patent
Shirai et al.

(10) Patent No.: US 6,434,025 B2
(45) Date of Patent: *Aug. 13, 2002

(54) POWER SUPPLY UNIT

(75) Inventors: Toshihito Shirai; Masayoshi Sakai; Koichi Futsuhara, all of Urawa; Takayuki Yuasa, Utsunomiya, all of (JP)

(73) Assignee: The Nippon Signal Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/414,836

(22) Filed: Oct. 8, 1999

(30) Foreign Application Priority Data

Jul. 27, 1999 (JP) .............................. 11-212553

(51) Int. Cl.[7] .............................. H02M 3/335
(52) U.S. Cl. ...................... 363/21.1; 363/49
(58) Field of Search .................. 363/21, 49, 95, 363/131, 97, 21.11, 21.1, 21.08

(56) References Cited

U.S. PATENT DOCUMENTS

| 4,661,880 A | | 4/1987 | Futsuhara | |
|---|---|---|---|---|
| 4,975,823 A | * | 12/1990 | Rilly et al. | 363/49 |
| 5,027,114 A | | 6/1991 | Kawashima et al. | |
| RE34,462 E | * | 11/1993 | Whittle | 363/21 |
| 5,345,138 A | | 9/1994 | Mukaidono et al. | |
| 5,377,091 A | * | 12/1994 | Faulk | 363/97 |
| 5,956,240 A | * | 9/1999 | Williams | 363/21 |
| 5,995,384 A | * | 11/1999 | Majid et al. | 323/902 |
| 6,295,217 B1 | * | 9/2001 | Yang et al. | 363/49 |

FOREIGN PATENT DOCUMENTS

| JP | 1-23006 | 4/1989 |
|---|---|---|
| JP | 4-248317 | 9/1992 |
| JP | 07095724 | 4/1995 |
| JP | 9-152356 | 6/1997 |
| JP | 9-162714 | 6/1997 |
| JP | 10-336879 | 12/1998 |
| WO | WO 94/23303 | 10/1994 |
| WO | WO 94/23496 | 10/1994 |

OTHER PUBLICATIONS

"A Construction Method for an Interlock System Using a Fail–Safe Logic Element Having Window Characteristics", by Futsuhara, et al., T.IEE Japan, vol. 109, No. 9, Sep. 1989, pp. 676–683 (with English translation).

"Application of Window Comparator to Majority Operation", by Futsuhara, et al., Proc. of 19th International Symp. on Multiple–Valued Logic, IEEE, 1989, pp. 114–121. no month.

* cited by examiner

*Primary Examiner*—Shawn Riley
(74) *Attorney, Agent, or Firm*—McDermott, Will & Emery

(57) ABSTRACT

The invention relates to a power supply unit which can fail-safely monitor not only for an excessive power supply output but also for an abnormal drop in output level. At the time of start-up, with the start signal from a start circuit, an AC signal is supplied to a primary side of a transformer and based on an AC output from a secondary side of the transformer, an output for supplying to an external load is generated and this output is monitored with a monitoring circuit. If the output level is within a set upper and lower limit threshold value range the output is judged to be normal and a high level normal verification signal is generated from the monitoring circuit, and with the high level normal verification signal, an AC signal is supplied to the primary side of the transformer, and the output supply to the external load is continued.

44 Claims, 23 Drawing Sheets

POWER SUPPLY UNIT

BACKGROUND OF THE INVENTION

1. Field of the Invention

The present invention relates to a power supply unit provided with an output monitoring function. In particular the invention relates to a power supply unit with a fail-safe construction which can stably supply an output of a level within a predetermined range while monitoring the output, and which can stop the output at the time of an abnormality.

2. Description of the Related Art

Heretofore, as a direct current power supply unit, a switching power supply unit is commonly used, since this has the advantage of high efficiency, small size, light weight and so on.

This switching power supply unit will be simply described.

With this unit, an input commercial AC (alternating current) power supply is converted to DC (direct current) in a smoothing circuit comprising a rectifying circuit and a smoothing capacitor, and then supplied to a primary side of a high frequency transformer. The DC supplied to the primary side is converted to AC by ON/OFF switching of a switching element, transmitted to a secondary side of the transformer, converted to a DC output by the smoothing circuit and then supplied to a load. Moreover, this DC output is fed back to a switching control circuit for controlling the switching element. The switching control circuit incorporates an error sampling circuit, an oscillation circuit, and a pulse width modulation circuit, and detects an error between the fed back DC output and a previously set target value for the output with the error sampling circuit, carries out pulse width modulation (PWM) on a signal of the oscillation circuit with the pulse width modulation circuit in accordance with the detected error and controls the duty ratio of a PWM signal, and controls the ON/OFF period of the switching element, to thereby stabilize the target DC output and supply this to the load.

In the case of a switching power supply unit fitted with such an output monitoring function, if for example a fault occurs such that the DC output is not fed back to the switching control circuit, the switching control circuit judges the input to be zero and thus increases the output. Moreover, if a disconnection fault occurs in the primary side smoothing capacitor, the primary side voltage of the transformer periodically becomes a low level and this is reflected in the secondary side output. Furthermore, if an abnormality occurs in the secondary side smoothing capacitor, an increase of a high frequency ripple may occur.

However, with equipment demanding high safety, for example equipment used in the railway technology field, or for press machines or the like, then an erroneous operation attributed to an abnormality in the output from the power supply unit is extremely dangerous. Consequently, with power supply units it is necessary to be able to realize in a fail-safe manner, a characteristic that at the time of an output abnormality, operation is to the safe side (for example the output is stopped).

From this perspective, heretofore a technique for detecting an output abnormality to stop the power supply output of a switching power supply unit has been proposed for example in Japanese Unexamined Patent Publication Nos. 4-248317 and 10-336879.

In Japanese Unexamined Patent Publication No. 4-248317, there is shown a construction where a plurality of windings are provided in a high frequency transformer, and an output from a winding separate from a feedback control monitoring winding is monitored with an abnormality monitoring circuit, and the PWM signal is stopped based on the results of this monitoring, to thus stop the ON/OFF operation of the switching element so that the power supply output is stopped. Moreover, in Japanese Unexamined Patent Publication No. 10-336879, there is shown a construction where when the output voltage exceeds a previously set upper limit value, the output monitoring circuit outputs an abnormality signal to stop the ON/OFF operation of the switching element, and thus stop the power supply output.

However, these abnormality monitoring techniques, both only monitor for an overvoltage as output abnormality, and output abnormality on the low voltage side where the output level drops is not considered. With the conventional abnormality monitoring techniques, even if the output level drops with a circuit abnormality, this is not considered as an output abnormality, and the output is controlled to increase.

In order to detect a drop in output level as output abnormality, it is necessary to consider a time of power supply start-up. That is to say, since the output is zero at the time of power supply start-up and hence the abnormality monitoring circuit judges output abnormality and stops the switching operation of the primary side of the transformer, it is necessary to cancel the abnormality judgment in order to carry out the switching operation. However, a construction where at the time of power supply start-up, the power supply output is produced regardless of the monitoring result from the monitoring circuit, is not shown in the disclosures of Japanese Unexamined Patent Publication Nos. 4-248317 and 10-336879.

As an output error monitoring technique for a switching power supply unit, a technique which monitors not only for an overvoltage of the output but also for a drop in the output level, and stops the power supply output of the switching power supply unit at the time of output abnormality is proposed in Japanese Unexamined Patent Publication No. 7-95724.

With this technique, a pre-rectification intermediate output and a post rectification final output in the secondary side of the transformer are both monitored and when the two outputs are both abnormal overvoltages or are both abnormal low voltages, an abnormality detection signal indicating abnormality is output to an alarm monitoring circuit. The alarm monitoring circuit is constructed to, on input of the beforementioned abnormality detection signal, output a signal for stopping operation to the PWM control circuit to thereby stop the operation of the switching power supply unit.

However, in the case of Japanese Unexamined Patent Publication No. 7-95724, there is no disclosure of a specific construction for how the power supply output is started at the time of power supply start-up with the transformer secondary side output zero. With the construction of an embodiment circuit shown in FIG. 2 of this publication, it can be supposed that an abnormality detection output is generated from the low voltage monitoring circuit at the time of power supply start-up, and hence the PWM control circuit is not operated due to the output from the alarm monitoring circuit, and the switching power supply unit can not be started. Furthermore, even if assumed that start-up of the power supply unit is possible, with the circuit construction of FIG. 2, a signal indicating abnormality is considered to be generated at a high level condition. In this case, if the transmission path for the abnormality detection signal is disconnected, the output abnormality cannot be notified, so that there is a danger that the power supply output cannot be stopped.

Also with an AC power supply, as with the DC power supply, there is a requirement for realizing in a fail-safe manner a characteristic where output abnormality is detected and operation is to the safe side (for example the output is stopped). However, heretofore such a technique for an AC power supply has not been set forth.

For example, with a sensor which receives an AC signal from an AC power supply and outputs an AC signal of a level corresponding to a sensing result of an object, in order for the sensor to have fail-safe characteristics, it is necessary for a level meaning safety to be higher than a level meaning danger. This will be clear if a fault involving a disconnection in the signal transmission circuit is considered. Moreover, in the case where the output level of the sensor is dependant on the input AC signal level and/or frequency, then in spite of a danger condition due to an error in the level and/or frequency of the AC power supply output for supply to the sensor, a safe condition may be erroneously indicated.

This problem will be explained taking the example of a temperature sensor with a transformer construction which uses for example a temperature sensitive magnetic material core.

A temperature sensitive magnetic material is a ferromagnetic material which is the same as a normal magnetic material at a previously determined set temperature (Curie temperature) or below, but with a rise in temperature, the saturation magnetic flux density thereof drops, and it becomes a paramagnetic material when exceeding the set temperature. With the detection temperature (core temperature) of the temperature sensor (transformer) equal to or less than the set temperature, the primary winding and the secondary winding of the temperature sensor are magnetically closely coupled by the core, and hence the AC signal from the AC power supply is transmitted to the secondary side. On the other hand, if the temperature exceeds the set temperature, the core becomes a paramagnetic material so that the primary winding and the secondary winding become substantially approximately air-core coupled and hence the AC signal level of the secondary winding drops significantly. The output from the temperature sensor (secondary side output of the transformer) is converted to DC by a rectifying circuit and then subjected to a threshold value operation with a level detection circuit, and when the operated value is equal to or above a predetermined level, an output of logic value=1 corresponding to a high energy condition indicating safety is generated. By means of such a temperature sensor, it is possible to notify a condition, with equal to or less than a predetermined temperature as a safe condition and more than the predetermined temperature as a danger condition.

However, even if the detection temperature (core temperature) of the temperature sensor exceeds the set temperature, the primary winding and the secondary winding are magnetically coupled though approximately air core coupled. Consequently, if the output level of the AC power supply increases or the frequency increases, the secondary side output level increases. If the secondary side output exceeds the threshold value, then in spite of the danger condition with the detection temperature exceeding the predetermined value, the output from the level detection circuit is logic value=1, that is, indicating safety.

Accordingly, in order to avoid the erroneous operation in such a sensor, there is provided a fail-safe AC power supply which can stably generate an AC output having a level within a predetermined range and which can stop the output at the time of an output abnormality is desired.

SUMMARY OF THE INVENTION

The present invention addresses the abovementioned situation with the object of providing a fail-safe power supply unit which can monitor an output level within an upper and lower limit threshold value range, and supply a power supply output only when an output is normal.

Accordingly, there is provided a power supply unit of the present invention, which switches a DC signal to produce an AC signal, and supplies to the outside an AC or DC power supply output based on the produced AC signal, comprising a monitoring circuit for monitoring as to whether or not the power supply output is within a previously set upper and lower limit threshold value range, and generating a normal verification signal of a high energy level indicating a normal condition when the power supply output is within the threshold value range, wherein the power supply output can be supplied to the outside when the normal verification signal is generated from the monitoring circuit.

With such a construction, the monitoring circuit can monitor as to whether or not the power supply output is within the upper and lower limit threshold value range, and can also monitor for a drop in the power supply output level. In particular, by generating the normal verification signal as a high energy level signal, a fail-safe construction can be realized.

In this case, if the construction is such that after an abnormality is detected and the normal verification signal is temporarily stopped, a normal verification signal is not generated from the monitoring circuit even if the abnormality is cancelled, then in the case where the normal verification signal is temporarily stopped with the occurrence of an abnormality at the time of power supply, then the supply of the power supply cannot be resumed unless for example a trigger is applied from the outside. Hence danger to an operator or the like, with the load being arbitrarily started with cancellation of the abnormality can be prevented.

With the present invention, there is provided a start circuit for generating a start signal for power supply output start-up. By means of this, power supply output can be started regardless of the output conditions of the monitoring circuit. In this case, a start signal may be generated for a predetermined time from a power supply start-up time, or a start signal may be generated for a predetermined time on input of a generation command signal from the outside after power supply start-up. Furthermore the construction may be such that when a normal verification signal is generated from the monitoring circuit, supply of the start signal is stopped.

With the present invention, the construction is such that there is provided a limited output generating circuit for generating at the time of power supply start-up, an output which is limited to a level within the upper and lower limit threshold value range, and the generated limited output is input to the monitoring circuit, and the normal verification signal is generated from the monitoring circuit.

With such a construction, since the power supply output generated from the limited output generating circuit at the time of power supply start-up is limited to a level within the upper and lower limit threshold value range, supply to the outside of an abnormal output at the time of power supply output start-up can be prevented.

With the present invention, the construction is such that a switch device is provided in an output supply path for supplying the power supply output to the outside, and the switch device is switched on by a normal verification signal from the monitoring circuit, to conduct an output supply path.

With such a construction, at the time of power supply start-up, the switch device is off so that the power supply output is not supplied to the outside. When the power supply output rises in the normal range, the switch device is switched on by the normal verification signal of the monitoring circuit so that the power supply output is supplied to the outside from the output supply path. Consequently, even if a start circuit is not provided, monitoring of the power supply output within the upper and lower limit threshold value range is possible. In this case, the switch device is constructed with a first switch and second switch connected in series, and if the construction is such that the first switch is switched on after the second switch is switched on, and is switched off prior to the second switch, then the fail-safe characteristic is improved by the double system construction for the switch device. Furthermore, this construction is advantageous in the case that relay contact points where fusion faults must be considered are used for this switch device.

The construction is such that the monitoring circuit is able to generate a normal verification signal under the condition that the first switch is off and the second switch is off.

With the power supply unit of the present invention provided with a first switching element for passing/interrupting the DC signal for input to a primary side of a transformer, and a switching control circuit for generating a control signal for ON/OFF switching of the first switching element, which generates a DC power supply output based on an AC output generated in a secondary side of the transformer with ON/OFF operation of the first switching element and supplies this to the outside, and at the same time inputs the power supply output to the switching control circuit and compares this with a target level set within the upper and lower limit threshold value range, and controls the control signal so that the power supply output level approaches the target level, to stabilize the power supply output, there is provided a start circuit for generating a start signal for starting power supply output, and when at least one of the start signal and the normal verification signal is being generated, the control signal of the switching control circuit is supplied to the first switching element. More specifically, the construction may be such that there is provided a logical sum device for generating a logical sum output for the normal verification signal and the start signal, and an output from the logical sum device is made a drive power supply of the switching control circuit. Furthermore, the construction may be such that a signal transmission device is disposed in a control signal supply path for supplying a control signal of the switching control circuit to the first switching element, for closing the control signal supply path when at least one signal of the start signal and the normal verification signal is generated, and transmitting the control signal to the first switching element.

With such a construction, in the DC switching power supply unit the start signal is generated to supply a control signal to the switching element to thereby start the power supply output, and if the power supply output is within a normal range after start-up, the power supply output can be maintained by the normal verification signal of the monitoring circuit.

With the present invention, the construction may be such that there is provided a limited output generating circuit for generating, when a start signal is generated from the start circuit, an output which is limited to a level within the upper and lower limit threshold value range, and the generated limited output is input to the monitoring circuit, and the normal verification signal is generated from the monitoring circuit.

With such a construction, since the power supply output generated from the limited output generating circuit based on the start signal is limited to the level within the upper and lower limit threshold value range, the supply of an abnormal output to the outside at the time of power supply output start-up by the start signal can be prevented. In this case, if the construction is such that the limited output of the limited output generating circuit is input to the monitoring circuit via the transformer, then a smoothing fault in the secondary side of the transformer can also be monitored. Moreover if the construction is such that a series circuit of a second switching element and an output limiting impedance element is connected in parallel with the first switching element which is series connected to the primary winding of the transformer, and there is provided a first and a second signal supply paths for respectively supplying the control signal of the switching control circuit to the first and second switching elements, and when the start signal is generated the second signal supply path is conducted to supply a control signal to the second switching element and a limited output is produced in the secondary side of the transformer, and when based on this limited output, the normal verification signal is generated from the monitoring circuit, the first signal supply path is conducted to supply a control signal to the first switching element, then even if the power consumption of the monitoring circuit fluctuates, the output can be stabilized, and also at the time of power supply output start-up, the performance of the switching control circuit can be checked.

With the present invention, the construction is such that a switch device is disposed in an output supply path for supplying the power supply output to the outside, and when a normal verification signal is generated from the monitoring circuit the output supply path is conducted by the switch device.

With such a construction, once the power supply output is within the normal range, the switch device is switched on so that the power supply output in the normal range is supplied to the outside. In this case, if there is a dual system with the switch device constructed with a plurality of switches connected in series, then the fail-safety characteristic is improved. Furthermore, if the construction is such that of the plurality of switches, one switch comes ON before the other switch and goes OFF after the other switch, then the one switch will not directly conduct/interrupt a current. Consequently, this construction is advantageous in the case that relay contact points where fusion faults must be considered are used for the switch.

With the present invention, the construction is such that there is provided a switch off verification circuit for detecting an OFF condition of the switch device and outputting an OFF verification signal, and the monitoring circuit is able to generate a normal verification signal on the condition that the OFF verification signal is being generated.

With such a construction, since a power supply output is generated after the OFF condition of the switch device is verified, then an ON fault of the switch device can be checked.

The monitoring circuit incorporates; a level verification device for verifying that a voltage level of the power supply output is within the upper and lower limit threshold value range, a ripple verification device for verifying that a ripple level of the power supply output is equal to or less than a predetermined level, a logical product device into which is input the outputs from the two verification devices, and an off-delay device for generating an output after a predetermined off-delay time lapse from input of the output from the logical product device, and the output from the off-delay device is made the normal verification signal.

With such a construction, when the voltage level and the ripple level of the power supply output are normal, a normal verification signal is generated and the power supply output is supplied. Then, even if a momentary load change occurs in the power supply output, if this load change is within the off-delay period of the off-delay device, the normal verification output from the off-delay device continues, and this is not regarded as an output abnormality.

The monitoring circuit incorporates; a level verification device for verifying that the voltage level of the power supply output is within the upper and lower limit threshold value range, a ripple verification device for verifying that a ripple level of the power supply output is equal to or less than a predetermined level, a logical product device into which is input the outputs from the two verification devices, an off-delay device for generating an output after a predetermined off-delay time lapse from input of the output from the logical product device, and an on-delay device which takes the output from the off-delay device and generates an output and stops the output after a predetermined on-delay time lapse from the output generation, and the one switch is driven based on the output from the off-delay device, and the output from the on-delay device is made the normal verification signal.

A monitoring circuit of this construction where the switch device is made up of a plurality of series connected switches, is an effective specific circuit in the case where one switch comes on before the other switches and goes off after the other switches.

The monitoring circuit incorporates; a level verification device for verifying that the voltage level of the power supply output is within the upper and lower limit threshold value range, a ripple verification device for verifying that a ripple level of the power supply output is equal to or less than a predetermined level, a logical product device into which is input the outputs from the two verification devices, an off-delay device for generating an output after a predetermined off-delay time lapse from input of the output from the logical product device, a self hold device with an output from the off-delay device input to a hold input terminal, and the off verification signal of the switch off verification circuit input to a trigger input terminal, which self holds a trigger input by its own output, and an on-delay device which takes the output from the off-delay device and generates an output and stops the output after a predetermined on-delay time lapse from the output generation, and the switch device is driven based on the output from the self hold device, and the output from the on-delay device is made the normal verification signal.

With such a construction, in the case where the OFF condition of the switch device is detected by the switch off verification circuit, and the construction is such that the monitoring circuit is able to generate a normal verification signal with the off verification of the switch device as a condition, an effective specific circuit is given. In this case, if the construction is such that a contact point which can be operated from the outside is disposed in an off verification signal supply path for connecting to the trigger input terminal of the self hold device, then after an output abnormality once occurs and the output supply is stopped, an output cannot be generated unless the contact point is again operated to ON from the outside.

The start circuit may be such as to generate a start signal for a predetermined time from the time of power supply start-up. Moreover, if the construction is such that when the normal verification signal is generated the supply of the start signal is stopped, the supply of an abnormal output to the outside based on the start signal can be prevented.

With a power supply unit of the present invention provided with a first switching element for passing/interrupting the DC signal for input to a primary side of a transformer, and a switching control circuit for generating a control signal for ON/OFF switching of the first switching element, which generates a DC power supply output based on an AC output generated in a secondary side of the transformer with ON/OFF operation of the first switching element and supplies this to the outside, and at the same time inputs the power supply output to the switching control circuit and compares this with a target level set within the upper and lower limit threshold value range, and controls the control signal so that the power supply output level approaches the target level, to stabilize the power supply output, there is provided a switch device in an output supply path for supplying the power supply output to the outside, and the switch device is driven by the normal verification signal of the monitoring circuit to thereby conduct the output supply path.

With such a construction, in the DC switching power supply unit, at the time of power supply start-up, the switch device is switched off so that the power supply output is not supplied to the outside. When the power supply output rises in the normal range, the switch device is switched on by the normal verification signal of the monitoring circuit so that the power supply output is supplied from the output supply path to the outside. Consequently, monitoring of the power supply output within the upper and lower limit threshold value range is possible, even if a start circuit is not provided.

The switch device is constructed with a first switch and second switch connected in series, and if the construction is such that the first switch is switched on after the second switch is switched on and switched off prior to the second switch, then the fail-safe characteristic is improved by the double system construction for the switch device. Furthermore, this construction is advantageous in the case that relay contact points where fusion faults must be considered are used for the switch.

With present invention, with an AC power supply unit incorporating an oscillator for generating an oscillating signal with input of the DC signal, and an output circuit having a switch circuit which is switchingly operated with the oscillation signal from the oscillator to generate an AC power supply output, the construction is such that supply of AC power supply output to the outside is made possible when a normal verification signal is being generated from the monitoring circuit. More specifically, the construction is such that when the normal verification signal is being generated, an oscillating signal from the oscillator is transmitted to the switch circuit. In this case, if the construction is such that a band-pass filter with a previously set predetermined frequency for the oscillator signal as a central frequency, is disposed in a signal supply path for supplying the oscillating signal from the oscillator to the switch circuit, then the verification of the power supply output frequency with the monitoring circuit can be omitted.

Furthermore, the construction may be such that the switching operation of the switching circuit is made possible when the normal verification signal is being generated.

Moreover, the construction may be such that a switch device is disposed in an output supply path for supplying the power supply output to the outside, and the switch device is driven by the generation of a normal verification signal from the monitoring circuit to conduct the output supply path and supply the power supply output to the outside. In this case, if the construction is such that the switch device has two switches connected in series, this construction gives a dual system with an improvement in fail-safe characteristic. Moreover, in the case where a relay contact point is used, the construction may be such that of the two switches, one switch comes on before the other switch and goes off after the other switch. Furthermore, the construction may be such that there is provided a switch off verification circuit for detecting an OFF condition of the switch device and outputting an off verification signal, and the monitoring circuit is able to generate a normal verification signal on the condition that the off verification signal is being generated.

The monitoring circuit incorporates; a level verification device for verifying that a voltage level of the power supply output is within the upper and lower limit threshold value range, a frequency verification device for verifying that the power supply output frequency is within a predetermined frequency range based on the pulse width of the power supply output, and a logical product device into which is input the output of the two verification devices, and the output from the logical product device is made the normal verification signal.

With such a construction, the monitoring circuit monitors the voltage level and frequency of the power supply output and when both are normal, a normal verification signal is generated from the logical product device.

The construction may be such that the frequency verification device detects the pulse width of the power supply output to verify the power supply output frequency. Moreover, the construction may be such that the frequency verification device filters the power supply output with a band-pass filter and detects that the output level of the band-pass filter is equal to or above a predetermined value to verify the power supply output frequency.

The monitoring circuit incorporates; a level verification device for verifying that a voltage level of the power supply output is within the upper and lower limit threshold value range, a frequency verification device for verifying that the power supply output frequency is within a predetermined frequency range based on the pulse width of the power supply output, a logical product device into which is input the output of the two verification devices, and a self hold device with an output from the logical product device input to a hold input terminal, and the off verification signal from the switch off verification circuit input to a trigger input terminal, which self holds a trigger input by its own output, and the switch device is driven based on the output from the self hold device.

With such a construction, when the switch device is in the OFF condition, a normal verification signal is generated so that the power supply output can be supplied, and an ON fault of the switch device can be checked. In this case, the construction may be such that a contact point which is operable from the outside is disposed in an off verification signal supply path for connecting to the trigger input terminal of the self hold device.

The monitoring circuit generates a normal verification signal on the proviso that one switch is off, and there is provided a switch drive device for intermittently switching the other switch off based on the normal verification signal, and a switch performance verification device for detecting ON/OFF operation of the other switch and generating a hold signal so that the normal verification signal continues and inputting this to the monitoring circuit, and the one switch is driven ON by the normal verification signal of the monitoring circuit.

With such a construction, the power supply output supply is carried out while verifying that the other switch is switching ON/OFF, and if this ON/OFF operation stops, the power supply output supply is stopped. Consequently, a fault of the switching device during power supply output supply can be checked.

DESCRIPTION OF THE PREFERRED EMBODIMENTS

As follows is a description of embodiments of a power supply unit according to the present invention applied to a DC power supply unit and an AC power supply unit, based on the appended drawings.

At first is a description of embodiments of a DC power supply unit.

Figure 1:
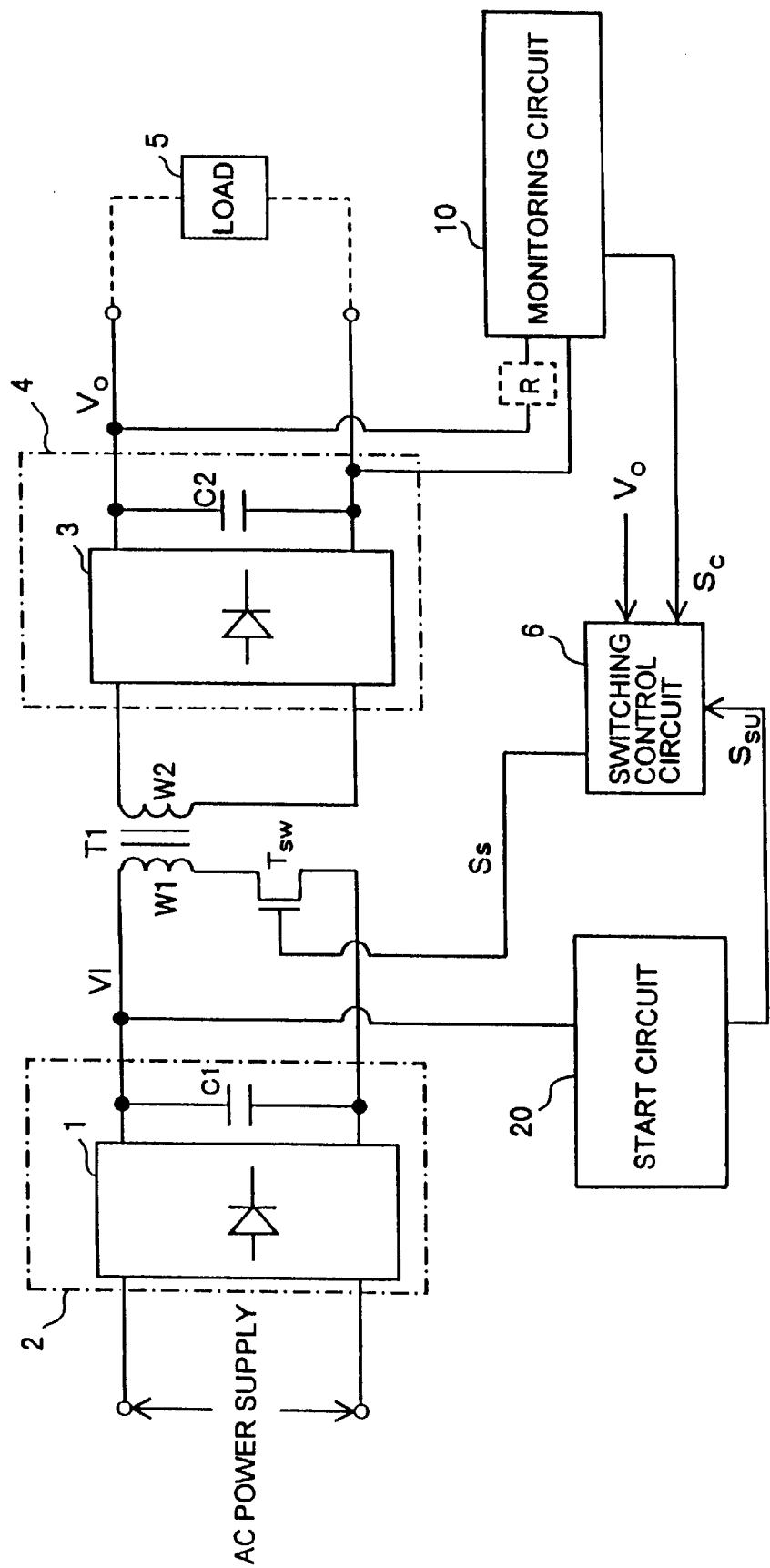
FIG. 1 is a schematic diagram of a first embodiment of a power supply unit according to the present invention applied to a DC switching power supply unit.

FIG. 1 is a schematic diagram showing a first embodiment of a DC switching power supply unit.

In FIG. 1, with a switching power supply unit of this embodiment, an alternating current of a commercial alternating current (AC) power supply is converted to a DC output VI with a smoothing circuit 2 comprising a rectifying circuit 1 and a smoothing capacitor C1, and then supplied to a primary winding W1 of a high frequency transformer T1. A switching element Tsw such as a MOSFET is connected in series with the primary winding W1 of the transformer T1, and a DC current due to the DC output VI is converted to an alternating current by the ON/OFF operation of the switching element Tsw, and transmitted to a secondary winding W2 side of the transformer T1. An AC output generated in the secondary side of the transformer T1 is converted to a DC output Vo by means of a smoothing circuit 4 comprising a rectifying circuit 3 and a smoothing capacitor C2, and supplied from an output supply path to an external load 5. The DC output Vo is also input to a monitoring circuit 10 which monitors for normality/abnormality of the voltage level.

The monitoring circuit 10, when the output Vo is normal, generates a high energy level monitoring output Sc=1 (here a logic value 1 (high level) corresponding to a high energy condition is indicated, and similarly hereunder), and when the output Vo is abnormal and at the time of a device failure, the monitoring output becomes Sc=0 (here a logic value 0 (low level) corresponding to a low energy condition is indicated, and similarly hereunder). The monitoring output Sc, being a normal verification signal, is input to a switching control circuit 6 (hereunder referred to as an SC circuit 6).

Here a high energy level signal has the meaning of a signal other than ground (earth) level. The potential on the positive (+) side as well as the potential on the negative (−) side, with respect to the ground level, is a high energy level signal.

A start circuit 20 is provided to start the output of the power supply unit at the time of power supply unit start-up, regardless of the output condition of the monitoring output Sc. The DC output VI generated by switching on the AC power supply is made the power supply for the start circuit 20 and during a predetermined time TI from switching on the AC power supply, a start signal Ssu is output (Ssu=1), and when the predetermined time T1 has elapsed, the start signal Ssu is stopped (Ssu=0). The start signal Ssu is input to the SC circuit 6.

The SC circuit 6 operates when at least one of the monitoring output Sc and the start signal Ssu is a logic value 1, and detects an error between a fed back DC output Vo and a previously set output target value Vref (refer to FIG. 3), and applies a PWM (pulse width modulation) signal corresponding to the detected error to the switching element Tsw as a control signal Ss, to thereby control the ON/OFF duty ratio of the switching element Tsw.

Hereunder is a description of the specific construction of the monitoring circuit 10, the SC circuit 6, and the start circuit 20.

Figure 2:
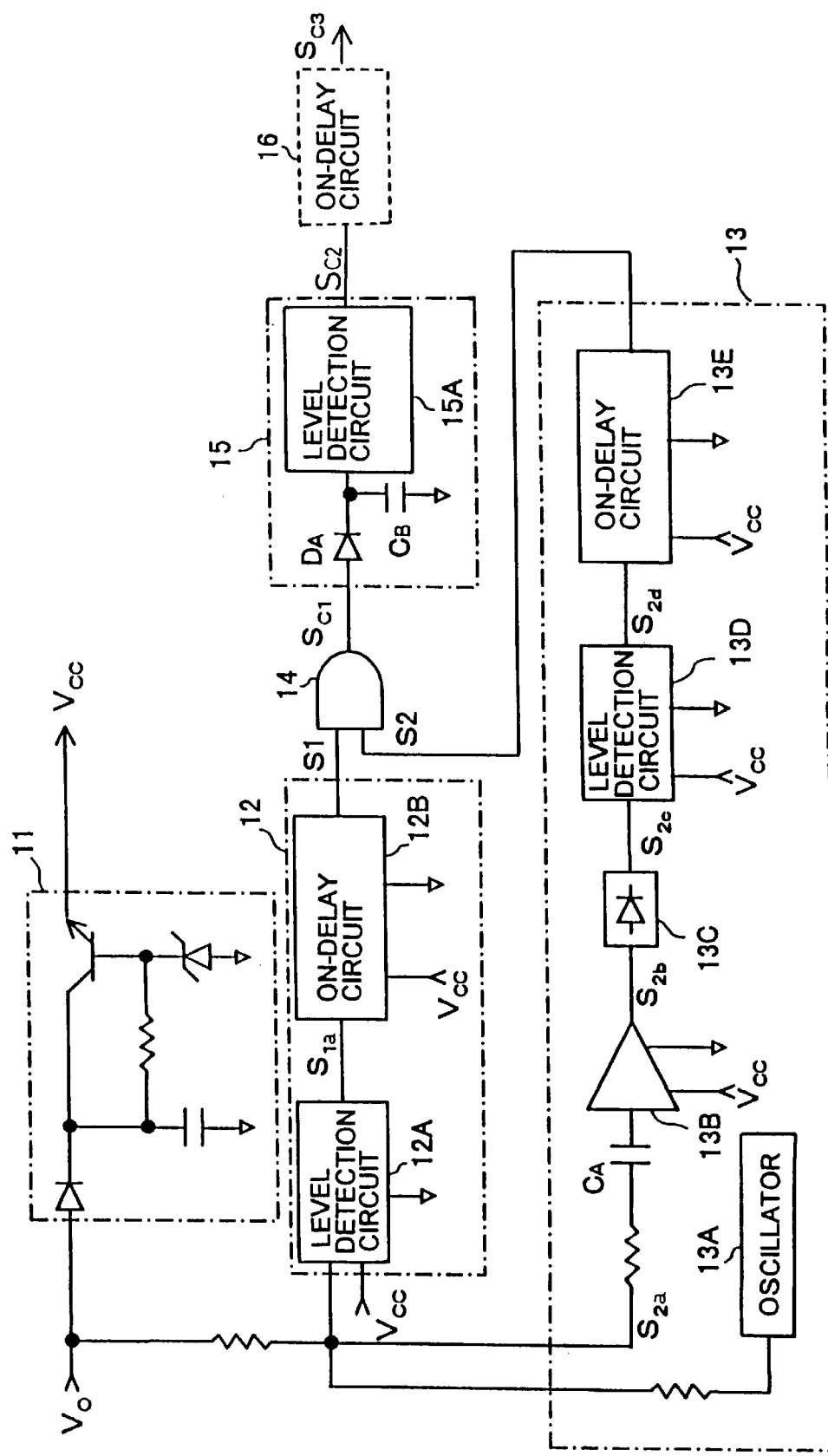
FIG. 2 is a schematic diagram of a monitoring circuit of the first embodiment.

FIG. 2 shows a structural example of the monitoring circuit 10. With the present invention, a disconnection fault of the signal transmission circuit is also considered, and in the following description, Sc=1 (logic value 1) is a higher level than Sc=0 (logic value 0).

The monitoring circuit 10 of this embodiment comprises; a constant voltage circuit 11 for generating a reference voltage Vcc for judging the normality/abnormality of the voltage level of the DC voltage Vo, a voltage level verification circuit 12 serving as a level verification device for judging the normality of the voltage level of the output Vo, a ripple verification circuit 13 serving as a ripple verification device for judging if a ripple level of the output Vo is equal to or below a predetermined value, an AND circuit 14 serving as a logical product device for carrying out a logical product operation on an output Si from the voltage level verification circuit 12 and an output S2 from the ripple verification circuit 13, and an off-delay circuit 15 serving as an off-delay device.

The constant voltage circuit 11 uses a transistor series regulator circuit comprising a diode, a capacitor, a resistor, a Zener diode, and a transistor, and generates a constant voltage Vcc with the output Vo to be input thereto as a power supply. This constant voltage Vcc is used as a reference voltage Vcc for the normal/abnormal judgement in the voltage level verification circuit 12, and is also used as a control power supply for the monitoring circuit 10 itself.

The voltage level verification circuit 12 is a circuit which generates an output S1=1 when an output Vo is input and the voltage level thereof is within a predetermined range, and S1=0 when the output Vo is outside of the predetermined range, and comprises a level detection circuit 12A having a lower limit threshold value VtL1 and an upper limit threshold value VtH1, and an on-delay circuit 12B having an on-delay time Ton1.

With the level detection circuit 12A, when the DC output Vo to be input is VtL1≦Vo≦VtH1, an output $S_{1a}$=1, while when Vo<VtL1 or Vo>VtH1, $S_{1a}$=0. Here needless to say, the lower limit threshold value VtL1 is set to be lower than the target value Vref of the power supply output Vo when normal, and the upper limit threshold value VtH1 is set to be higher.

With the on-delay circuit 12B, when the output $S_{1a}$ for the level detection circuit 12A is input and $S_{1a}$=1 continues for the on-delay time Ton1 or more, an output S1=1 is generated, and when $S_{1a}$=0 results, immediately S1=0 results. The on-delay circuit 12B has a function of ensuring that S1=1 is not generated even if for example the output Vo becomes an alternating current of an amplitude exceeding a predetermined range so that $S_{1a}$=1 is generated intermittently. Therefore, since it can be considered that the frequency when the output Vo is an alternating current is higher than the output frequency of the AC power supply, the on-delay time Ton1 should be set to equal to or greater than the period of the alternating current output Vo. The construction and operation of this level detection circuit 12A is disclosed for example in PCT/JP94/01825.

The ripple verification circuit 13 is a circuit which generates an output S2=1 when the ripple level of the DC output Vo is equal to or less than a predetermined value, and S2=0 when the ripple level of the DC output Vo exceeds the predetermined value, and incorporates an oscillator 13A for generating a signal of a frequency higher than the expected ripple frequency, a capacitor $C_A$, an AC amplifying circuit 13B, a rectifying circuit 13C, a level detection circuit 13D, and an on-delay circuit 13E. The construction and operation of this ripple verification circuit 13 is disclosed for example in PCT/JP93/00411.

Describing the operation briefly, if the ripple level of the output Vo is equal to or below a predetermined value, then the AC component of a signal $S_{2a}$ is a low level and is input to the AC amplifying circuit 13B via the capacitor $C_A$ and amplified. A resultant amplified signal $S_{2b}$ is a signal on which has been superimposed a high frequency signal of the oscillator 13A. The high frequency signal is rectified by the rectifying circuit 13C and a resultant high level DC signal $S_{2c}$ is input to the level detection circuit 13D. A lower limit threshold value VtL2 of the level detection circuit 13D is set to a value smaller than the DC signal $S_{2c}$ level generated when the ripple level is equal to or below the predetermined value. Consequently, when the ripple level of the output Vo is equal to or below the predetermined value, the signal $S_{2c}$ becomes equal to or greater than the lower limit threshold value VtL2 so that $S_{2c}$=1 is generated from the level detection circuit 13D. The on-delay circuit 13E, when the $S_{2c}$=1 continues for a predetermined on-delay time Ton2 or more, generates S2=1. On the other hand, in the case where the ripple level of the output Vo exceeds the predetermined value, the AC component of the signal $S_{2a}$ becomes a high level and the amplified signal $S_{2b}$ from the AC amplifying circuit 13B becomes saturated, so that the high frequency signal from the oscillator 13A is suppressed and does not appear in the output $S_{2b}$. With the rectifying circuit 13C, a rectifying time constant is set so that at a ripple frequency level of the output Vo, a rectified output is not produced. Consequently, when the ripple level of the output Vo exceeds the predetermined value, the output $S_{2c}$ level of the rectifying circuit 13C becomes less than the threshold value VtL2 of the level detection circuit 13D so that the output from the on-delay circuit 13E becomes S2=0.

Moreover, for the ripple verification circuit 13, a signal change detection circuit shown in Japanese Unexamined Patent Publication No. 9-152356 can also be used.

The AND circuit 14 generates an output $S_{c1}$=1 when S1=1 and at the same time S2=1, that is when the voltage level and the ripple level of the power supply output Vo is normal.

The off-delay circuit 15 incorporates a diode $D_A$, a capacitor $C_B$, and a level detection circuit 15A having a lower limit threshold value, and has an off-delay time Tof1 determined by the discharge time constant of the capacitor C B When $S_{c1}$=1, then immediately an output $S_{c2}$=1 is generated from the level detection circuit 15A, and $S_{c2}$=1 continues from after $S_{c1}$=0 until the lapse of the off-delay time Tof1. The off-delay circuit 15 has a function of ensuring that during the short time less than the off-delay time Tof1, $S_{c2}$=0 does not result when $S_{c1}$=0 For example, when with a temporary load change or the like, S1 or S2 becomes a logic value 0, the influence of this can be ignored. With the present embodiment, the output $S_{c2}$ from the off-delay circuit 15 is supplied to the SC circuit 6 as the output Sc from the monitoring circuit 10.

Moreover, if it is not necessary to consider temporary load changes or the like, then the off-delay circuit 15 can be omitted. In this case, the output $S_{c1}$ from the AND circuit 14 can be supplied to the SC circuit 6 as the output Sc from the monitoring circuit 10.

To make such a monitoring circuit 10 fail-safe, the components of the respective level detection circuit, on-delay circuit, AND circuit and so on, can be constructed in a fail-safe manner. In the case where the level detection circuit and the AND circuit are constructed in a fail-safe manner, a fail-safe window comparator/AND gate as disclosed in the specifications of U.S. Pat. Nos. 5,345,138, 4,661,880, and 5,027,114 may be used. The circuit, operation and fail-safe characteristics of these are disclosed in documents such as; Transactions of the Institute of Electrical Engineers of Japan, Vol. 109-C, No. 9, September 1989 (A Method of Constructing an Interlock System using a Fail-safe Logic Element having Window Characteristics), or "Application of Window Comparator to Majority Operation" Proc. of 19th International Symp. on Multiple-Valued Logic, IEEE Computer Society (May 1989). The on-delay circuit may use a fail-safe on-delay circuit as known for example from International Patent Publications WO94/23303 and WO94/23496, Japanese Examined Patent Publication No. 1-23006, and Japanese Unexamined Patent Publication No. 9-162714. The fail-safe construction of the rectifying circuit and the amplifying circuit is known from for example the beforementioned PCT/JP 93/00411. By using these, then a fail-safe construction is possible with the monitoring circuit 10 giving an output Sc=0 at the time of fault.

With the monitoring circuit 10, it does not matter if the construction has only one of the above two monitoring functions (voltage level verification function and ripple verification function). For example, if a ripple reduction fail-safe filter is provided in the output section of the smoothing circuit 4 which generates the DC output Vo, so that an excessively large ripple is not produced in the output Vo, then the ripple verification circuit 13 may be omitted. On the other hand, a construction may also be taken where, for the monitoring circuit 10, another monitoring function required for monitoring the voltage output Vo is added. In that case, the output Sc from the monitoring circuit 10 in this embodiment, and the output from the additional monitoring function may be subjected to a logical product operation in a separately provided AND circuit, and the logical product output made the final monitoring output Sc.

Figure 3A:
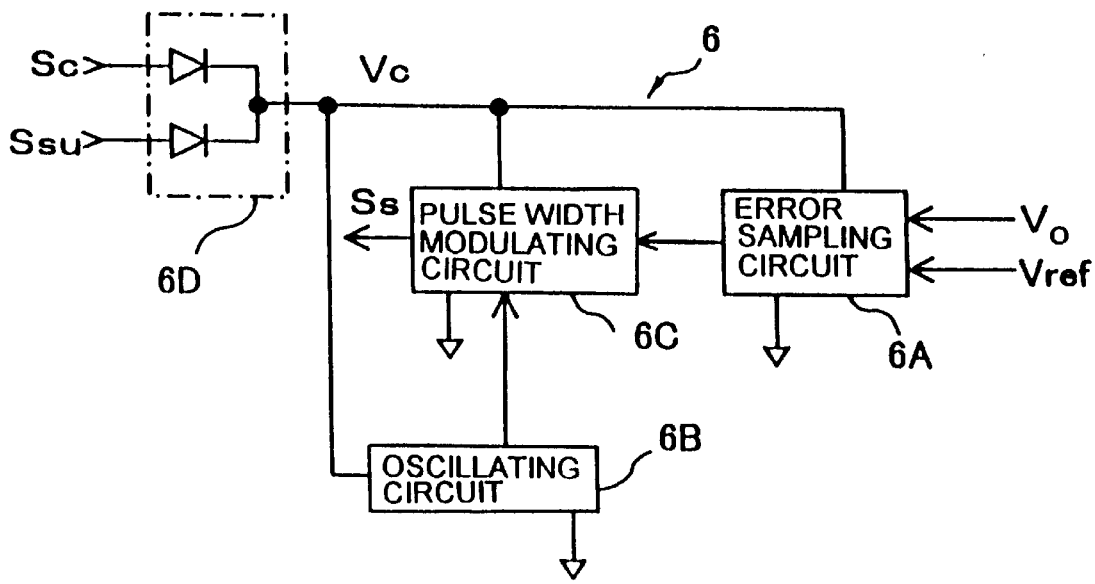
FIG. 3(A) is a diagram illustrating a structural example of a switching control circuit for which the monitoring output is used as a control power supply.

Next a structural example of the SC circuit 6 is shown in FIGS. 3(A) and (B).

In FIG. 3(A), the SC circuit 6 of this embodiment, in addition to a heretofore error sampling circuit 6A, oscillating circuit 6B, and pulse width modulating circuit 6C, is provided with an OR circuit 6D (with this embodiment, a wired OR provided with a rectifying diode) being a logical sum circuit for performing a logical sum operation on the monitoring output Sc and the start signal Ssu. The SC circuit 6 of this embodiment is constructed using a logical sum output Vc from the OR circuit 6D as a control power supply for the SC circuit 6.

With the operation, when Sc=1 or Ssu=1, the output Vc is generated from the OR circuit 6D. With supply of the control power supply Vc, the error sampling circuit 6A, the oscillating circuit 6B, and the pulse width modulating circuit 6C start to operate so that as with heretofore, a PWM signal Ss is output. That is to say, an error between the fed back DC output Vo and the previously set target value Vref is detected by the error sampling circuit 6A, and corresponding to the detected error, the signal from the oscillating circuit 6B is subjected to pulse width modulation (PWM) by the pulse width modulating circuit 6C, and the PWM signal supplied to the switching element Tsw as a control signal Ss. With the supply of the control signal Ss, the switching element Tsw switches ON/OFF and the DC output Vo is generated. Since when the start signal Ssu=Sc=0, the output Vc is not produced and hence the SC circuit 6 will not operate, the switching operation of the switching element Tsw is stopped and hence the output Vo is stopped. It is dear that the SC circuit 6 will not operate, if there is no power supply. Hence the construction of the present embodiment has a fail-safe characteristic.

Figure 3B:
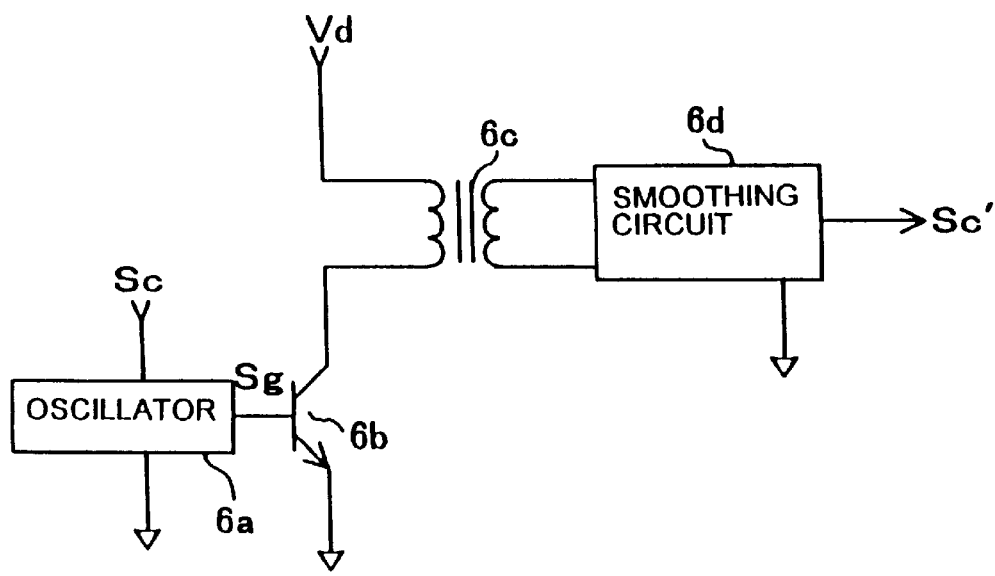
FIG. 3(B) is an example of a circuit for level conversion of the monitoring output.

Moreover, in cases such as where the monitoring output Sc cannot be used directly as a control power supply for the SC circuit 6, then for example a circuit of FIG. 3(B) may be added.

The circuit of FIG. 3(B) incorporates an oscillator 6a, a transistor 6b, a transformer 6c, and a smoothing circuit 6d, and is constructed so that the output Vo becomes Sc'=1 at normal times, and Sc'=0 at abnormal times. That is, when Sc=1 (Vo normal), an AC signal Sg is generated from the oscillator 6a so that the transistor 6b is switched ON/OFF and an AC signal generated in a primary side of the transformer 6c is transmitted to a secondary side of the transformer 6c and smoothed by the smoothing circuit 6d to generate Sc'=1. With Sc=0, the oscillator 6a does not operate so that an AC output is not generated in the secondary side of the transformer 6c, resulting in Sc'=0 (around GND level).

If such a circuit is added, then the monitoring output Sc level can be converted to an effective required level for the control power supply for the SC circuit 6. Accordingly, the output Sc' of this circuit may be supplied as Sc in FIG. 3(A). Also regarding the start signal Ssu, in the case where level conversion is required, the circuit of FIG. 3(B) may be applied.

If in the AND circuit 14 of the monitoring circuit 10 and the level detection circuit 15A of the off-delay circuit 15, a fail-safe window comparator/AND gate being the beforementioned fail-safe element is used, then the monitoring output Sc becomes an AC signal (corresponding to logic value 1) when the output Vo is verified as normal, and becomes a DC signal (corresponding to logic value 0) when an abnormality is detected. Therefore in FIG. 3(B), the oscillator 6a may be omitted and the monitoring output Sc may be input directly to the transistor 6b. In this case, when Sc=0 (that is, DC signal), and also when a disconnection or short circuit fault occurs in the transistor 6b, an AC signal is not supplied to the primary side of the transformer 6c and hence Sc'=0 results, and the output Vo is stopped. Therefore this construction has a fail-safe characteristic.

Figure 4A:
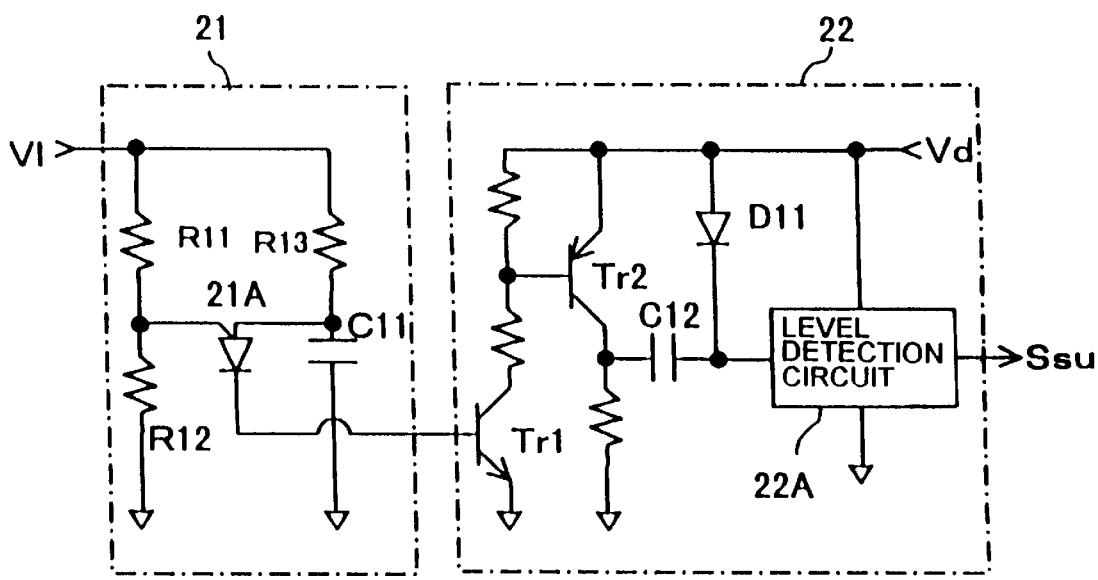
FIG. 4(A) is a diagram showing a structural example of a start circuit used in the first embodiment.

Next, FIGS. 4(A) and (B) show a structural example of a start circuit 20.

FIG. 4(A) shows a structural example for generating a start signal Ssu=1 synchronously with the switching on of the AC power supply.

In the figure, the start circuit 20 of this embodiment is constructed with a holding circuit 21 and a pulse generating circuit 22. The holding circuit 21 incorporates three resistors R11~R13, a capacitor C11, and a PUT 21A. In the holding circuit 21, when the output VI from the smoothing circuit 2 is input, an output is generated, and while the output VI is being input, the output continues to be generated. The pulse generating circuit 22 incorporates an NPN transistor Tr1, a PNP transistor Tr2, a capacitor C12, a diode D11, and a level detection circuit 22A having a lower limit threshold value, and generates a start signal Ssu=1 only for a predetermined time TI from receipt of the output from the holding circuit 21.

With the operation, when the output VI is input then a partial value of the voltage level of the output VI is applied to a gate terminal of the PUT 21A of the holding circuit 21 by the resistors R11 and R12, and at the same time, a terminal voltage of the capacitor C11 due to the charge thereof is applied to an anode terminal. The anode terminal potential rises with a time constant determined by the resistance value of the resistor R13 and the capacity of the capacitor C12, and when the anode terminal voltage becomes greater than the gate terminal voltage, the PUT 21A comes on. Consequently, the output signal from the PUT 21A is generated slightly after the output VI is input, to be input to the pulse generating circuit 22. In the pulse generating circuit 22, in the interval from the input of the output VI until the PUT 21A comes ON and the output from the holding circuit 21 is input, the transistors Tr1, Tr2 are in the OFF condition, and the capacitor C12 is charged with a voltage Vd. After this, when the output signal from the holding circuit 21 is applied to the base of the transistor Tr1, the transistor Tr1 comes on and the transistor Tr2 comes on. As a result, a start-up differential signal of a level equal to or above the lower limit threshold value and of a higher level than the voltage Vd, is input to the level detection circuit 22A, and Ssu=1 is generated from the level detection circuit 22A. The signal Ssu=1 is generated during a predetermined time TI until the start-up differential signal becomes less than the lower limit threshold value. The continuous time of Ssu=1 is approximately determined by the capacity of the capacitor C12, and the lower limit threshold value and input resistance of the level detection circuit 22A. When the PUT 21A once comes on, this continues ON until the output VI is stopped, and hence the transistors Tr1, Tr2 are fixed in the ON condition. Therefore when the output VI is input, Ssu=1 is generated only once.

The holding circuit 21 has a fail-safe characteristic in that while the output VI is being input, its output does not oscillate due to a fault, and the pulse generating circuit 22 has a fail-safe characteristic giving Ssu=0 with a fault.

Figure 4B:
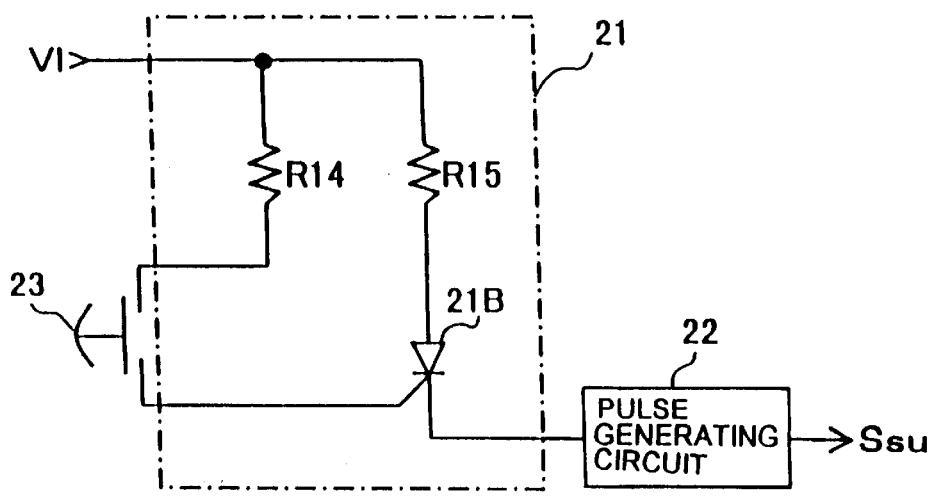
FIG. 4(B) is a diagram showing another structural example of a start circuit used in the first embodiment.

Moreover, the construction may be such that rather than the start signal Ssu being generated synchronously with switching on of the AC power supply, the start signal Ssu is generated after switching on the AC power supply, utilizing a contact point which is operable from outside. For example, the construction may be such that a start signal generation command signal is input to a start circuit by for example the ON operation of a push button, to generate the start signal Ssu. FIG. 4(B) shows an example of such a circuit structure.

In FIG. 4(B), a holding circuit 21 comprises resistors R14 and R15, and a thyrister 21B. When an external push button 23 is pushed to ON, a trigger signal is applied to a gate of the thyrister 21B so that the thyrister 21B comes on. The pulse generating circuit 22 is that shown in FIG. 4(A), and due to the thyrister 21B coming on, the output VI is transmitted to the pulse generating circuit 22 via the resistor R15, so that Ssu=1 is generated for a predetermined time TI only.

Next is a description of the operation of the first embodiment of FIG. 1. The SC circuit 6 has the construction of FIG. 3(A), while the start circuit 20 has the construction of FIG. 4(A).

When the AC power supply is switched on and the DC output VI is generated from the smoothing circuit 2, the start circuit 20 operates so that the start signal Ssu=1 is input to the SC circuit 6. With the input of the start signal Ssu, the SC circuit 6 is operated so that as described before, the control signal Ss is supplied to the switching element Tsw, and the switching element Tsw is switched ON/OFF. As a result, an AC signal is generated in the secondary side of the transformer T1, and a DC output Vo is generated via the smoothing circuit 4. The DC output Vo is monitored by the monitoring circuit 10 and when during the predetermined time TI while the start signal Ssu is being generated, the output Vo comes within the predetermined threshold value range, Sc=1 indicating normal verification is generated from the monitoring circuit 10. After lapse of the predetermined time TI, the start signal becomes Ssu=0, however provided that the output Vo is within the normal range, the control signal Ss=1 from the SC circuit 6 continues, and the output Vo of normal level is supplied to the load 5.

In the case where the output Vo at the time of power supply unit start-up is not normal (for example the voltage level is outside the predetermined range, or the ripple level increases), then the monitoring output becomes Sc=0, and when Ssu=0 results after the predetermined time TI has elapsed from the time of start-up, the control signal becomes Ss=0 so that the ON/OFF switching of the switching element Tsw stops and the output Vo is stopped. After this, unless Ssu=1 is again generated from the start circuit 20, the output Vo will not be generated.

In the condition where after lapse of the predetermined time TI the output Vo is generated with Sc=1, if an abnormality of the output Vo occurs so that Sc=0 results, since the start signal Ssu is already stopped, then when Sc=0 results indicating a detection of an abnormality of the monitoring circuit 10, the control signal Ss of the SC circuit 6 stops and the output Vo is stopped. After this, even if for example the cause of the abnormality is removed, unless Ssu=1 is again generated, then the output Vo remains in the stop condition. Consequently, the abnormal occurrence is memorized in the start circuit 20 so that the stopping of the output Vo can be continued.

With such a construction, since at the time of start-up of the power supply output Vo, the output Vo can be started up regardless of the output condition of the monitoring circuit 10, then abnormality monitoring for not only an over voltage but also a level drop of the output Vo of the power supply unit is possible. Moreover, by having the monitoring output Sc generated as a high energy level signal at normal times enables a fail-safe construction, since when for example the supply line for the monitoring output Sc becomes disconnected, the monitoring output Sc is not transmitted and an abnormality is notified. If as well as the monitoring circuit 10, the SC circuit 6 and the start circuit 20 have a fail-safe construction using the beforementioned fail-safe elements so that at the time of a fault the output is stopped, then safety and reliability can be even further improved.

Here, with the monitoring circuit 10, it is not absolutely necessary that the output Vo is directly monitored, and a signal corresponding to the output Vo may instead be monitored. For example, the construction may be such that a signal for the output Vo which has been voltage dropped by a resistor R as shown by the dotted line in FIG. 1 is input to the monitoring circuit 10.

With the abovementioned first embodiment, the construction is such that the start signal Ssu is generated for a predetermined time TI. However, the construction may be such that the start signal Ssu is stopped at the point in time where the output Vo becomes equal to or above the lower limit threshold value so that Sc=1 is generated from the monitoring circuit 10. For example if the construction is such that a normally closed switching device is disposed in the supply line for the start signal Ssu, and with the generation of the output Sc=1 from the monitoring circuit 10, the switching device is switched off, then with generation of Sc=1 the switching device is switched off and supply of the start signal Ssu is stopped. With such a construction, at the time of start-up, the supply of an overvoltage to the load 5 within the generation period TI for the start signal Ssu=1 can be prevented. In this case, the construction in the start circuit 20 for managing the start signal Ssu using time can be omitted.

With the above first embodiment, the construction is such that the SC circuit 6 is driven by the generation of the start signal Ssu or the monitoring output Sc to thus generate the control signal Ss. However the construction may be such that the control signal Ss generated from the SC circuit 6 is supply/shut off controlled by the start signal Ssu or the monitoring output Sc. Such a construction is shown in FIGS. 5(A) and (B).

Figure 5A:
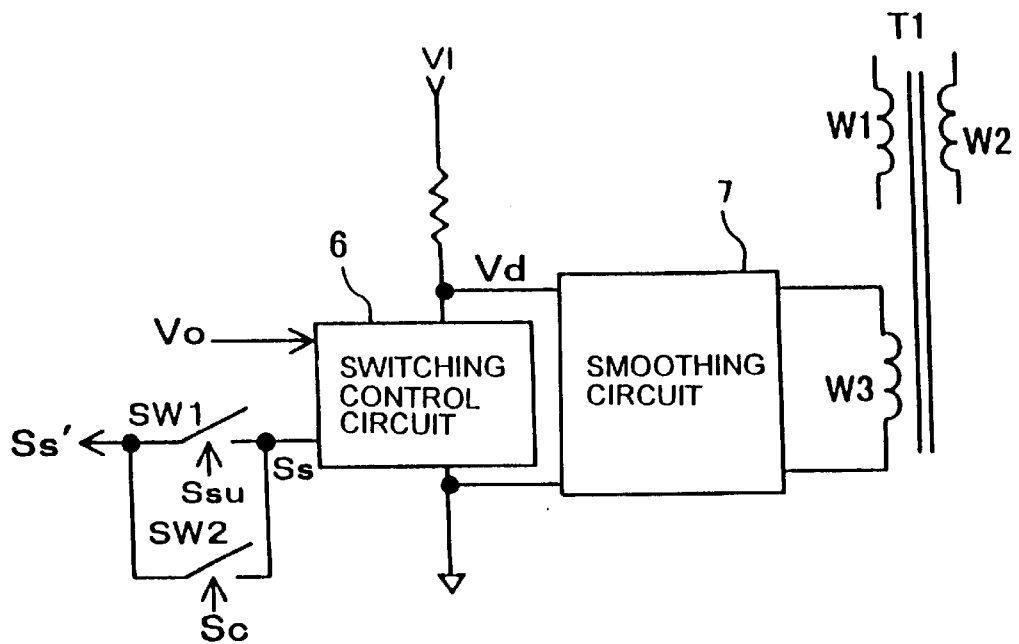
FIG. 5(A) is a diagram showing a structural example for where a control signal of a switching control circuit is transmitted to a switching element by a start signal and a monitoring output.

In FIG. 5(A), normally opened switches SW1, SW2 connected in parallel with each other are disposed in the supply path for the control signal Ss. The construction is such that the switch SW1 comes on with the start signal Ssu=1, and the switch SW2 comes on with the monitoring output Sc=1. Here switches SW1, SW2 correspond to a signal transmission device.

With such a construction, if at least one of the start signal Ssu and the monitoring output Sc is a logic value 1, then one of the switches SW1, SW2 comes on so that the control signal Ss is supplied to the switching element Tsw as a control signal Ss' and an output Vo is generated. In FIG. 5(A), for the power supply Vd of the SC circuit 6, the construction is such that for example at the time of start-up, an output VI from the smoothing circuit 2 is supplied via a resistor, while for after start-up, a separate winding W3 is provided in the transformer T1 and the AC output from the winding W3 is smoothed by a smoothing circuit 7. However, needless to say the construction is not limited to this construction. Moreover, the switches SW1, SW2 in the figure signify a switching function, and for example switch components such as relay contact points or semiconductor switching elements may be used.

Figure 5B:
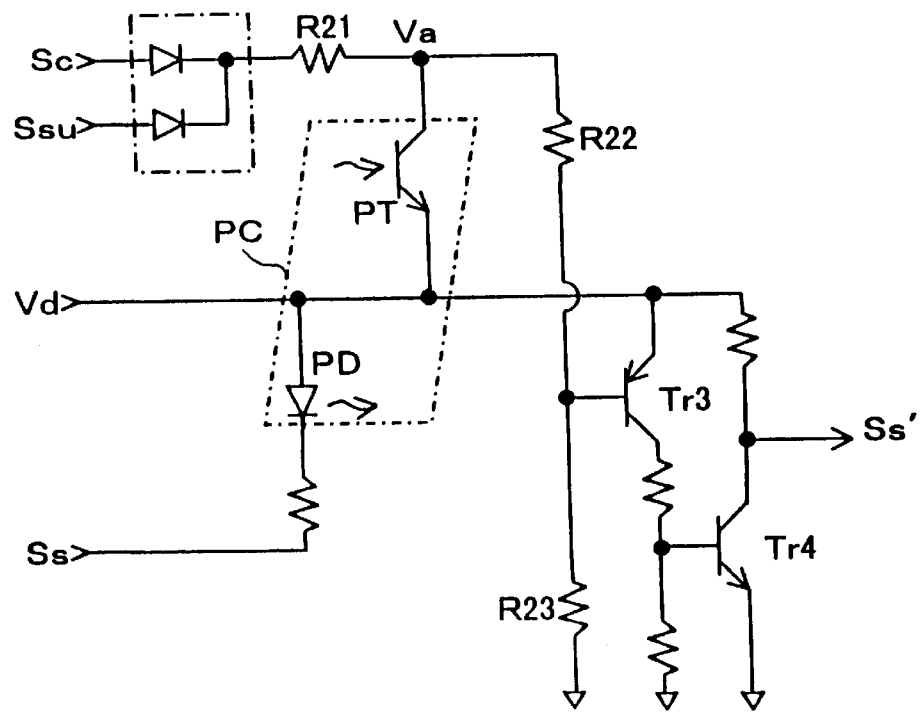
FIG. 5(B) is a diagram showing another structural example for where a control signal of a switching control circuit is transmitted to a switching element by a start signal and a monitoring output.

FIG. 5(B) is a circuit construction having a fail-safe characteristic such that even if a fault occurs, then with Ssu=Sc=0, a control signal is not supplied to the switching element Tsw.

This circuit has a lower limit threshold value, which is of a higher level than the circuit power supply Vd, with respect to the input signal (logical sum output for the start signal Ssu and the monitoring output Sc). When the level of the monitoring output Sc or the start signal Ssu is equal to or above the lower limit threshold value, an AC signal (amplitude is Vd-GND level) synchronized with the control signal Ss from the SC circuit 6 is output as the signal Ss' and supplied to the switching element Tsw. When both levels of the monitoring output Sc and the start signal Ssu are less than the lower limit threshold value, the signal Ss' is fixed as DC, and the switching element Tsw does not switch ON/OFF.

To explain in detail, when the control signal Ss is L level, a phototransistor PT is switched on by an optical signal from a photodiode PD of a photocoupler PC and the voltage Va becomes approximately Vd. When the control signal Ss is H level, the optical signal from the photodiode PD is extinguished so that the phototransistor PT goes off and the base potential of a transistor Tr3 becomes r23·Sc (or Ssu)/(r21+r22+r23) (r21, r22, r23 are resistance values of resistors R21, R22, R23). The resistance values r22, r23 are set so that the transistor Tr3 comes on when Va≅Vd. If the transistor Tr3 goes off with a base potential for when the phototransistor PT is off (=r23·Sc (or Ssu)/(r21+r22+r23)), then with the ON/OFF of a transistor Tr4, the signal Ss' becomes an AC signal synchronized with the control signal Ss. In order for the transistor Tr3 to go off when the phototransistor PT is off, then if r23·Sc (or Ssu)/(r21+r22+r23)>Vd−Vbe (Vbe is the base-emitter voltage when the transistor Tr3 is on) this is possible. The lower limit threshold value with respect to the signal Sc (or Ssu) is given approximately by (r21+r22+r23)·(Vd−Vbe)/r23.

Consequently, the monitoring output Sc and the start signal Ssu are set so that at logic value 1 their voltage levels are greater than (r21+r22+r23)·(Vd−Vbe)/r23, and at logic value 0 their voltage levels are less than (r21+r22+r23)·(Vd−Vbe)/r23. The levels of the start signal Ssu and the monitoring output Sc can be set for example using the circuit of FIG. 3(B) and adjusting the winding ratios of the transformer 6c in the circuit. Of course, the threshold value may also be set between the level for Sc, Ssu=1 and 0 by adjusting the resistance values r21, r22, r23. Here Vd is the power supply for the SC circuit 6.

Besides this, a construction for controlling the signal transmission inside the SC circuit 6 may also be considered. For example, a construction may be considered where the output path of the oscillating circuit 6B inside the SC circuit 6 is controlled so as to be conducted or interrupted.

Incidentally, it is expected that high voltage noise or the like, for example from the AC power supply, will appear in the input voltage VI to the primary side of the transformer T1. If such high voltage noise appears in the input voltage VI, there is the possibility that the circuit transmitting the input voltage VI will fault. Since the monitoring circuit 10, is the section for ensuring safety of the switching power supply, then a construction where the input voltage VI is not transmitted is desirable. Consequently, the construction should be such that the monitoring circuit 10 and the primary side of the transformer T1 are electrically isolated. With the monitoring circuit 10, the output Vo generated from the primary side input voltage VI of the transformer T1 is input, and the monitoring output Sc is output to the primary side of the transformer T1. Since the input voltage VI and the output Vo are isolated by the transformer T1, then the construction may be such that the monitoring output Sc is transmitted to the primary side of the transformer T1 by an electrically isolated construction.

For example, in the case where with the construction of FIG. 3 or FIG. 5, the monitoring output Sc is transmitted to the primary side of the transformer T1, then the construction of FIG. 3(B) isolated by the transformer 6c. Consequently, the signal Sc' may be generated using the circuit of FIG. 3(B), and the signal Sc' supplied instead of the monitoring output Sc in FIG. 3(A) and FIG. 5.

Moreover a photocoupler may be used. That is, the oscillating output Sg from the oscillator 6a of FIG. 3(B) is supplied to a photodiode of a photocoupler via a current decreasing resistor. With the photodiode, when Sc=1, the photodiode flashes in synchronous with the signal Sg. With a phototransistor of a photocoupler with the collector side connected via a resistor to the voltage Vd and the emitter side connected to GND, an AC output is generated in synchronous with the flashing of the photodiode. This AC output is voltage doubler amplified, and a signal Sc'=1 is generated corresponding to a logic value 1 of a higher level than the voltage Vd. On the other hand, since when Sc=0 the photodiode does not flash, then the output from the phototransistor becomes a DC signal, and a signal Sc'=0 corresponding to logic value 0 which is approximately equal to the voltage Vd is generated.

In this way, also by using a photocoupler, the monitoring output Sc can be electrically isolated and transmitted to the primary side circuit of the transformer T1.

Figure 20:
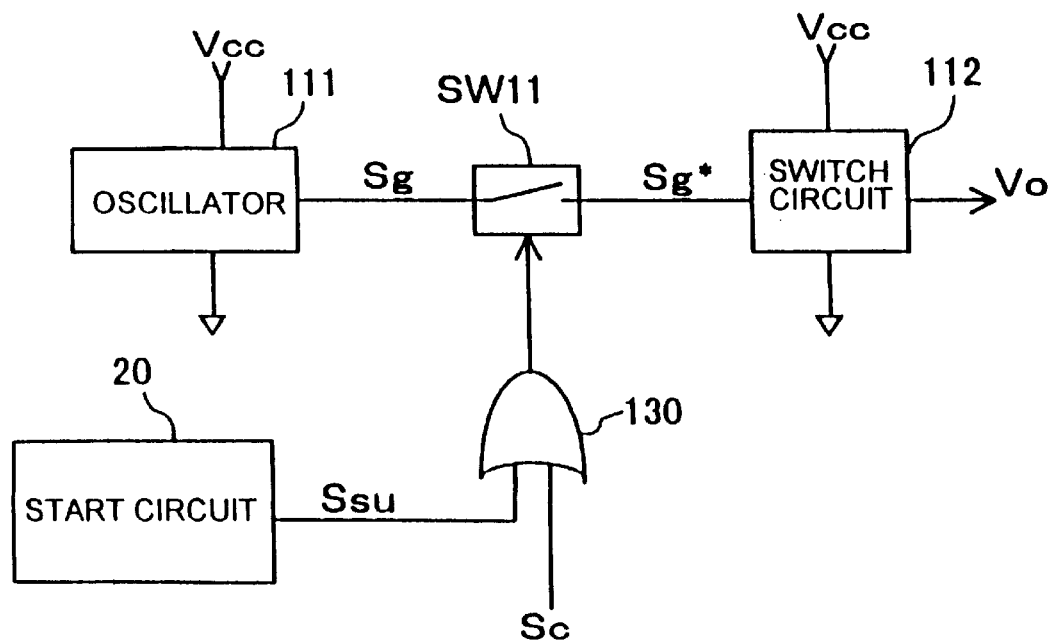
FIG. 20 is an essential parts schematic diagram illustrating another structural example for verifying that an output level is normal and generating an output.

Also with other embodiments described later, needless to say the isolation of the primary side and the secondary side of the transformer T1 can be similarly performed. Moreover, also in the case where the present invention is applied to a later described AC power supply unit, then as described later the construction is such that the power supply of a monitoring circuit is obtained by rectifying an AC signal output from a secondary winding provided in a transformer T22, and such that the level and frequency of the output So is verified with the monitoring circuit. Furthermore, a signal Sc serving as the monitoring result, with the addition of a circuit using the abovementioned photocoupler to the construction shown in FIG. 20, is supplied to the primary side of the transformer T22 as a signal Sc'. If this is done, then the power supply of the monitoring circuit and the signal to be monitored are isolated from the primary side by the transformer T22, and the signal for the monitoring result is similarly isolated by the photocoupler.

Figure 6:
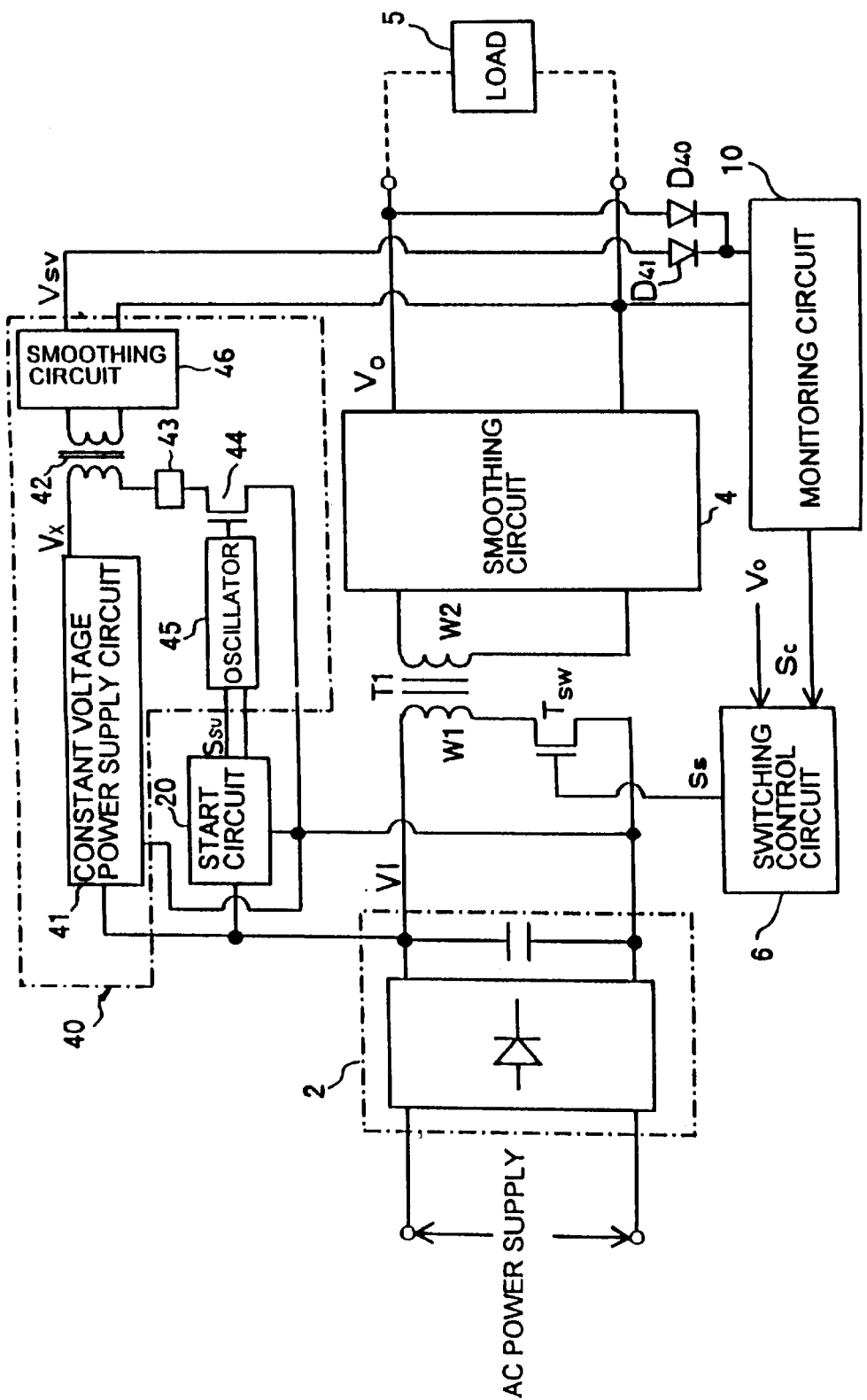
FIG. 6 is a schematic diagram of a second embodiment of a power supply unit according to the present invention applied to a DC switching power supply unit.

Next is a description of a second embodiment of a DC power supply with reference to FIG. 6. Here components the same as for the first embodiment are denoted by the same reference symbols.

With the first embodiment of FIG. 1, during the predetermined time TI when the start signal Ssu=1 is being generated from the start circuit 20, the output Vo is generated regardless of the monitoring output Sc. Hence there is the possibility that at the time of start-up an abnormal output Vo will be supplied to the load 5.

With the second embodiment of FIG. 6, the construction is such that the output Vo supply to the load 5 is prevented until the normality of the DC output Vo generated with Ssu=1 of the start circuit 20 is verified by the monitoring circuit 10. Furthermore, the construction is such that in the case where due to a problem with the prevention function the output Vo is erroneously supplied to the load 5, the problem with the prevention function can be discovered.

In FIG. 6, with the power supply unit of this embodiment, there is provided a limited output generating circuit 40 for generating an output Vsv where the power is limited compared to that in normal condition by the start signal Ssu from the start circuit 20, and a diode $D_{40}$ for preventing supply of the output Vsv from the limited output generating circuit 40 to the load 5 and inputting an output Vo generated after start-up to the monitoring circuit 10. In this way, when Sc=1 is generated from the monitoring circuit 10 based on the output Vsv level, a control signal Ss is generated from the SC circuit 6 so that the switching element Tsw is switched ON/OFF and the DC output Vo is supplied to the load.

The limited output generating circuit 40 comprises; a constant voltage power supply circuit 41 for generating a constant voltage from the output VI, a transformer 42 with an output Vx from the constant voltage power supply circuit 41 supplied to the primary side, an output limiting impedance element 43 and a switch element 44 connected in series with a primary side of the transformer 42, an oscillator 45 driven by the start signal Ssu for generating an AC output, and a smoothing circuit 46 for rectifying and smoothing a secondary side output of the transformer 42 and supplying the output Vsv to the monitoring circuit 10.

The diode $D_{40}$ is connected between the output line of the output Vo and the input terminal of the monitoring circuit 10 to prevent the supply of the output Vsv to the load 5.

The operation of the present embodiment will be described below.

At the time of a rise in output, with the switching on of the AC power supply an output VI is generated from the smoothing circuit 2 so that the start circuit 20 and the limited output generating circuit 40 operate. The start circuit 20, during the predetermined time TI from start-up supplies Ssu=1 to the oscillator 45, and the constant voltage power supply circuit 41 supplies the DC output Vx to the transformer 42. As a result, with the ON/OFF operation of the switching element 44 due to the AC signal from the oscillator 45, an AC signal is generated in the secondary side of the transformer 42 and is rectified and smoothed by the smoothing circuit 46 to thereby produce the DC output Vsv. The impedance element 43 is for limiting the current in the primary side of the transformer 42, in other words for limiting the power of the output Vsv.

The output Vsv from the limited output generating circuit 40 is supplied to the monitoring circuit 10 via a diode $D_{41}$, but the output Vsv is stopped by the diode $D_{40}$ and is not supplied to the load 5. Consequently, as a load supplied by the output Vsv, there is only the monitoring circuit 10. The output frequency and the duty ratio of the oscillator 45 are set beforehand so that the output Vsv becomes an output which is limited within the level range of the normal output Vo. Therefore if conditions are normal, Sc=1 is generated from the monitoring circuit 10. With input of this Sc=1, the SC circuit 6 generates the control signal Ss to ON/OFF drive the switching element Tsw so that the output Vo is supplied to the load 5 via the transformer T1. This output Vo is supplied to the monitoring circuit 10 via the diode $D_{40}$ and monitored. Once the predetermined time TI has elapsed, Ssu=0 results, and the output Vsv from the limited output generating circuit 40 is stopped. However if the output Vo is a normal level, Sc=1 is generated from the monitoring circuit 10, and hence the ON/OFF operation of the switching element Tsw continues so that the output Vo is continuously generated.

With the construction of the second embodiment, at the time of a rise in output, output supply to the load 5 is not carried out until the normalcy of the output Vo is verified. Therefore the supply to the load 5 of an abnormal output such as an overvoltage at the time of start-up can be prevented.

With the present embodiment circuit, if there is a short circuit fault in the diode $D_{40}$, the output Vsv is also supplied to the load 5. However, the load of the output Vsv at this time becomes the monitoring circuit 10 and the load 5. Consequently, in this case, the limit value of the output Vsv may be set so that the voltage level of the output Vsv generated from the limited output generating circuit 40 becomes lower than the normal level. Furthermore, in the case where there is a fault in the smoothing circuit 2 for supplying the drive power supply of the limited output generating circuit 40, then the output Vsv periodically becomes a low level which is detected by the monitoring circuit 10 and the output Sc=1 is not generated. Therefore the output Vo is stopped at the point in time when the start signal becomes Ssu=0.

With the monitoring circuit 10 and the start circuit 20, a circuit the same as for the first embodiment may be used. Moreover, the construction is such that the SC circuit 6 is controlled by the output Sc from the monitoring circuit 10.

Figure 7:
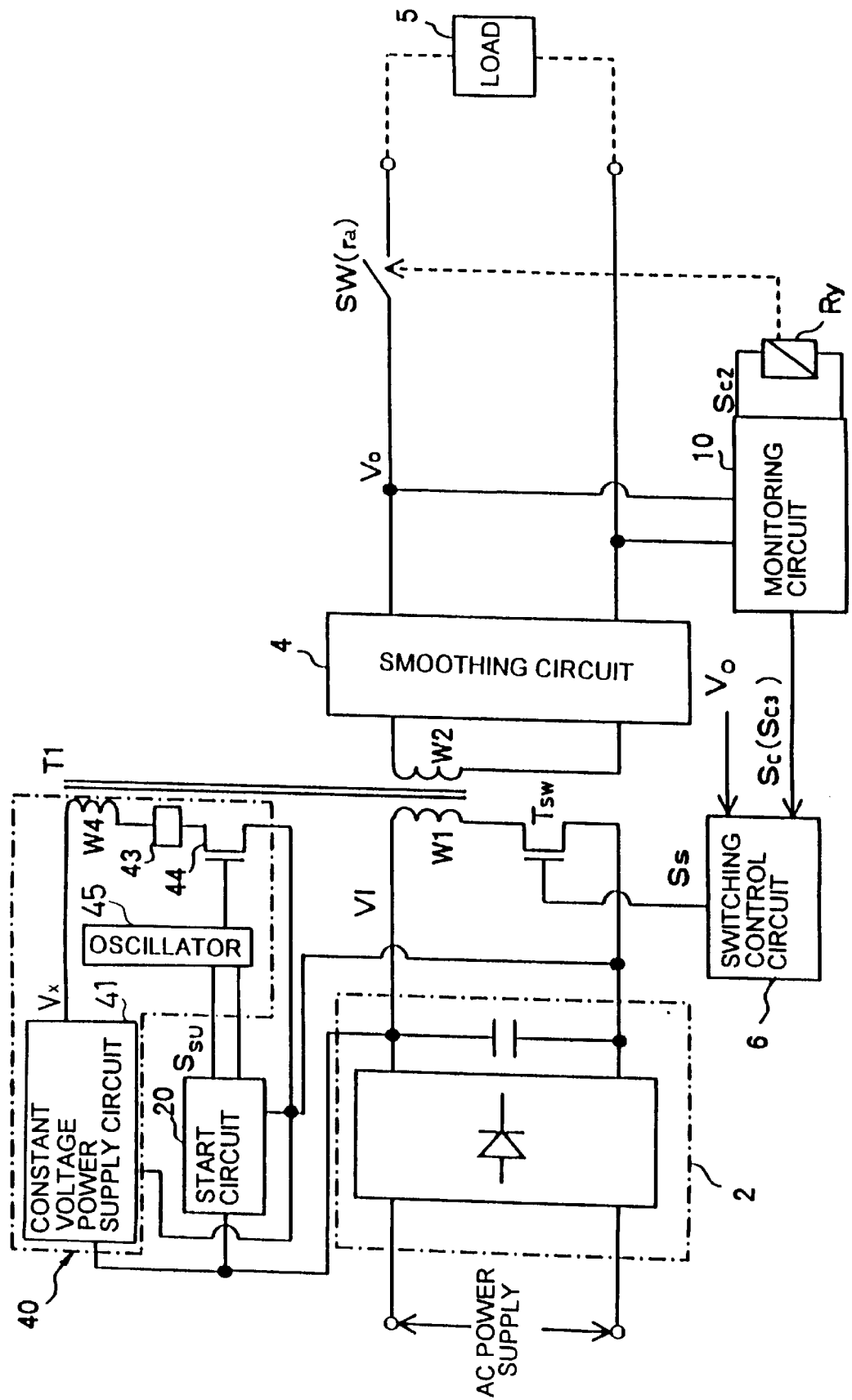
FIG. 7 is a schematic diagram of a third embodiment of a power supply unit according to the present invention applied to a DC switching power supply unit.

Next is a description of a third embodiment of a DC power supply with reference to FIG. 7.

With the embodiment of FIG. 6, it is not possible to know if there is a fault in the secondary side smoothing circuit 4 of the transformer T1 at start-up. With the third embodiment, the construction is such that faults in the secondary side smoothing circuit 4 of the transformer T1 can also be monitored at start-up.

In FIG. 7, with the power supply unit of this embodiment, the transformer 42 and the smoothing circuit 46 of the limited output generating circuit 40 of FIG. 6 are removed and instead there is provided a separate primary winding W4 on the primary side of the transformer T1, and the limited output at the time of start-up is supplied via the transformer T1. Moreover, the construction is such that a switch SW serving as a switching device controlled by the output from the monitoring circuit 10, is disposed in the output supply path to the load 5 for the output Vo, so that the supply of the output Vo at the time of start-up to the load 5 is stopped. The present embodiment is described for an example where a normally closed contact point $r_a$ of a relay Ry is used for the switch SW.

The operation of the embodiment circuit is described hereunder.

The output from the limited output generating circuit 40 at the time of start-up is transmitted to the secondary side of the transformer T1 via the winding W4, and is converted to a DC output Vo by the smoothing circuit 4. At this time, since the switch SW (contact point $r_a$) is off, then the DC output Vo generated at the time of start-up is not supplied to the load 5, and is only supplied to the monitoring circuit 10. Under this condition, if the smoothing circuit 4 and the monitoring circuit 10 are normal, then Sc=1 is generated so that the relay Ry is excited and the switch SW ($r_a$) comes on. Furthermore, due to the generation of a control signal Ss from the SC circuit 6, the ON/OFF operation of the switching element Tsw is started and the output Vo is generated and supplied to the load 5.

If the switch SW ($r_a$) is in the ON condition due to a fault, then for the same reason as for the second embodiment of FIG. 6 (the load of the output Vo becomes the monitoring circuit 10 and the load 5), the output Vo becomes a low level so that Sc=1 is not generated. Moreover, an abnormality of the output Vo due to a fault in the smoothing circuits 2 and 4 or the like is detected by the monitoring circuit 10 so that Sc=1 is not generated, and when after lapse of the predetermined time TI the start signal becomes Ssu=0, the output Vo is stopped.

Incidentally, in the case where, as with the present embodiment, the relay contact point $r_a$ is used in the switch for interrupting the output Vo at the time of start-up, then considering the contact point life, it is preferable that the output Vo is generated by the switching operation of the switching element Tsw after the contact point ra comes on. To achieve this, the monitoring circuit 10 may be constructed so that the monitoring output Sc=1 is supplied to the SC circuit 6 with a delay after an excitation output for the relay Ry is generated. To achieve this construction, the construction may be such that an on-delay circuit 16 serving as an on-delay device as shown by the dotted line in FIG. 2 is added to the monitoring circuit 10, and the output $S_{c2}$ from the off-delay circuit 15 is used for the excitation output for the relay Ry and the output $S_{c3}$ from the on-delay circuit 16 is supplied to the SC circuit 6 as the monitoring output Sc.

With such a construction, when the normality of the output Vo is verified, and $S_{c1}=1$ indicating that the output Vo is normal is generated from the AND circuit 14, then the output $S_{c2}=1$ is generated from the off-delay circuit 15 and the relay Ry is excited so that the contact point $r_a$ comes on. Therefore after the output $S_{c2}=1$ is generated from the off-delay circuit 15, Sc ($S_{c3}$)=1 is generated after lapse of the on-delay time of the on-delay circuit 16. Consequently, the output Vo can be generated by the switching operation of the switching element Tsw after the contact point $r_a$ comes on.

Incidentally, since during the interval from the contact point $r_a$ coming on until the output Vo is generated by the switching element Tsw, the output Vo limited by the limited output generating circuit 40 is also supplied to the load 5, then a drop occurs in the output Vo level. At this time, the situation is considered where due to the amount of drop in the level, the monitoring circuit 10 is judged to be abnormal so that the monitoring output becomes Sc=0. However, by providing the off-delay circuit 15, the erroneous operation attributable to this temporary level drop can be prevented.

That is to say, even though $S_{c1}=0$ results after the output $S_{c1}=1$ is generated from the AND circuit 14, $S_{c2}=S_{c3}=1$ continues during the off-delay time Tof1 of the off-delay circuit 15. Consequently, by setting the off-delay time Tof1 slightly longer than the expected continuous period of the temporary drop in the output Vo level due to the ON operation of the contact point $r_a$, this erroneous operation can be avoided.

Figure 8:
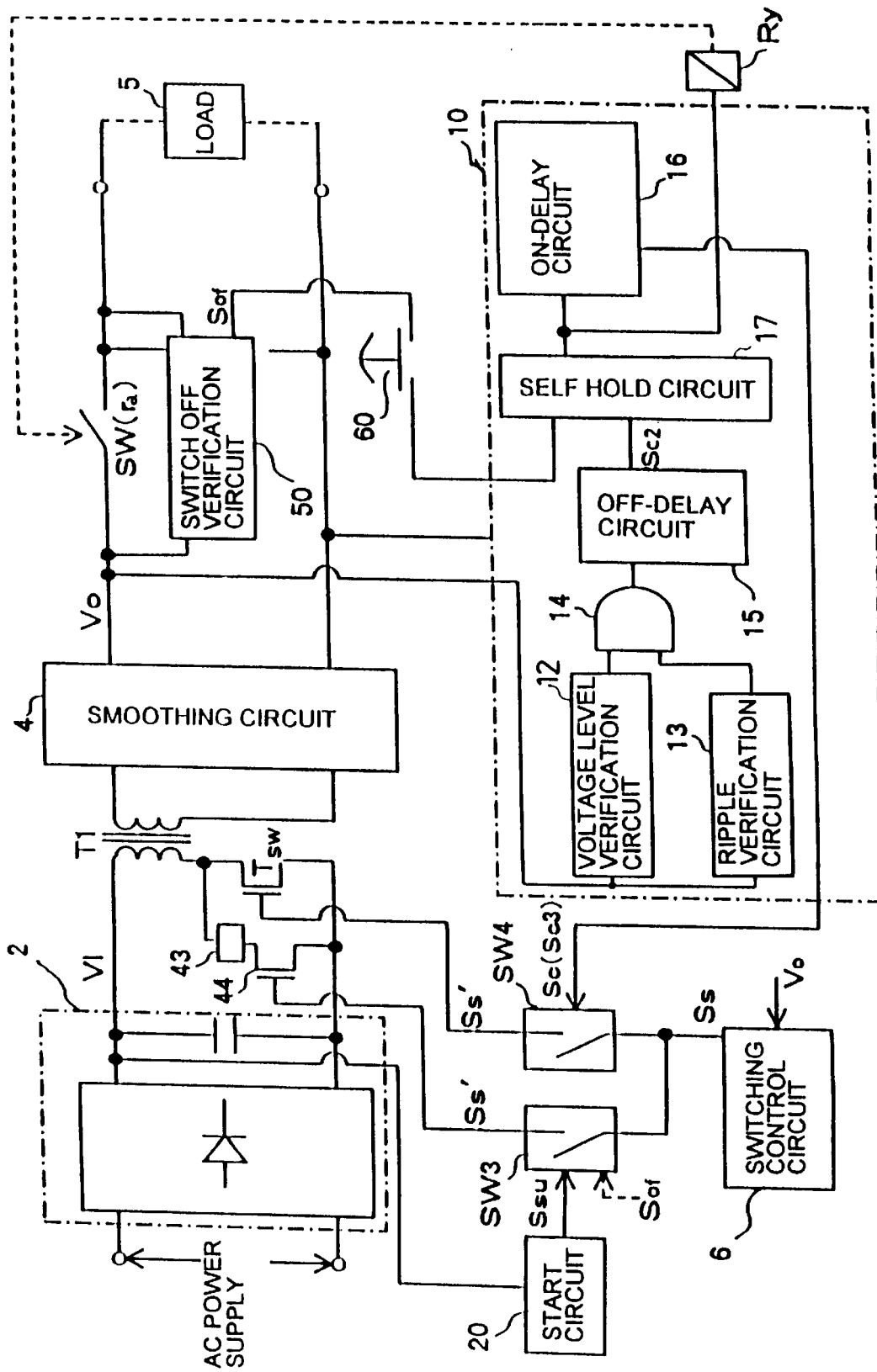
FIG. 8 is a schematic diagram of a fourth embodiment of a power supply unit according to the present invention applied to a DC switching power supply unit.

Next is a description of a fourth embodiment of a DC power supply unit according to the present invention with reference to FIG. 8.

The fourth embodiment is constructed so as to improve the follow-up characteristic of the limited output Vo at the time of start-up for the case where power consumption changes in the monitoring circuit 10 are large. Furthermore, a function is provided which can check for ON faults of the switch SW even under *conditions where the load 5 at start-up is close to no-load. Moreover, there is provided a function such that if a start command is not given from outside, Sc is fixed at Sc=0 and an output Vo is not generated, even with the occurrence of an output abnormality in the monitoring circuit 10 so that Sc=0 results after which the abnormality is restored.

In FIG. 8, with the power supply unit of the fourth embodiment, a series circuit of an output limiting impedance element 43 and a switch element 44 serving as a second switching element is connected in parallel with the switching element Tsw. Here, a construction can also be taken where a separate winding is provided in the primary side of the transformer T1, and the series circuit of the impedance element 43 and the switch element 44 is connected to this winding. The output Ss from the SC circuit 6 is respectively applied to the switching element Tsw and the switch element 44 as signals Ss' via a switch SW4 and a switch SW3 respectively provided in first and second signal supply paths. The switches SW3, SW4 are constructed so as to be drive controlled by the start signal Ssu from the start circuit 20 and the monitoring output Sc from the monitoring circuit 10, and may use relay contact points or be constructed as shown in FIG. 5(B).

Figure 9:
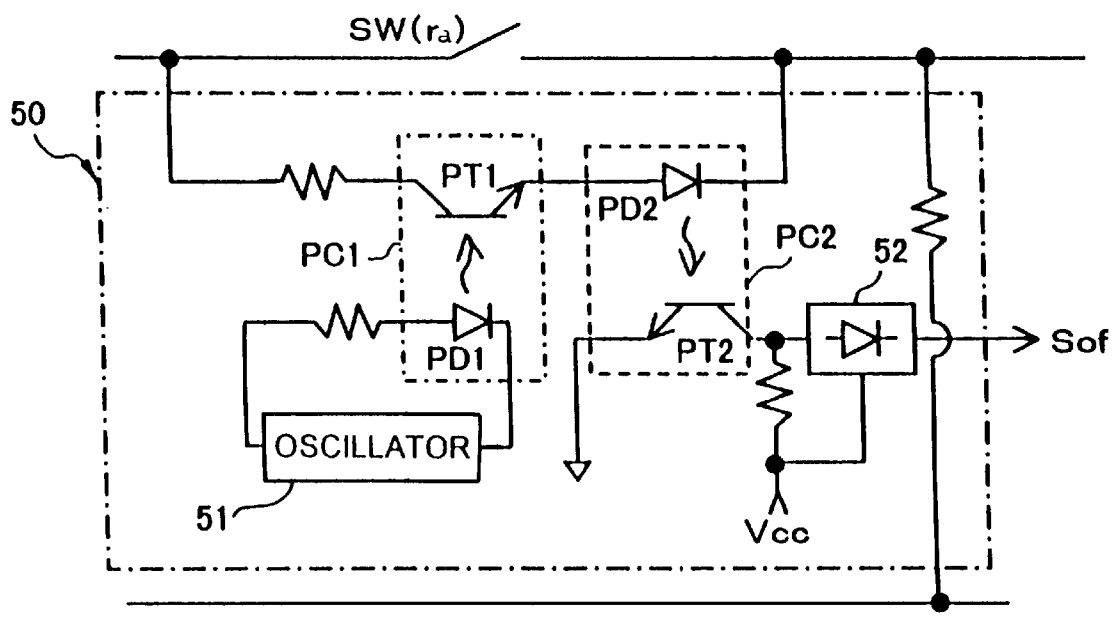
FIG. 9 is a diagram showing a structural example of a switch off verification circuit.

Moreover, a series circuit of a phototransistor PT1, a photodiode PD2 and a resistor, of a switch off verification circuit 50 shown in FIG. 9 is connected in parallel with a switch SW (with this embodiment this is a relay contact point $r_a$ the same as in FIG. 7) disposed in a supply path for the output Vo. Moreover, the construction is such that a self hold circuit 17 serving as a self hold device is provided in the monitoring circuit 10 with the output $S_{c2}$ from the off-delay circuit 15 input to the hold input terminal, and an output Sof from the switch off verification circuit 50 input to the trigger terminal, and an output from the self hold circuit 17 is input to the on-delay circuit 16 and the output $S_{c3}$ from the on-delay circuit 16 is supplied to the SC circuit 6 as the monitoring output Sc, and the relay Ry is excited by the output from the self hold circuit 17.

The switch off verification circuit 50 is constructed as shown in FIG. 9.

In FIG. 9, the switch off verification circuit 50 comprises an oscillator 51, two photocouplers PC1, PC2, and a rectifying circuit 52. The photocoupler PC1 comprises a photodiode PD1 connected to the oscillator 51 and the phototransistor PT1. The photocoupler PC2 comprises a photodiode PD2 connected in series with the phototransistor PT1 and a phototransistor PT2 connected to the rectifying circuit 52.

Next is a description of the operation.

At the time of start-up, the switch SW3 comes on with the start signal Ssu from the start circuit 20 and the control signal Ss from the SC circuit 6 is applied to the switch element 44 as Ss' so that an output Vo limited by the impedance element 43 is input to the monitoring circuit 10, and is also supplied to the switch off verification circuit 50. If the output Vo rises normally, then $S_{c2}=1$ is input from the off-delay circuit 15 to the hold input terminal of the self hold circuit 17 of the monitoring circuit 10 . Moreover, if the switch SW ($r_a$) is off, then a current flows in the series circuit of the photodiode PD2 and the phototransistor PT1 via the resistor. Since the phototransistor PT1 of the photocoupler PC1 is switched ON/OFF by the photodiode PD1 which is driven by the oscillator 51, then a switching current flows in the photodiode PD2. As a result, the phototransistor PT2 of the photocoupler PC2 is driven ON/OFF, and an off verification output Sof=1 is generated via the rectifying circuit 52. Under this condition, if a push button 60 is pushed on, an output is generated from the self hold circuit 17 so that the relay Ry is excited and the switch SW ($r_a$) comes on. After this, the switch SW4 comes on with the output from the on-delay circuit 16, and the output Vo is supplied to the load 5 based on the ON/OFF operation of the switching element Tsw.

If the push button 60 is off, then the trigger input to the self hold circuit 17 disappears, however Sc=1 continues while the output from the off-delay circuit 15 is $S_{c2}=1$. If at the time of start-up the switch SW ($r_a$) has an ON fault, then the output Sof=1 is not generated, and an output is not generated from the self hold circuit 17, and with the disappearance of the start signal Ssu the limited output Vo is stopped.

With such an embodiment, since the limited output Vo at the time of start-up is fed back to the SC circuit 6 and stabilized, then a constant stabilized limited output Vo which follows changes in the power consumption of the monitoring circuit 10 can be generated. Moreover, if the switch SW ($r_a$) comes on due to a fault, the output Sof=1 from the switch off verification circuit 50 is not generated and Sc=1 is not generated from the monitoring circuit 10. Therefore even in the case where the load 5 at the time of start-up is in a condition close to no load, the output Vo can be stopped, and also checking for ON faults of the switch SW ($r_a$) is possible.

Further, the switch off verification circuit 50 has a fail-safe construction in that at the time of a self fault, the output Sof=1 is not generated. Moreover, for the self hold circuit 17, fail-safe components as known for example from International Patent Publications WO94/23303 and WO94/23496 may be used.

Furthermore, with the present embodiment, when with an abnormality or the like in the output Vo, the output from the off-delay circuit 15 once becomes $S_{c2}=0$, then even if this is subsequently restored to $S_{c2}=1$, unless the trigger input is again applied by pressing the push button 60, an output is not generated from the self hold circuit 17. Accordingly, the construction is such that the abnormal occurrence is memorized in the monitoring circuit 10 so that stopping of the output can be continued.

Further, in the case where as with the present embodiment, the output Sof from the switch off verification circuit 50 is input to the monitoring circuit 10 via the push button 60, the output Sof may also be supplied directly to the switch SW3 as shown by the dotted line in FIG. 8.

With the construction where the switch SW3 is driven only by the start signal Ssu, the monitoring output Sc=1 is not generated if the push button 60 is not pressed. Therefore the push button 60 must be pressed within the period while the start signal Ssu=1. If the switch SW3 can also be driven by the output Sof, then since the switch SW is off until the monitoring output Sc=1 is generated, the output Sof=1 is generated and continues so that the switch SW3 remains in the ON condition, and the limited output Vo continues to be generated. If the push button 60 is pressed so that the monitoring output Sc=1 is generated, the switch SW comes on and the output Sof=0 results. However the switching element Tsw is switched based on Sc=1 so that the output Vo is generated.

The construction may be such that the push button 60 is not provided and the output Sof is input directly to the monitoring circuit 10. In this case, when the switch SW comes on with $S_{c2}=1$, Sof=1, the potential difference between the two terminals of the switch SW becomes zero. Hence a current no longer flows in the photodiode PD2, so that the phototransistor PT2 is fixed in the OFF condition, and Sof=0 results. As a result, the trigger input for the self hold circuit 17 disappears. However, due to the self hold function, the output from the self hold circuit 17 continues so that the output Vo can be generated.

Here, the input of the push button 60 is not limited to the output Sof. That is, the construction may be such that a different signal of a level the same as the level for Sof=1 is prepared and input via the push button 60 to one input terminal of a separately provided AND circuit, with the output Sof input to the other input terminal of the AND circuit, and the output from the AND circuit made the trigger input to the self hold circuit 17.

Incidentally, in FIG. 6 through FIG. 8, the power limited output is only produced during the period when the start signal Ssu=1 of the start circuit 20 is being produced. However, if it does not matter if the power limited output is supplied to the load 5, then the construction may be such that the power limited output is continually generated. For example, in the circuits of FIG. 6 and FIG. 7, the output Vx from the constant voltage power supply circuit 41 may be supplied as the drive power supply for the oscillator 45 instead of the start signal Ssu. In this case, the start circuit 20 may be omitted. Moreover, in the circuit of FIG. 8, the construction may be such that the control signal Ss from the SC circuit 6 is continually supplied to the switch element 44. In this case, the switch SW3 in addition to the start circuit 20 may also be omitted.

The operation of the circuit of FIG. 8 when constructed in this way will be briefly described hereunder.

When the input voltage VI is produced with switching on of the AC power supply, then with VI as the power supply, the SC circuit 6 outputs a control signal Ss to make the output Vo a predetermined value. The control signal Ss is applied to the switch element 44, and the switch element 44 is switched ON/OFF to produce a power limited output Vo. At this time, since the monitoring output is still Sc=0, then the switch SW4 is off and the switch SW ($r_a$) is also off so that the output Vo is only supplied to the monitoring circuit 10. When the monitoring circuit 10 verifies the normality of the output Vo and generates Sc=1, the switch SW4 comes on so that the control signal Ss is applied to the switching element Tsw as Ss', and at the same time the switch SW ($r_a$) comes on. As a result, an output Vo which has not been power limited is generated and supplied to the load 5. If the viewpoint is changed, this can also be understood that the insufficient power part of the power limited output generated with the ON/OFF switching of the switch element 44 is supplemented by the ON/OFF switching of the switching element Tsw.

When the output Vo becomes abnormal, the monitoring output Sc=0 results so that the switch SW4 goes off, the switch SW ($r_a$) also goes off and the output supply to the load 5 stops. However, after this also, provided that the output VI is being generated (that is provided that the AC power supply is being supplied), the switch element 44 is switched ONIOFF by the control signal Ss so that the power limited output Vo continues to be generated. If an ON fault occurs in the switch SW ($r_a$), this power limited output Vo continuously supplied. From this point, a construction is desirable where as mentioned before, the power limited output is stopped using the start circuit 20.

Figure 10:
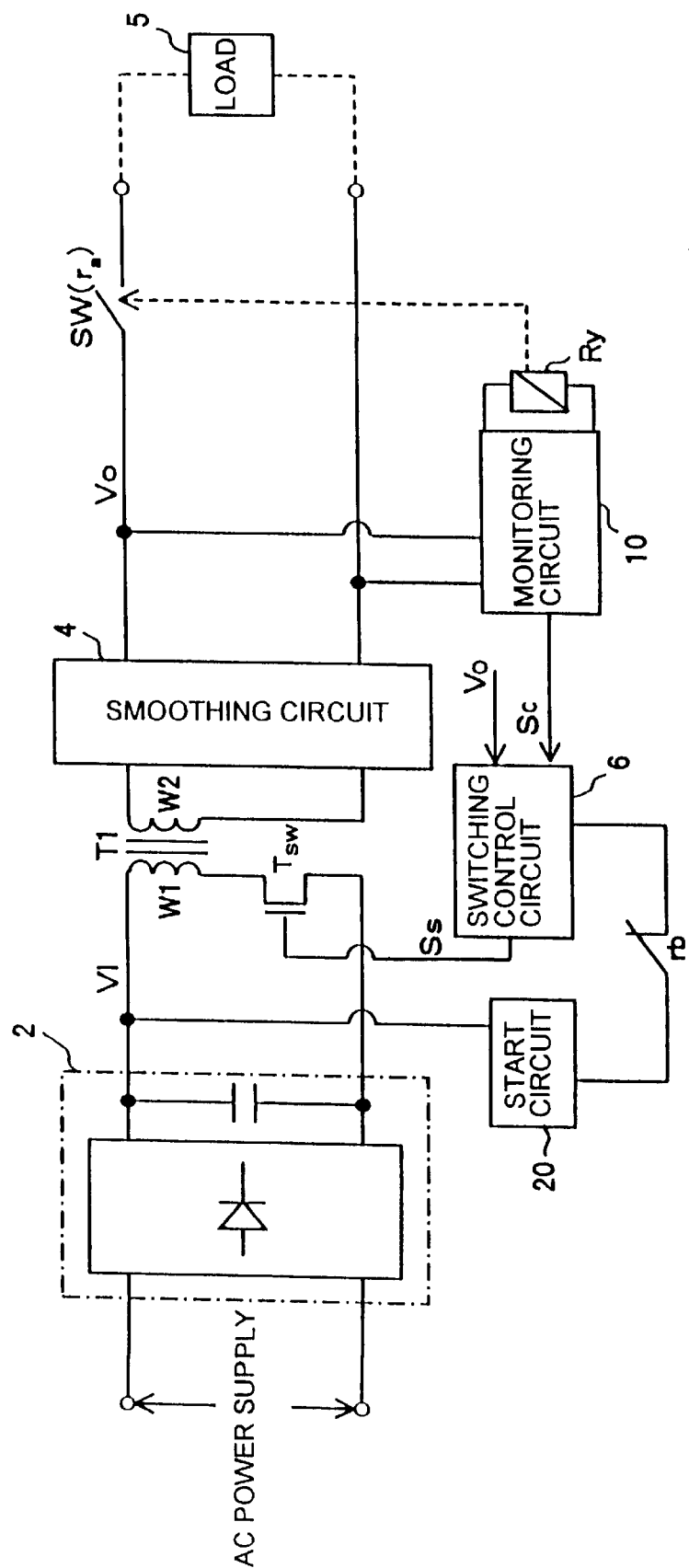
FIG. 10 is a schematic diagram of a fifth embodiment of a power supply unit according to the present invention applied to a DC switching power supply unit.

Next is a description of a fifth embodiment of a DC power supply with reference to FIG. 10.

With the power supply unit of this embodiment, the construction is such that relay contact points having a complementary relation with each other are used, and at the time of start-up, the supply of the output Vo to the load 5 is stopped until the output Vo becomes within a normal range, and when verified with the monitoring circuit 10 that the normal level has been reached, the supply of the start signal Ssu to the SC circuit 6 is interrupted.

In FIG. 10, the monitoring circuit 10, the SC circuit 6 and the start circuit 20 are constructed the same as for the first embodiment of FIG. 1. With this embodiment, a first contact point $r_a$ (corresponding to a switching device) of a relay Ry is disposed in the supply path for the output Vo, and a second contact point $r_b$ having a complementary relation to the first contact point $r_a$ is disposed in the supply line for the start signal Ssu. The relay Ry is excited with generation of the monitoring output Sc from the monitoring circuit 10.

The operation will now be described.

If at the time of start-up, the first contact point $r_a$ is off, since the second contact point $r_b$ is on, then as with the first embodiment of FIG. 1, the output Vo is generated with the generation of the start signal Ssu and input to the monitoring circuit 10. On the other hand the output Vo is not supplied to the load 5. When the output Vo reaches the normal level, an output Sc is generated from the monitoring circuit 10 and supplied to the relay Ry and the SC circuit 6. As a result, the relay Ry is excited so that the first contact point $r_a$ comes on and the output Vo is supplied to the load 5, and at the same time the second contact point $r_b$ goes off so that the supply of the start signal Ssu to the SC circuit 6 is interrupted. With the SC circuit 6, with input of the monitoring output Sc, the operation thereof continues so that the output Vo is continuously generated and supplied to the load 5.

If at the time of start-up the first contact point $r_a$ has an ON fault, since the second contact point $r_b$ is off, the start signal Ssu is not supplied to the SC circuit 6 so that the switching element Tsw is not operated and the output Vo is not generated.

With the present embodiment as described above, mutually complementary relay contact points $r_a$ and $r_b$ are used, and while verifying the OFF condition of the switch (contact point $r_a$) disposed in the supply path for the output Vo, the supply to the load 5 can be stopped until the output Vo becomes a normal level.

Figure 11:
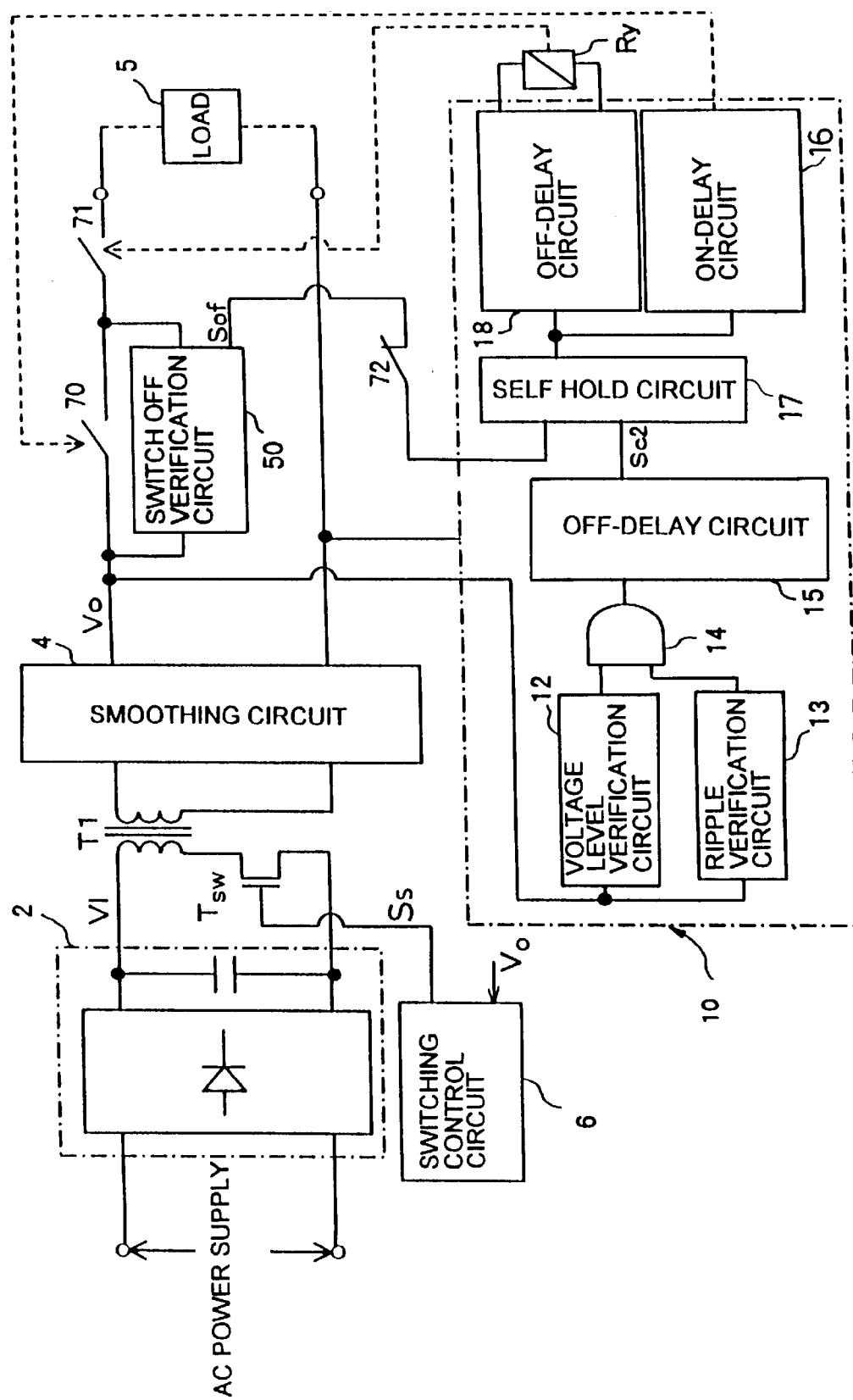
FIG. 11 is a schematic diagram of a sixth embodiment of a power supply unit according to the present invention applied to a DC switching power supply unit.

Next is a description of a sixth embodiment of a DC power supply with reference to FIG. 11.

The power supply unit of this embodiment is an example of where the interrupt function of the output Vo is a dual system construction.

In FIG. 11, with the power supply unit of this embodiment, the start circuit 20 is not provided, and while not shown in the figure, the output VI generated with the switching on of the AC power supply is made the control power supply for the SC circuit 6, and with the input of the output VI, the SC circuit 6 is driven so that a control output Ss is generated. First and second switches 70 and 71 constituting a switch device are disposed in series in the supply path for the output Vo. The series circuit of the phototransistor PT1, the photodiode PD2 and the resistor of the switch off verification circuit 50 shown in FIG. 9 is connected in parallel as with the embodiment of FIG. 8 to the first switch 70. The output Sof from the switch off verification circuit 50 is input via a third switch 72 to the trigger input terminal of the self hold circuit 17 of the monitoring circuit 10. The second switch 71 and the third switch 72 are relay contact points having a mutually complementary relation as mentioned with the embodiment of FIG. 10.

The monitoring circuit 10 has approximately the same construction as for the embodiment of FIG. 8. The different part is that there is newly provided an off-delay circuit 18 serving as a second off-delay device, and the output from the self hold circuit 17 is input to the off-delay circuit 18 and the on-delay circuit 16. Furthermore, the first switch 70 is drive controlled ON/OFF with the output from the on-delay circuit 16, and the relay Ry is excited by the output from the off-delay circuit 18. With this embodiment, the monitoring output Sc from the monitoring circuit 10 is not supplied to the SC circuit 6, and the outputs from the on-delay circuit 16 and the off-delay circuit 18 become the monitoring outputs. In particular, based on the fact that the output Vo is directly supplied/interrupted, then the output from the on-delay circuit 16 corresponds to the monitoring output Sc. Here a semiconductor switch or the like may be applied to the first switch 70.

Next is a description of the operation.

When the output VI is generated with the switching on of the AC power supply, while not shown in the figure, the SC circuit 6 with the output VI as the power supply is driven, and with the ON/OFF operation of the switching element Tsw, the output Vo is generated. The OFF of the first switch 70 is verified by the switch off verification circuit 50, while the OFF of the second switch 71 is verified by the ON condition of the third switch 72. If both switches 70 and 71 are switched off normally, Sof=1 is generated from the switch off verification circuit 50, and since the third switch 72 is in the ON condition, a trigger input signal is applied to the self hold circuit 17 of the monitoring circuit 10. If a normal range output Vo is generated, $S_{c2}$=1 from the off-delay circuit 15, being the first off-delay device, is applied to the self hold circuit 17 as a hold input signal. When an output is generated from the self hold circuit 17, the relay Ry is immediately excited by the off-delay circuit 18, so that the switch 71 comes on early. After this, with the lapse of the on-delay time of the on-delay circuit 16, the first switch 70 comes on so that the output Vo is supplied to the load 5.

If $S_{c2}$=0 results due to a fault or the like in the output Vo, the output from the self hold circuit 17 is stopped. In this case, the output from the on-delay circuit 16 immediately stopped and the first switch 70 goes off so that the load current is interrupted. After this, with the lapse of the off-delay time of the off-delay circuit 18, the second switch 71 goes off.

Here input of the switch 72 is not limited to the output Sof. That is, the construction may be such that a different signal of a level the same as the level for Sof=1 is prepared and input via the switch 72 to one input terminal of a separately provided AND circuit, with the output Sof input to the other input terminal of the AND circuit, and the output from the AND circuit made the trigger input to the self hold circuit 17.

With the construction of this embodiment, with the dual system for the interrupt function for the output Vo, the fail-safe characteristic such as when an abnormal output occurs, is even further improved. Moreover, since the second switch 71 which uses the relay contact point does not directly control the load current at normal times, there is practically no problem of a fusion fault of the contact point.

With the monitoring circuit 10 of the above described respective embodiments, the construction is such that the output Vo is directly monitored. However, the construction may be such that a signal of a level corresponding to the output Vo is monitored. Such a structural example is shown in FIGS. 12(A) and (B).

Figure 12A:
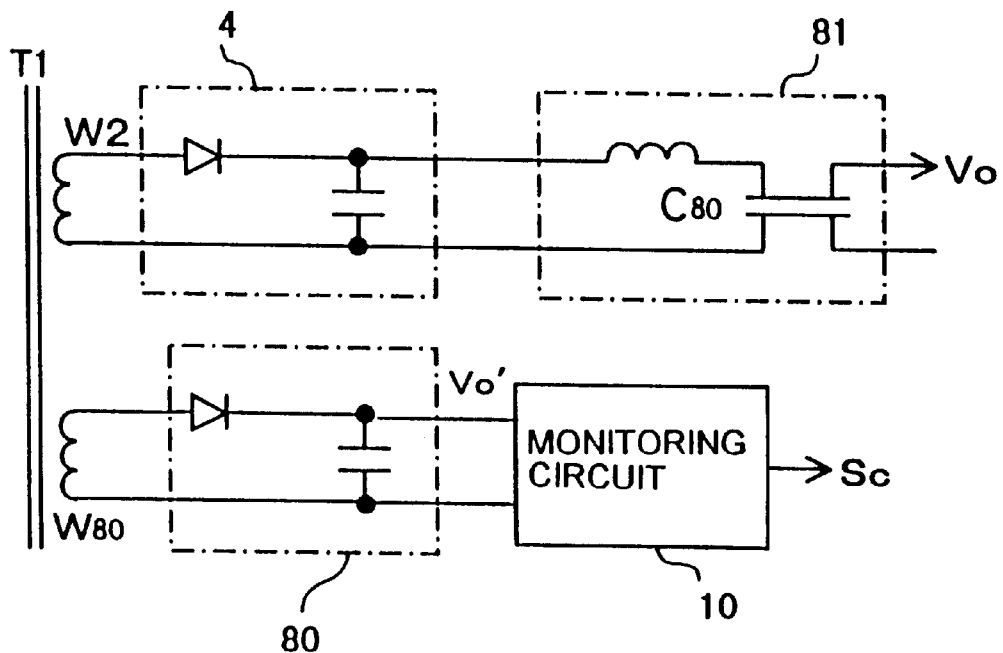
FIG. 12(A) is a diagram showing a structural example for monitoring a signal of a level corresponding to a monitoring output to thereby monitor the output.

In FIG. 12(A), the construction is such that a separate secondary winding $W_{so}$ is provided in the transformer T1 and an output Vo' from a smoothing circuit 80 is monitored by the monitoring circuit 10. In this case, a fault of the smoothing circuit 4 cannot be known. Since faults of the smoothing circuit 4 mainly increase the high frequency ripple level of the output Vo, then a filter 81 for removing this ripple may be provided as shown in the figure.

Moreover, if faults in the filter 81 are considered, a four-terminal capacitor $C_{80}$ as shown in the figure may be used. If the four-terminal capacitor $C_{80}$ has a disconnection fault, the circuit is broken, and hence the output Vo is stopped.

Figure 12B:
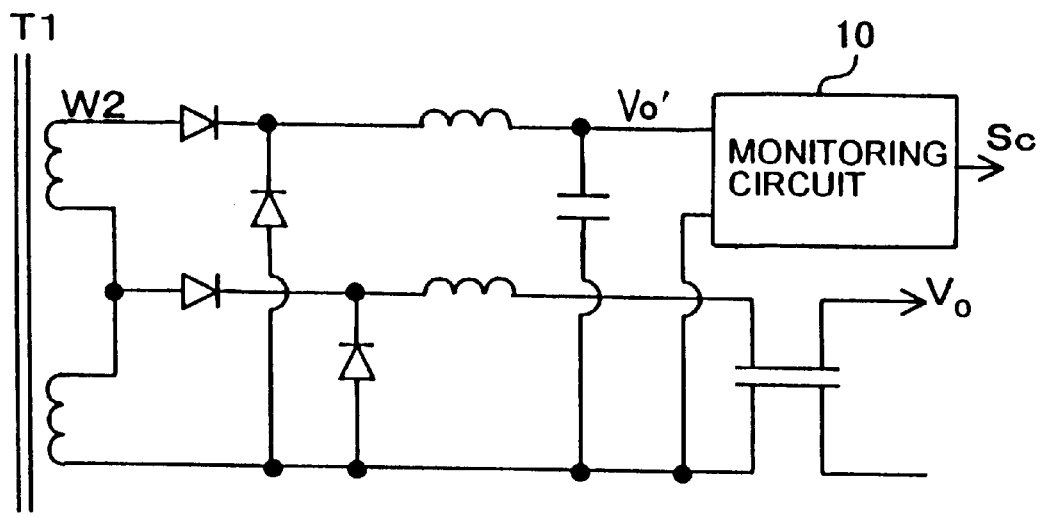
FIG. 12(B) is a diagram showing another structural example for monitoring a signal of a level corresponding to a monitoring output to thereby monitor the output.

With the construction of FIG. 12(B) it is not necessary to provide the separate secondary winding in the transformer T1, and a leader line from the same winding can be used for taking out the output Vo. Moreover, if as shown in the figure this is made a feed forward system, then a fail-safe filter can be constructed with the originally provided coil and capacitor.

Here in FIG. 12, if the monitoring circuit 10 incorporates a ripple verification circuit, then if the output Vo is input to the ripple verification circuit to verify the ripple level, the filter can be omitted. Alternatively, also with a construction where a ripple verification circuit is provided separate to the monitoring circuit 10 and the ripple of the output Vo is monitored, and this monitoring result and an output level monitoring result of the monitoring circuit 10 input to an AND circuit, then the filter can be omitted.

Needless to say, instead of the construction of the above-mentioned respective embodiments, the construction may be such that the various construction methods illustrated by the first through sixth respective embodiments are combined.

For example, the push button 60 shown in FIG. 8 may be used in other embodiments. In that case, a self hold circuit is provided in the monitoring circuit 10, and the hold input of the self hold circuit is made for example signal $S_{c2}$, and a signal of logic valued level is input as a trigger input via the push button. When the push button is pressed, then under $S_{c2}=1$, the output from the self hold circuit becomes a logic value 1, and the self hold circuit continues to give an output of logic value 1 regardless of the trigger input (that is regardless of the condition of the push button) while $S_{c2}=1$ continues. The output from the self hold circuit, in this case may be input to the part to which the output signal $S_{c2}$ from the off-delay circuit has been input in place of the output $S_{c2}$. In the case where the push button is used, then as mentioned before, there is the case where it is necessary to press the push button during the period when the start signal Ssu=1 is being generated. In order to overcome this limit to the push button operation, then as shown in FIG. 8, instead of inputting the start signal Ssu, the logical sum output of the output Sof from the switch off verification circuit and the start signal Ssu may be input. Alternatively, rather than the output Sof, the logical sum output of for example a hold input signal of the self hold circuit provided in the monitoring circuit and the start signal Ssu may be input. If this is done, then even after Ssu=1 disappears, since the hold input is a logic value 1 if up to that point in time normal has been verified, then the output Vo continues to be generated.

Moreover, the switch SW shown for example in FIG. 7 may also be applied to the embodiments of FIG. 1 or FIG. 6. By doing this, the supply of the output Vo to the load 5 can be more reliably controlled by the monitoring circuit. In this case, the switch off verification circuit shown in FIG. 9 can be applied as shown in FIG. 8. A separate self hold circuit is provided in the monitoring circuit, and the output Sof from the switch off verification circuit is made the trigger input of the self hold circuit similarly to as shown in FIG. 8, and for example the off-delay circuit output $S_{c2}$ of the monitoring circuit is made the hold input. The output from the self hold circuit, in this case, is input to the part to which the output $S_{c2}$ from the off-delay circuit has been input.

Moreover, on the contrary, for example with the embodiment of FIG. 8, the construction may be such that one or both of the push button and the switch off verification circuit is omitted. In the case where both are omitted, needless to say the self hold circuit inside the monitoring circuit can be omitted.

Similarly, with the embodiment of FIG. 11, a construction is also possible where either the first switch 70 or the second switch 71 is omitted.

Furthermore, for example, the construction may be such that the switching control of the switching element Tsw is carried out as with the construction in FIG. 1, by providing a start circuit 20 in the circuit of FIG. 11 and driving the SC circuit 6 by a start signal Ssufrom the start circuit 20 and the monitoring output Sc from the monitoring circuit 10. If this is done, then in the case where an abnormality is detected by the monitoring system, the switch of the output supply path is switched off by the monitoring output Sc=0 so that the power supply to the load 5 can be interrupted, and at the same time the switching of the switching element Tsw is stopped so that the output Vo can be stopped.

Incidentally, with the construction where a start circuit is used, as in FIG. 1, FIG. 6, FIG. 7, FIG. 8 and FIG. 10, then after the start signal becomes Ssu=0, if a drop of the output Vo occurring for example with a short circuit etc. of the load is regarded to be abnormal by the monitoring circuit, Sc=0 results and the output Vo is stopped. After this, even if the load short circuit is cancelled, the output Vo as such is not generated. That is, the construction is such that after an abnormality has once occurred so that the supply of the output Vo is stopped, then even if the abnormality is cancelled, the output Vo will not be automatically supplied. To again supply the output Vo, then for example it is necessary to once cut off the AC power supply and then switch on to thereby generate the start signal Ssu=1. However, with this method, there is the possibility of causing a deterioration in the components due to the influence of an inrush current accompanying the re-switching on of the AC power supply.

As a method of avoiding this, for example in the start circuit of FIG. 4, a switching device for interrupting the input VI may be added. For example, a normally closed switch is disposed in the VI supply path. After the output Vo is stopped due to detection of an abnormality, this switch is switched off so that the VI supply to the start circuit is stopped. If after cancelling the abnormality, the switch is switched on so that the VI is again supplied to the start circuit and the start signal Ssu=1 is generated, then the output Vo can be re-supplied without influence of the inrush current due to re-switching on of the AC power supply.

Moreover, in the case where as with the embodiment in FIG. 11, there is no start circuit, then a self hold circuit may be provided inside the monitoring circuit and a normally opened switch disposed in the supply path for the trigger signal. To describe this with the circuit of FIG. 11, a normally opened switch is disposed between the switch 72 and the trigger input terminal. If this is done, then by switching the normally opened switch on, an output is generated from the self hold circuit, and supply of the output Vo is commenced by the beforementioned operation. After the output Vo has stopped due to detection of an abnormality, when the abnormality has been cancelled and the output Vo is re-supplied, if the normally opened switch is switched on so that a signal of logic value 1 is input to the trigger input terminal, then with the AC power supply being supplied as such, the output Vo can be re-supplied.

Here such a switching device can be operated manually using a push button or the like, or may be remotely operated.

Figure 13:
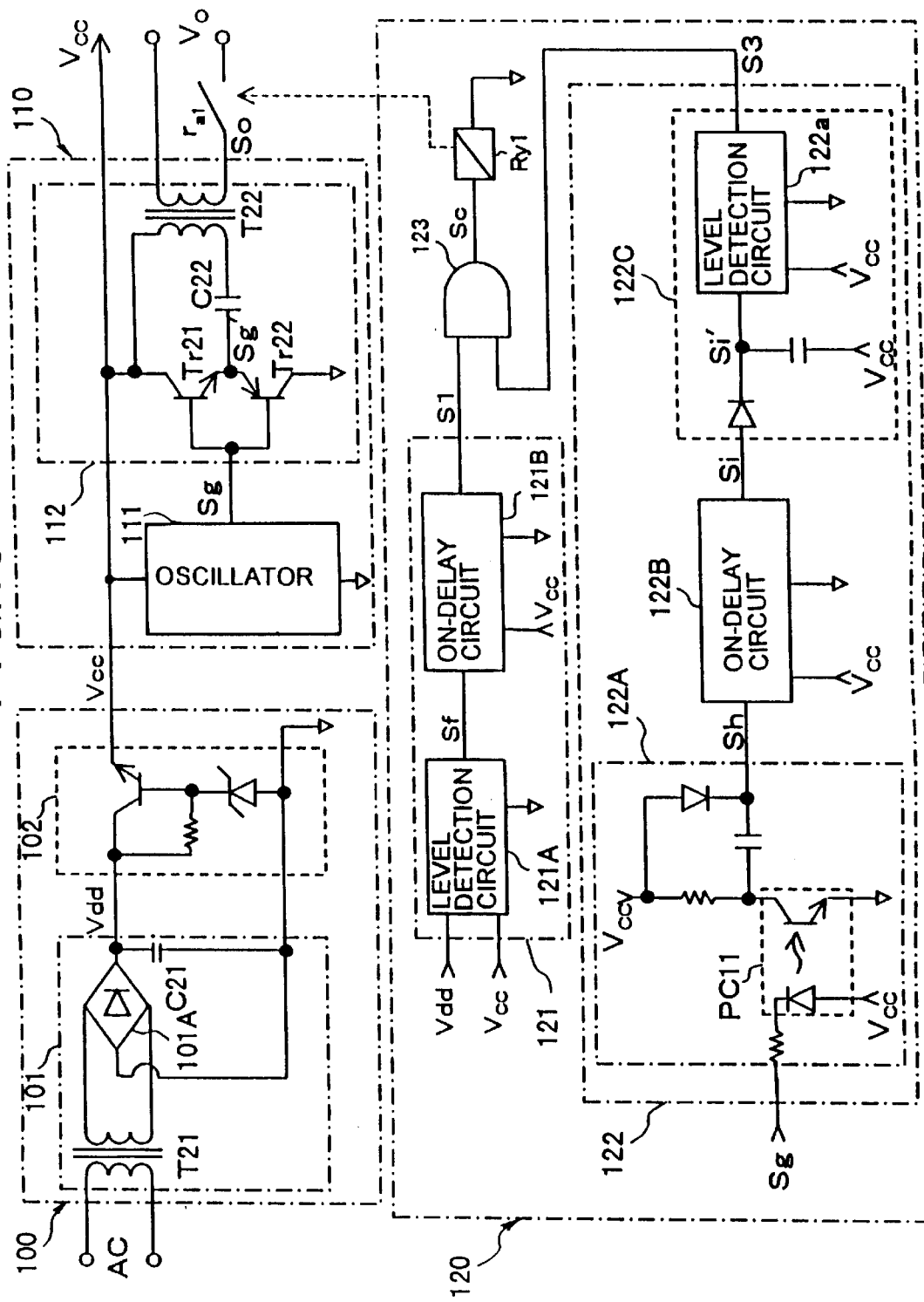
FIG. 13 is a schematic diagram of a first embodiment of a power supply unit according to the present invention applied to an AC power supply unit.

The same also applies for an AC power supply unit discussed hereunder referring to FIG. 13 and thereafter.

Next is a description of embodiments where the present invention is applied to an AC power supply unit.

FIG. 13 shows the construction of a first embodiment applied to an AC power supply unit.

In FIG. 13, the AC power supply unit of this embodiment comprises a constant voltage generating circuit 100 incorporating an AC/DC conversion circuit 101 and a constant voltage circuit 102, an output circuit 110 incorporating an oscillator 111 and a switch circuit 112, and a monitoring circuit 120 incorporating a voltage level verification circuit 121 serving as a level verification device, a frequency verification circuit 122, an AND circuit 123 serving as a logical product device, and an electromagnetic relay Ry1, and is constructed with a normally opened relay contact point $r_{a1}$ of the electromagnetic relay Ry1 disposed in series in the supply path for the output Vo from the output circuit 110. Here the relay contact point $r_{a1}$ corresponds to the switch device.

The AC/DC conversion circuit 101 of the constant voltage generating circuit 100 comprises a transformer T21, a rectifying circuit 101A and a capacitor C21, and converts the power supply voltage of the commercial alternating current (AC) to a DC voltage Vdd. The constant voltage circuit 102 comprises a resistor, a Zener diode and a transistor, and converts the DC output Vdd from the AC/DC conversion circuit 101 to a constant voltage Vcc. The output Vcc is supplied to the voltage level verification circuit 121 as a reference voltage for when verifying the output level by the monitoring circuit 120, and is used as a control power supply voltage for the output circuit 110 and the monitoring circuit 120.

The oscillator 111 of the output circuit 110 generates an AC signal Sg with the output Vcc as the power supply. The switch circuit 112 comprises an NPN transistor Tr21 and a PNP transistor Tr22 connected in series between the constant voltage Vcc and GND (earth) with the signal Sg respectively supplied to the base terminals, a capacitor C22 and a transformer T22, and receives the signal Sg and power amplifies this and supplies an AC output Vo to the load 5.

The voltage level verification circuit 121 of the monitoring circuit 120 comprises a level detection circuit 121A for verifying if the level of the output Vo is within a predetermined range, and an on-delay circuit 121B for generating an output S1 with a lapse of a predetermined on-delay time Ton11 from input of an output Sf from the level detection circuit 121A. Since the level detection circuit 121A of this embodiment has a circuit construction where the AC output Vo level depends on the output Vcc level, the construction is such as to verify if the output Vcc from the constant voltage circuit 102 is within the normal range. More specifically, the level detection circuit 121A receives the output Vdd from the AC/DC conversion circuit 101 which is input to the constant voltage circuit 102, and regards this to be normal when the difference between the output Vdd and the output Vcc are within a predetermined range. The level detection circuit 121A, with the output Vcc as a reference has a lower limit threshold value VtL11 of a higher level than this and an upper limit threshold value VtH11, and the output Sf=1 is only generated when the output Vdd is in the range VtL11≦Vdd≦VtH11. If a fault occurs in the constant voltage circuit 102 so that the output Vcc increases and the difference between the output Vdd and the output Vcc becomes smaller than the lower limit threshold value VtL11, then Sf=0 results so that the abnormality in the voltage level can be detected. Moreover, also if the output Vcc drops so that the difference between the output Vdd and the output Vcc becomes greater than the upper limit threshold value VtH11, Sf=0 results so that the abnormality can be detected.

The frequency verification circuit 122 of this embodiment detects the pulse width of the signal corresponding to the power supply output to verify the frequency, and incorporates a level conversion circuit 122A, an on-delay circuit 122B and an off-delay circuit 122C. Since the frequency of the output Vo is dependent on the signal Sg of the oscillator 111, the normality/abnormality of the frequency of the output Vo is verified by the frequency of the signal Sg. The level conversion circuit 122A has a photocoupler PC11, and converts the signal Sg being a signal within the power supply frame (GND≦Sg level≦Vcc) to a signal Sh outside of the power supply frame (Vcc<Sh level). The on-delay circuit 122B has an on-delay time Ton12. The on-delay time Ton12 is set to be shorter than the continuous time where Sh=1 for when the signal Sg is a normal frequency. Consequently, when the frequency of the signal Sg is normal, Si=1 is generated for each Sh=1. The off-delay circuit 122C has an off-delay time Tof11. With the input of Si=1, S3=1 is generated from a level detection circuit 122a, and with Si=0 then after lapse of the off-delay time Tof11, S3=0 results. Since the off-delay time Tof11 is set to be longer than the period for where Si=0 when the signal Sg is a normal frequency, then if the frequency is normal, S3=1 is continuously generated.

The AND circuit 123 takes the output S1 from the voltage level verification circuit 121 and the output S3 from the frequency verification circuit 122, and when Si=1 and S3=1, generates a monitoring output Sc=1 to thereby excite the relay Ry1. As a result, the relay contact point $r_{a1}$ comes on and the AC output Vo is supplied to the load 5.

Figure 14:
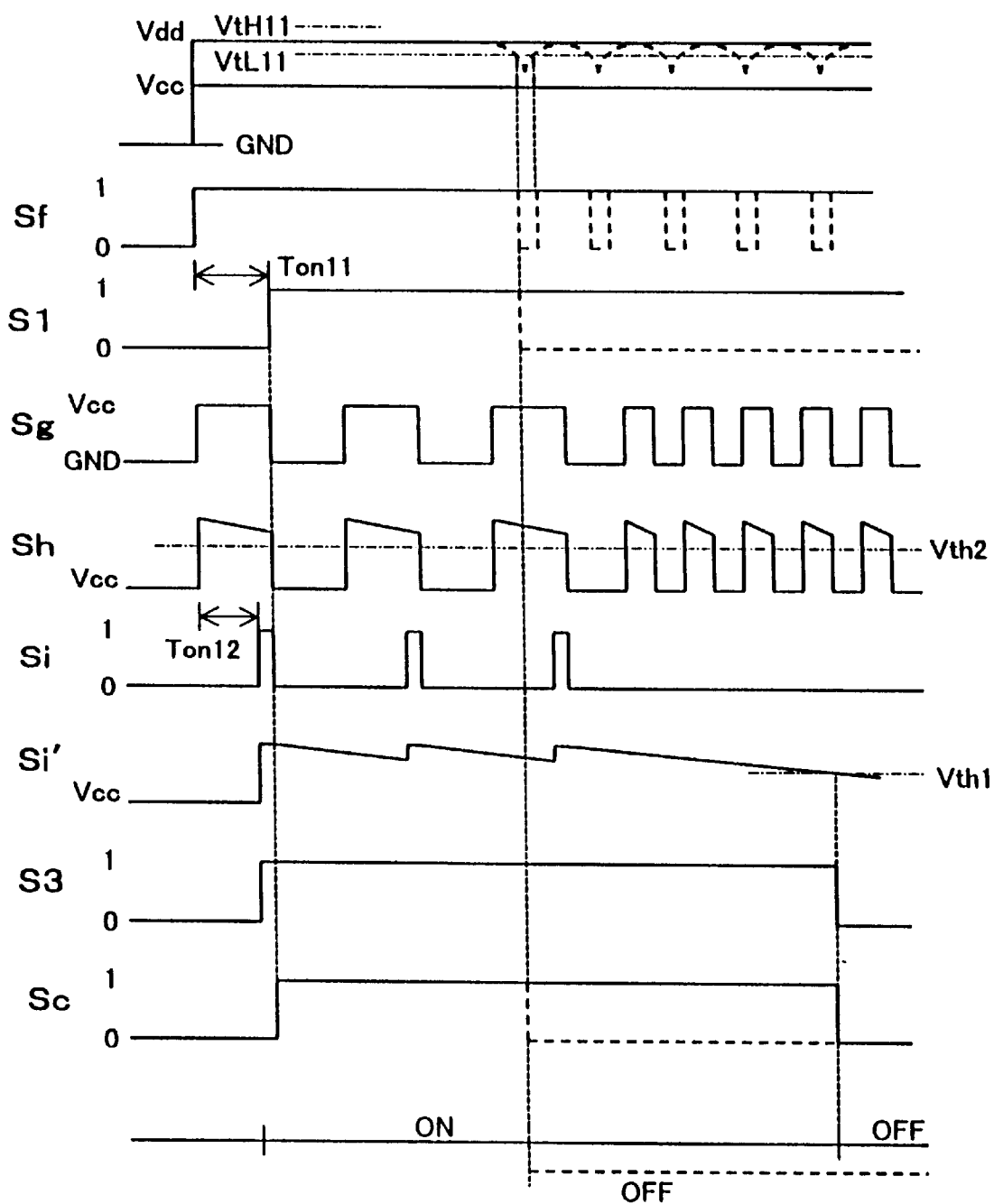
FIG. 14 is an operational time chart for the first embodiment.

Hereunder is a description of the operation of the present embodiment based on the operational time chart of FIG. 14.

When the AC power supply is switched on and input to the constant voltage generating circuit 100, a DC output Vdd is generated from the AC/DC conversion circuit 101, and a constant voltage Vcc is generated from the constant voltage circuit 102. With the generation of the output Vcc, a signal Sg is generated from the oscillator 111 of the output circuit 110, and with the ON/OFF operation of the transistors Tr21, Tr22 of the switch circuit 112, an AC current is supplied to the primary side of the transformer T22.

The abovementioned generated respective outputs Vdd, Vcc and Sg are input to the monitoring circuit 120. The outputs Vdd and Vcc are input to the voltage level verification circuit 121 and if the level difference between the outputs Vdd and Vcc is within a predetermined range, that is the output Vdd is within the range VtL11≦Vdd≦VtH11, then Sf=1 is generated from the level detection circuit 121A and input to the on-delay circuit 121B. If Sf=1 continues for the on-delay time Ton11 or more, then S1=1 is generated from the on-delay circuit 121B and input to one of the input terminals of the AND circuit 123.

Here the on-delay circuit 121B is provided in consideration of a fault in the AC/DC conversion circuit 101. If a disconnection fault occurs in the smoothing capacitor C21 of the AC/DC conversion circuit 101, a pulsating current of the AC power supply frequency occurs in the output Vdd as shown by the dashed line in FIG. 14. If due to the pulsating current of the output Vdd, the difference between the output Vdd and the output Vcc periodically becomes less than VtL11, then each time Sf=0 results as shown by the dashed line in FIG. 14. Consequently, if the on-delay time Ton11 is made longer than this interval, then in the case where a pulsating current occurs, the output S1 from the on-delay circuit 121B will be fixed at S1=0 as shown by the dashed line in the figure, and the output from the AND circuit 123 becomes Sc=0 so that the contact point $r_{a1}$ of the relay Ry1 goes off, thus stopping the supply of the output Vo.

If such a fault in the AC/DC conversion circuit 101 is not considered, then the on-delay circuit 121B can be omitted, and the output Sf from the level detection circuit 121A can be input to the AND circuit 123 as the output S1 from the voltage level verification circuit 121. Furthermore, also in the case where instead of the commercial AC power supply, a DC power supply is used as the power supply to the present power supply unit, the AC/DC conversion circuit 101 can be omitted, and hence the on-delay circuit 121B can be omitted.

On the other hand, the signal Sg from the oscillator 111 is input to the level conversion circuit 122A of the frequency verification circuit 122 and level converted to an output Sh of a higher level than the voltage Vcc, and input to the on-delay circuit 122B. If the frequency of the signal Sg is normal, then Sh=1 continues for the on-delay time Ton12 or more. Consequently, as shown in the figure, Si=1 is intermittently generated from the on-delay circuit 122B. The output Si=1 from the on-delay circuit 122B is input to the off-delay circuit 122C. If the frequency is normal, then the period for Si=0 is shorter than the off-delay time Tof11 of the off-delay circuit 122C, and as shown in the figure the level of the input signal Si' to the level detection circuit 122$a$ continues at the condition equal to or above the lower limit threshold value Vth1 of the level detection circuit 122$a$ so that the output S3=1 continues and is input to the other input terminal of the AND circuit 123.

Consequently, if the voltage level and the frequency are both normal, then Sc=1 is generated from the AND circuit 123 so that the relay Ry1 is excited and the contact point $r_1$ thereof comes on, so that a normal AC output Vo within a predetermined range is supplied from the output circuit 110 to the load 5.

When a frequency abnormality, for example a frequency increasing fault of the signal Sg occurs, then if the continuous time for the output Sh=1 from the level conversion circuit 122A becomes shorter, so that this continuous time becomes shorter than the on-delay time Ton12, then the output from the on-delay circuit 122B is fixed at Si=0. The output S3 from the off-delay circuit 122C becomes S3=0 at the latest after lapse of the off-delay time Tof1 from when Si=0 results, so that the abnormality is notified.

There are many cases where a frequency drop of the signal Sg is not a safety problem. With the present embodiment however, if the frequency of the signal Sg drops so that the period of the output Si=0 from the on-delay circuit 122B exceeds the off-delay time Tof11, then S3=0 results so that the abnormality is notified. In this case, since S3=1 is intermittently produced, then if the construction is such that an on-delay circuit is provided at a subsequent stage to the off-delay circuit 122C, and the output S3 is input to this on-delay circuit, and the output from the on-delay circuit is input to the AND circuit 123 as an output from the frequency verification circuit 122, then the output from the frequency verification circuit 122 can be fixed at logic value 0.

With the present embodiment as shown in FIG. 13, the level conversion circuit 122A is provided since the construction is such that the on-delay circuit 122B has a lower limit threshold value Vth2, which is of a higher level than the power supply Vcc with respect to the input signal Sh. However if this is not the case then the level conversion circuit 122A is not necessarily required.

Furthermore, with the level conversion circuit 122A of the present embodiment, the construction is such that the signal Sg is transmitted as the output Sh by the photocoupler PC11. This is so that Sh=1 will not be generated in the case where the frequency of the signal Sg, due to a fault in the oscillator 111, becomes a high frequency to which the on-delay circuit 122B cannot respond. More specifically, the response frequency of the photocoupler PC11 can be adjusted by selecting the received signal load resistance value of the photocoupler PC11, so that the phototransistor of the photocoupler PC11 is fixed in the ON condition when a signal of a frequency exceeding the response frequency is input. Such a technique is already known from Japanese Unexamined Patent Publication No. 7-66629. In the case where there is no limit on the response frequency of the on-delay circuit 122B, there is no longer the need to use the photocoupler PC11.

Moreover, in the case where the photocoupler PC11 cannot respond to the frequency of the signal Sg at normal times, the signal Sg can be frequency divided and input to the level conversion circuit 122A.

With the present embodiment, the signal Sg is used in verifying the frequency. However for example the signal Sg' in the switch circuit 112 or the secondary side output So of the transformer T22 may be used.

Figure 15:
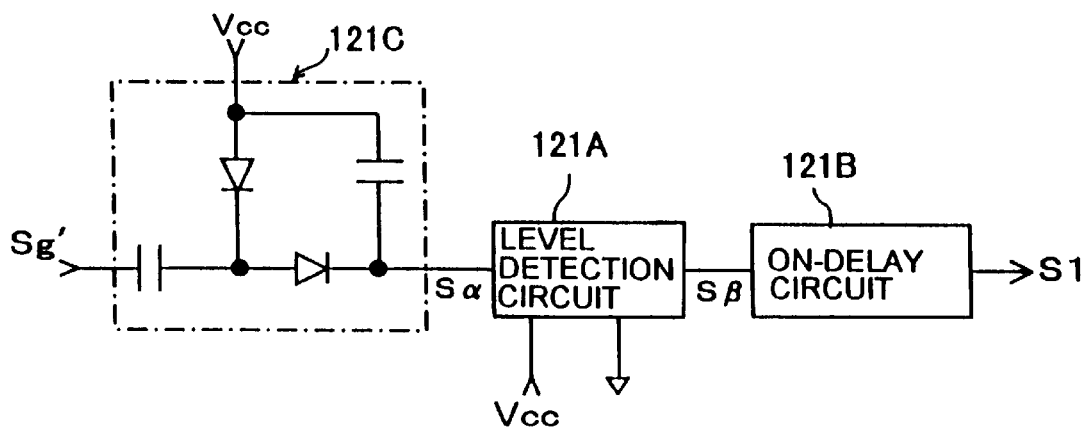
FIG. 15 is a diagram showing another structural example of a voltage level verification circuit.
Figure 16:
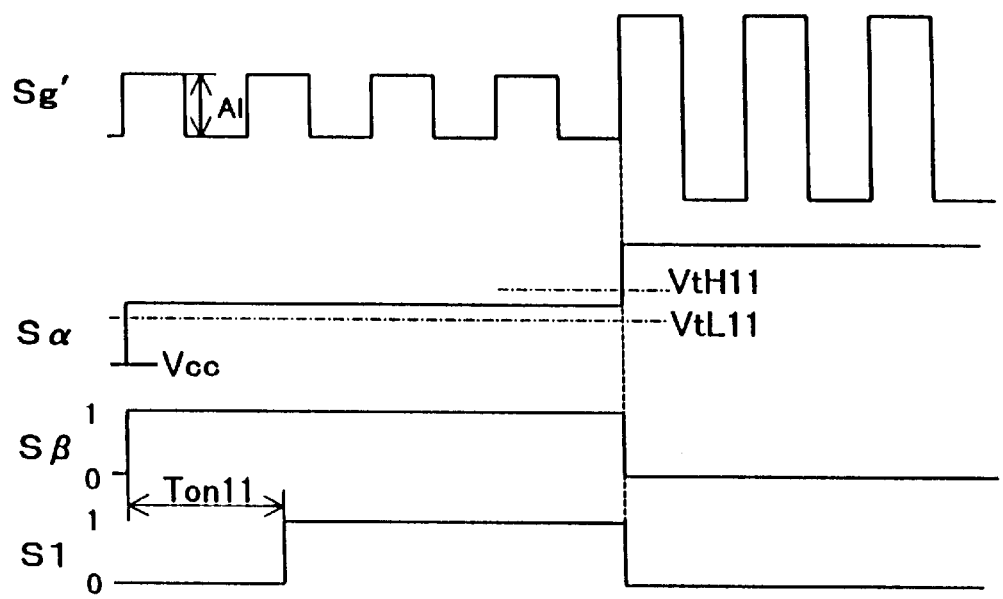
FIG. 16 is an operational time chart for the voltage level verification circuit of FIG. 15.

Next is a description of another structural example of the voltage level verification circuit 121 shown in FIG. 15, based on the operational time chart of FIG. 16. Since the basic components are the same as those of the embodiment of FIG. 13 then only the main parts are shown in FIG. 15.

With the voltage level verification circuit 121 of this embodiment, the construction is such that the voltage level is verified using the signal Sg' in the switch circuit 112.

In FIG. 15, the signal Sg' is input to an AC/DC conversion circuit 121C and converted to a DC output Sα of a level approximately proportional to the AC amplitude of the signal Sg'. The output Sx is input to the level detection circuit 121A and the level detected. The level detection circuit 121A, as shown in FIG. 16, has a lower limit threshold value VtL11 and an upper limit threshold value VtH11. With the signal Sg' at normal times, VtL11≦Sα≦VtH11, and an output Sβ=1 is generated. The output Sβ is input to the on-delay circuit 121B and when the output Sβ=1 continues for the on-delay time Ton11 or more, S1=1 is generated.

With this embodiment circuit, if for example as shown in FIG. 16, the AC amplitude Al of the signal Sg' is increased, then the level of the DC output Sα is also increased. If the level of the output Sα exceeds VtH11, then Sβ=0 results and the abnormality is thus detected.

Moreover, in the case where a fault occurs in the constant voltage circuit 102 shown in FIG. 13 so that the output Vcc increases, if the lower limit threshold value VtL11 and the upper limit threshold value VtH11 of the level detection circuit 121A are constant regardless of the output Vcc, then an increase of the signal Sg' due to an increase of the output Vcc can be detected. Furthermore, since an amplitude change of the signal Sg' occurring due to a smoothing fault of the AC/DC conversion circuit 101 of FIG. 13 appears as a level change in the output Sα, then by the frequency of the AC power supply, each time the level of the output Sα falls outside of the upper and lower limit threshold values, Sβ=0 is produced. Therefore if the on-delay time Ton11 of the on-delay circuit 121B is set longer than the generation interval for Sβ=0 at this time, the abnormality of the signal Sg' due to the smoothing abnormality can be notified.

If as with the present embodiment a construction for monitoring the signal Sg' is used, then the primary side AC level of the transformer T22 of the switch circuit 112 can be directly verified. Therefore, this is effective for example in cases such as where the power supply to the switch circuit 112 is adjusted to obtain a constant output.

Figure 17:
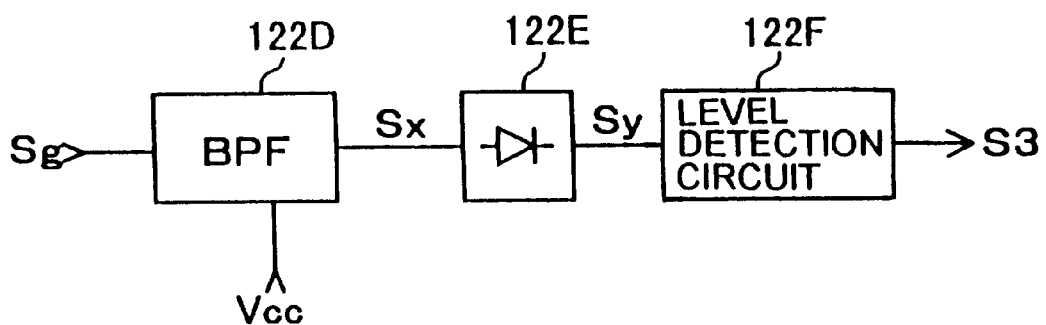
FIG. 17 is a diagram showing another structural example of a frequency verification circuit.
Figure 18:
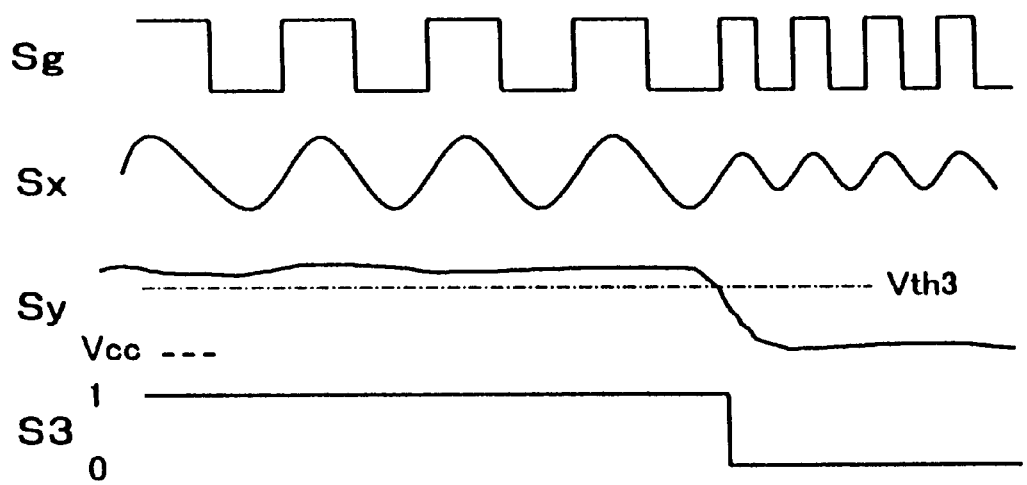
FIG. 18 is an operational time chart for the frequency verification circuit of FIG. 17.

Next is a description of another structural example of the frequency verification circuit 122 shown in FIG. 17, based on the operational time chart of FIG. 18. Since the basic components are the same as those of the embodiment of FIG. 13 then only the main parts are shown in FIG. 17.

In FIG. 17, with this embodiment circuit, with a construction for verifying the frequency of the signal Sg as in FIG. 13, a band-pass filter 122D has a central frequency thereof made the frequency of the signal Sg at normal times. If normal, the signal Sg passes through the band-pass filter 122D and is transmitted as an output Sx, and then rectified by a rectifying circuit 122E to produce an output Sy. A level detection circuit 122F has a lower limit threshold value Vth3, and when the frequency of the signal Sg is normal, the output Sy becomes Sy≧Vth3 and S3=1 is generated. If the frequency of the signal Sg becomes different from at abnormal times, the attenuation in the band-pass filter 122D is increased so that as shown in FIG. 18, the level of the output Sx drops and the level of the output Sy also drops. If to the extent that the frequency of the signal Sg differs from that at normal times the level of the output Sy drops and the Sy level becomes less than the lower limit threshold value Vth3, then an output S3=0 results notifying of the frequency abnormality.

Figure 19:
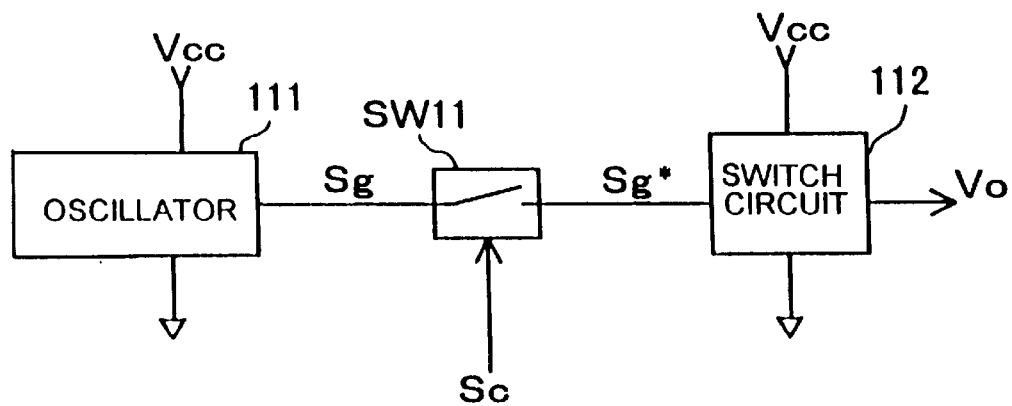
FIG. 19 is an essential parts schematic diagram illustrating a structural example for verifying that an output level is normal and generating an output, in another embodiment of a power supply unit according to the present invention applied to an AC power supply unit.

Next, structural examples of embodiments which produce an output Vo only when verified by the verification circuit that the output level is within a normal range, are shown in FIG. 19 and FIG. 20.

The structure of each embodiment other than that shown in FIG. 19 and FIG. 20, is substantially the same as for the embodiment of FIG. 13, and is thus omitted. In the figures, components the same as those of the embodiment of FIG. 13 are denoted by the same reference symbols.

With the embodiment of FIG. 9 the construction is such that a switch SW11 which is ON/OFF controlled by the monitoring output Sc from the AND circuit 123 of the monitoring circuit 120, is disposed between the oscillator 111 and the switch circuit 112 of the output circuit 110.

With such a construction, at normal times, the switch SW11 is switched on by the monitoring output Sc=1 from the monitoring circuit 120, and the signal Sg is transmitted to the switch circuit 112 as a signal Sg*, so that an AC output Vo is generated from the output circuit 110. At the time of an abnormality, the monitoring output becomes Sc=0 so that the switch SW11 goes off and the signal Sg is not transmitted to the switch circuit 112 so that the AC output Vo from the output circuit 110 is stopped.

Moreover, with the embodiment of FIG. 20, the construction is such that the start circuit 20 shown in FIG. 1 is provided, and the start signal Ssu and the monitoring output Sc are input to an OR circuit 130, and the switch SW11 is ON/OFF controlled by the logical sum output from the OR circuit 130.

With such a construction, when the start signal Ssu=1 is generated, the signal Sg is transmitted to the switch circuit 112 as the signal Sg* so that an AC output Vo is generated from the output circuit 110. The start signal Ssu=1 is generated for a predetermined time only from after start-up, and if during the period while Ssu=1 is being generated the monitoring output Sc=1 is generated from the monitoring circuit 120, then the AC output Vo continues to be generated. However, if a fault is detected in the monitoring circuit 120 so that Sc=1 does not result, then when the start signal becomes Ssu=0, the AC output Vo from the output circuit 110 is stopped.

The construction of FIG. 20 is effective for at the time of a construction where the monitoring circuit 120 performs normal/abnormal judgment by inputting a signal (for example signal Sg' or signal So) which is cancelled with the off operation of the switch SW11.

VWith these embodiments, the contact point $r_{a1}$ of the output supply path may be omitted. Moreover, for the switch SW11, a relay contact point as used in FIG. 5 (A) may be used, or the circuit structure of FIG. 5(B) is also possible. In the case where the circuit of FIG. 5(B) is applied, then Ss of FIG. 5 corresponds to Sg, and Ss' corresponds to Sg*.

While not shown in the figure, a construction such as where supply of the power supply Vcc for the switch circuit 112 is controlled by the monitoring output Sc=1 is also possible.

Furthermore, as shown with the embodiments for the DC power supply unit, a construction which generates a power limited output can be applied.

Figure 21:
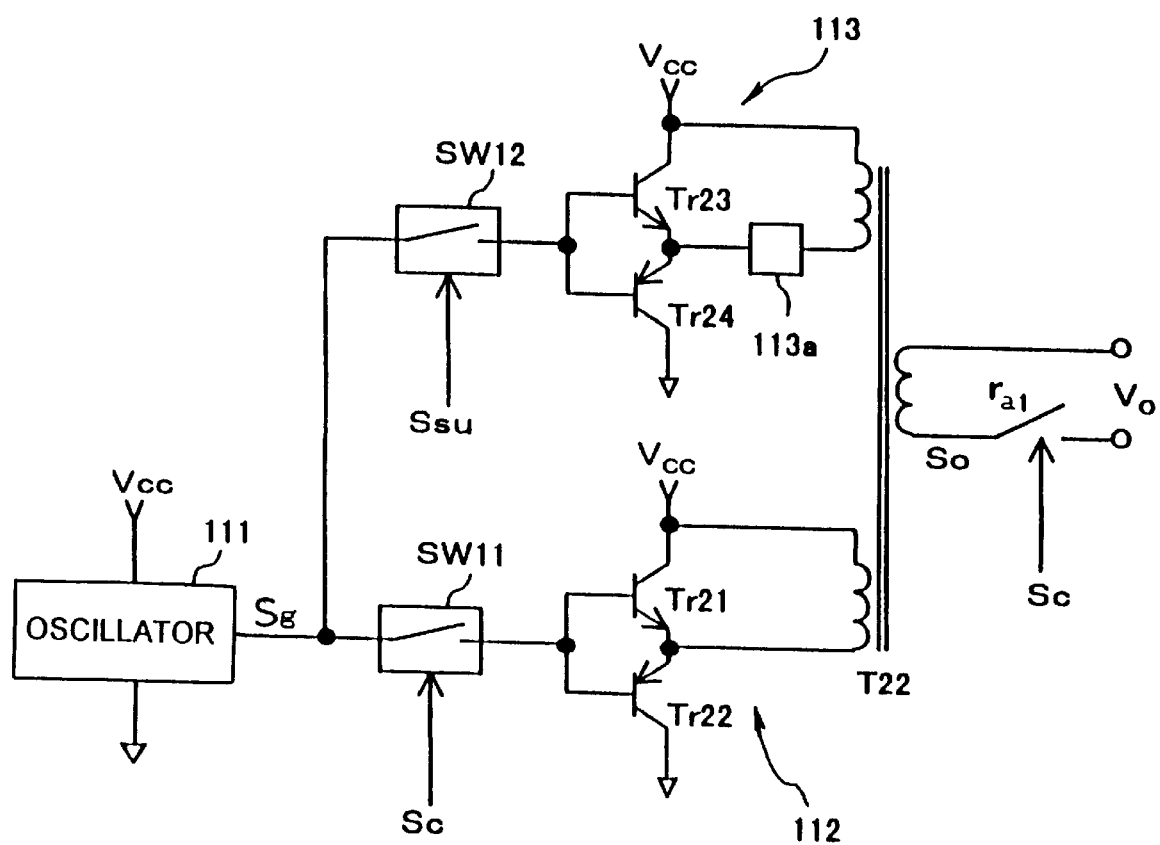
FIG. 21 is an essential parts schematic diagram of another embodiment of a power supply unit according to the present invention applied to an AC power supply unit.

For example, as shown in FIG. 21, a switch circuit 113 is provided as a limited output generating circuit for generating a power limited AC output. The switch circuit 113 comprises an NPN transistor Tr23 and a PNP transistor Tr24 connected in series between a constant voltage Vcc and GND (earth), and a power limiting impedance device 113a connected in series to a separately provided primary winding in the transformer T22 which is common with the switch circuit 112. The signal Sg is supplied to the switch circuit 112 via the switch SW11, and the signal Sg is supplied to the switch circuit 113 via a switch SW12. The construction is such that the switch SW11 is controlled by the monitoring output Sc and the switch SW12 is controlled by the start signal Ssu. Other construction is the same as for the embodiment of FIG. 13.

With the operation in this case, when the start signal Ssu=1 is generated, the switch SW12 comes on, and with the supply of the signal Sg, a signal So which is power limited but with a level and frequency within the normal range is generated from the switch circuit 113. If the monitoring circuit 120 verifies that this signal So is normal, then Sc=1 is generated so that the contact point $r_{a1}$ comes on, and at the same time the SW11 comes on to thus drive the switch circuit 112. As a result, an AC output So for which the power is not limited, is produced and supplied to the load. If Sc=1 is produced before the start signal becomes Ssu=0, then the output So continues to be supplied to the load.

The construction of other embodiments of the power limited DC power supply unit can also be used in the AC power supply unit.

If the construction is such that a continuously generated signal of a level corresponding to the start signal Ssu=1 is supplied to the switch SW12, then the power limited output also continues to be generated after Sc=1 is produced. This case, as mentioned before, corresponds to the construction where insufficient power is supplemented by the generation of Sc=1.

If as with the DC power supply unit, a self hold circuit is provided in the monitoring circuit, with the signal Sc made the hold input, the output from the push button made the trigger input and the output from the self hold circuit made the monitoring output, then a construction is possible where a push button is used with the ON operation of the push button as the trigger so that the output So is supplied to the load. For example, in the case of FIG. 13, the output from the self hold circuit is supplied to the relay Ry1. Moreover, with the construction of FIG. 21, preferably the output from the self hold circuit is in addition also supplied to the switch SW11.

Figure 22:
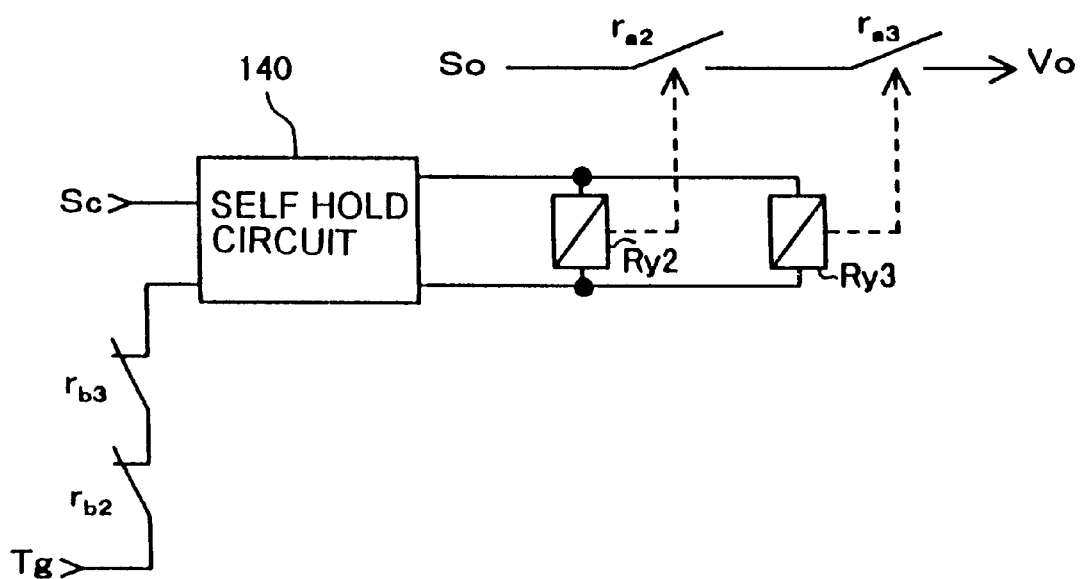
FIG. 22 is an essential parts schematic diagram of another embodiment of a power supply unit according to the present invention applied to an AC power supply

With the construction of the first embodiment of FIG. 13, an ON fault of the contact point $r_{a1}$ cannot be detected. Moreover, at the time of this ON fault the output Vo cannot be interrupted. In FIG. 22 is shown an embodiment having a construction where a function for detecting such a fault and shutting off the output Vo, is added to the first embodiment of FIG. 13. Here only the parts different from those of the first embodiment of FIG. 13 are shown.

In FIG. 22, with the present embodiment, a self hold circuit 140 is provided as a self hold device at a subsequent stage to the AND circuit 123 of the monitoring circuit 120 of FIG. 13, and electromagnetic relays Ry2 and Ry3 are provided instead of the electromagnetic relay Ry1. These relays Ry2, Ry3 have normally opened contact points $r_{a2}$, $r_{a3}$, and normally closed back contact points $r_{b2}$, $r_{b3}$ which have a mutually complementary relation with the contact points $r_{a2}$, $r_{a3}$. Furthermore, the construction is such that the output Sc from the AND circuit 123 is applied to the hold input terminal of the self hold circuit 140, and a trigger signal Tg which with the present embodiment is provided by the operation of an external push button or the like, is applied to the trigger input terminal via the series connected back contact points $r_{b2}$, $r_{b3}$, and the relays Ry2, Ry3 are driven by the output from the self hold circuit 140.

Hereunder is a description of the operation.

If at the time of start-up, the contact points $r_{a2}$, $r_{a3}$ constituting the switching device are normally in the OFF condition, then the back contact points $r_{b2}$, $r_{b3}$ are in the ON condition. Consequently, when the trigger signal Tg=1 is applied from outside, then if Sc=1 verifying the normality of the voltage level and the frequency verification is input to the hold input terminal, an output is generated from the self hold circuit 140 so that the relays Ry2, Ry3 are excited, the contact points $r_{a2}$, $r_{a3}$ come on, and the AC output Vo is supplied to the load 5. As a result, the back contact points $r_{b2}$, $r_{b3}$ go off. However while Sc=1, the trigger input to the self hold circuit 140 is self held so that the output Vo continues to be generated. If due to an output abnormality Sc=0 results, the output from the self hold circuit 140 is stopped and hence the contact points $r_{a2}$, $r_{a3}$ go off so that the output Vo is stopped. When a fault has been detected once, then unless the trigger signal Tg=1 is again applied from outside, the output Vo will not be generated.

With such a construction, if for example there is an ON fault in either of the contact points $r_{a2}$ or $r_{a3}$, then either of the contact points $r_{b2}$ or $r_{b3}$ will be off. Hence the self hold circuit 140 is not triggered, so that the contact point which is normal will not come on and hence the output Vo is not supplied to the load 5.

Incidentally, with the embodiment of FIG. 22, since an ON fault of the contact points $r_{a2}$, $r_{a3}$ occurring after supply of the output Vo cannot be detected until the next start-up time, then when the contact point $r_{a2}$ or $r_{a3}$, has an ON fault after supply of the output Vo, the supply of the output Vo continues as is.

Figure 23:
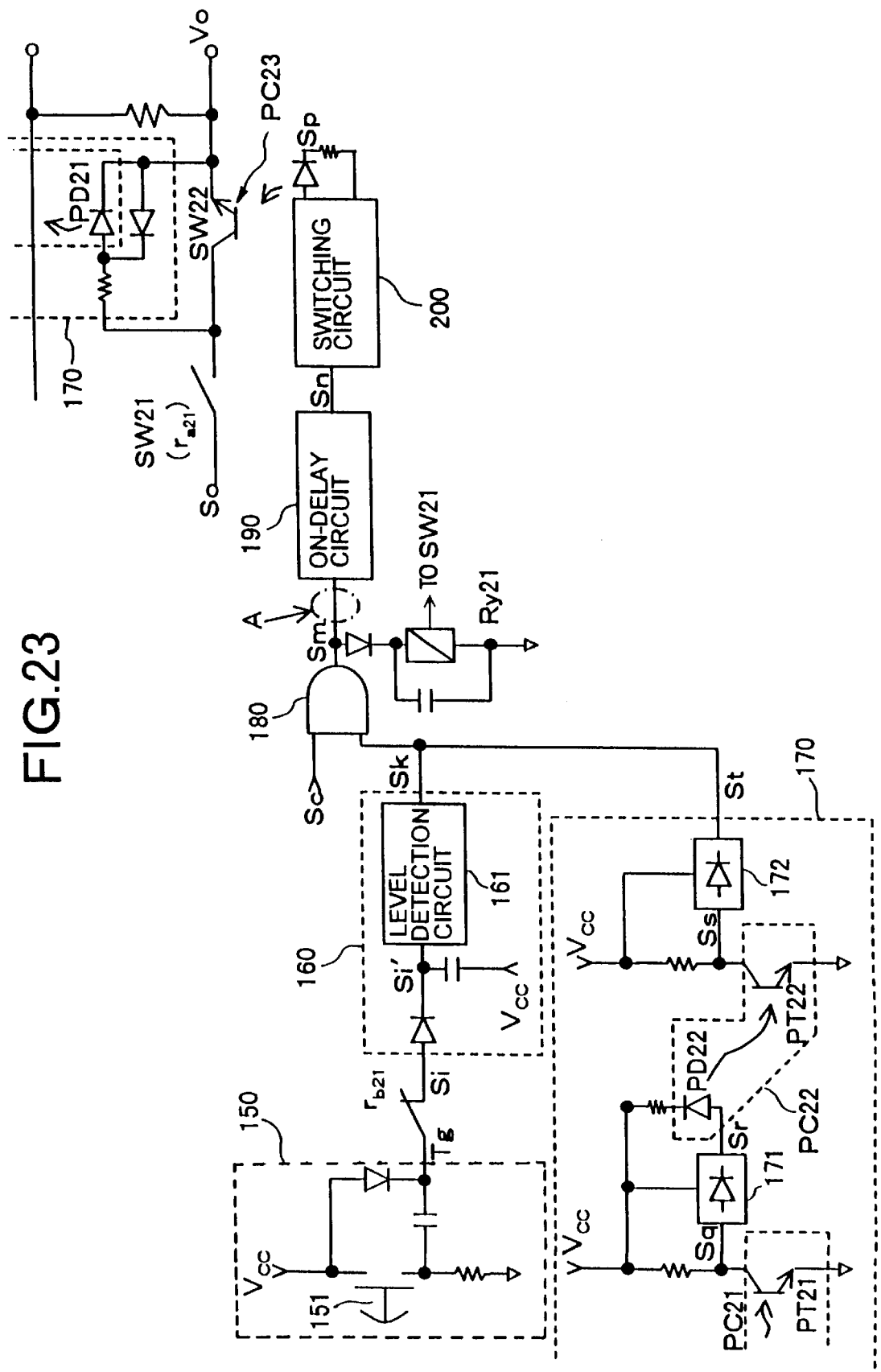
FIG. 23 is an essential parts schematic diagram of another embodiment of a power supply unit according to the present invention applied to an AC power supply unit.

FIG. 23 shows a structural example of an embodiment which takes into consideration such a problem. In FIG. 23 only the parts different from those of the embodiment of FIG. 13 are shown. Components the same as for the embodiment of FIG. 13 are denoted by the same reference symbols.

In FIG. 23, the AC power supply unit of this embodiment comprises: a trigger circuit 150 incorporating a push button 151, a resistor, a capacitor and a diode, for generating a trigger signal Tg of a higher level than the voltage Vcc with the ON operation of the push button 151; an off-delay circuit 160 incorporating a level detection circuit 161 having a lower limit threshold value Vth4, for immediately generating Sk=1 on input of the trigger signal Tg=1, and making Sk=1 continue even after Tg=0 until the lapse of an off-delay time Tof12; a switch performance verification circuit 170 serving as a switch performance verification device for verifying the ON/OFF condition of a switch SW22 connected in series with a switch SW21 in the supply path for the output Vo and generating an output St=1 if the switch SW22 switches ON/OFF normally, an AND circuit 180 for performing a logical product operation on the output Sc from the AND circuit 123 of the monitoring circuit 120 and the output Sk from the off-delay circuit 160 or the output St from the switch performance verification circuit 170; an on-delay circuit 190 for generating an output Sn=1 with the lapse of an on-delay time Ton13 from input of an output Sm=1 from Ir the AND circuit 180; and a switching circuit 200 serving as a switch drive device which is driven by an output Sn=1 from the on-delay circuit 190, for periodically generating an output Sp=1/0 to thereby switch the switch SW22 ON/OFF. Here with the present embodiment, the output from the AND circuit 180 is regarded as the monitoring output.

With this embodiment, the example is illustrated for where a contact point $r_{a21}$ of the relay Ry21 having mutually complementary contact points $r_{a21}$, $r_{b21}$ is used for the switch SW21, and the phototransistor of a photocoupler PC23 is used in the switch SW22. With the switch SW21, the relay Ry21 is excited and comes on with the output Sm=1 from the AND circuit 180. The back contact point $r_{b21}$ is disposed between the trigger circuit 150 and the off-delay circuit 160. The switch SW22 is switched ON/OFF by the optical signal accompanying the flashing operation of a photodiode, corresponding to the generation period of output Sp=1 from the switching circuit 200.

The switch performance verification circuit 170 incorporates; a photocoupler PC21 comprising a photodiode PD21 and a phototransistor PT21 connected in parallel with the switch SW22, a photocoupler PC22 comprising a photodiode PD22 and a phototransistor PT22, and rectifying circuits 171, 172, and the output St is generated from the latter stage rectifying circuit 172.

Figure 24:
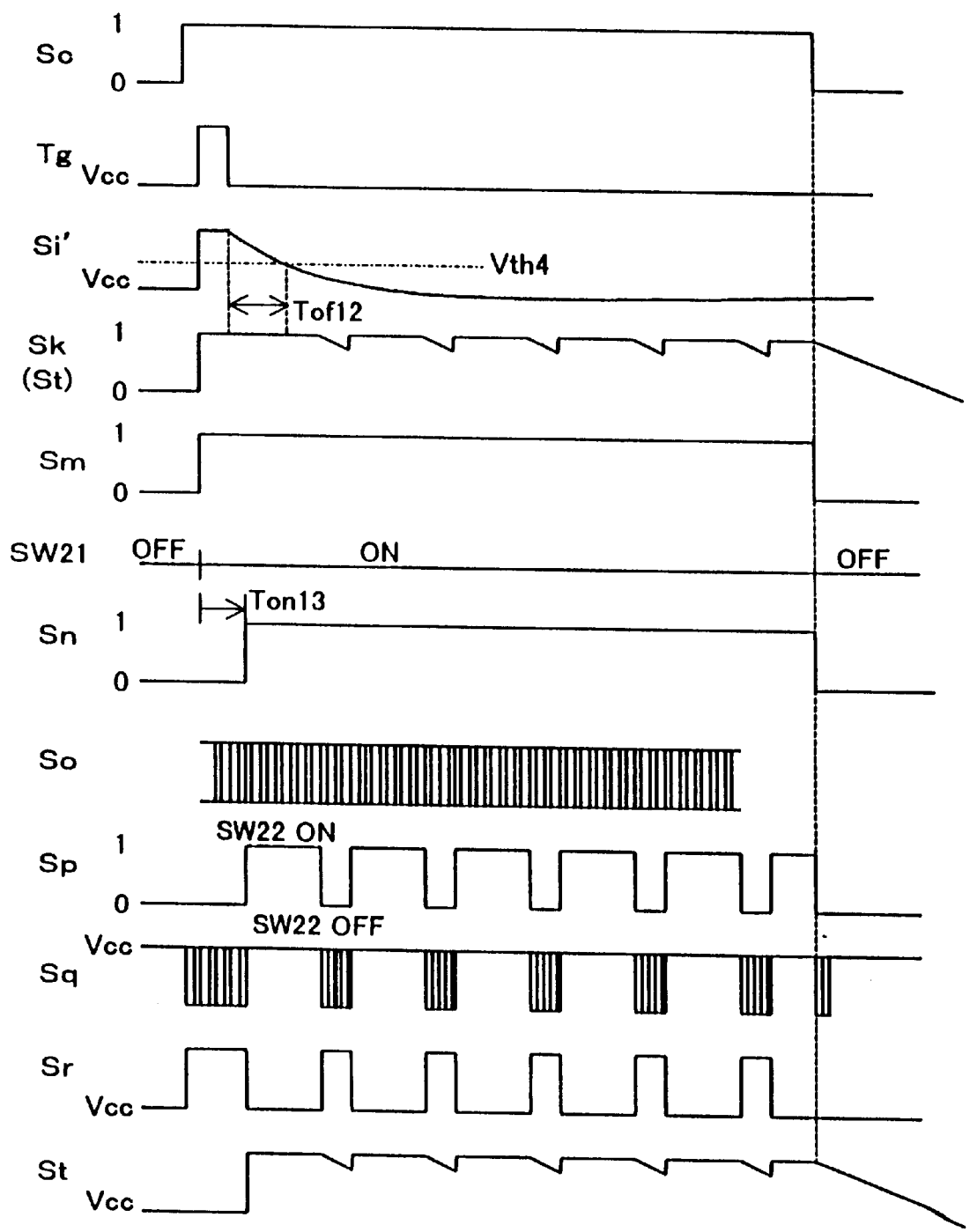
FIG. 24 is an operational time chart for the embodiment of FIG. 23.

The operation of this embodiment will now be described based on the operational time chart of FIG. 24.

The condition is for with the output Sc=1 from the AND circuit 123 of the monitoring circuit 120 being input (the condition with the power supply level and the frequency normal). In this condition, if the push button 151 of the trigger circuit 150 is pushed ON, the trigger signal Tg=1 is produced for a predetermined time. In the ION condition of the back contact point $r_{b21}$ which indicates that the switch SW21 (contact point $r_{a21}$) is normally OFF, Tg=1 is transmitted as output Si=Si'=1, and Sk=1 is generated from the off-delay circuit 160. Since already Sc=1, then with the generation of Sk=1, Sm=1 is generated from the AND circuit 180 as the monitoring output, so that the relay Ry21 is excited and the switch SW21 (contact point $r_{a21}$) comes on. As a result, the back contact point $r_{b21}$ goes off to give Si=0. However the off-delay circuit 160 holds Sk=1 until the level of the input Si' becomes less than the lower limit threshold value Vth4 of the level detection circuit 161, that is until the off-delay time Tof12 has elapsed.

The output Sm=1 from the AND circuit 180 is input to the on-delay circuit 190, and the on-delay circuit 190 generates an output Sn=1 after lapse of the ondelay time Ton13. When Sn=1 results, the switching circuit 200 operates so that the output Sp=1, 0 is generated at a predetermined period, and the switch SW22 is switched ON/OFF at the flashing period of the photodiode of the photocoupler PC23.

In the condition with Sm=1 being output from the AND circuit 180 so that switch SW21 is on, if the switch SW22 is off, then the secondary side AC output So from the transformer T22 of the output circuit 110 passes through the switch SW21 and is current limited by the resistor, and flows in the photodiode PD21 of the photocoupler PC21 of the switch performance verification circuit 170 so that the photodiode PD21 flashes at the frequency of the output So. This optical signal is received so that the phototransistor PT21 switches ON/OFF and an AC output Sq is generated from the photocoupler PC21. The output Sq is rectified by the rectifying circuit 171 and an output Sr generated. This output Sr becomes a higher level than the power supply voltage Vcc.

On the other hand, when the switch SW22 is in the ON condition, since a current does not flow in the photodiode PD21, the phototransistor PT21 goes off so that the output Sq is fixed at Vcc, and the output Sr from the rectifying circuit 171 is fixed at approximately Vcc level.

Consequently, the output Sr from the rectifying circuit 171 becomes a high level when the switch SW22 is off, and becomes a low level when the switch SW22 is on. Then, the photodiode PD22 of the photocoupler PC22 flashes at the frequency at which the output Sr changes between the high and low level, so that the phototransistor PT22 switches ON/OFF in synchronous, and an AC output Ss is generated in synchronous with the output Sr from the photocoupler PC22. The output Ss is rectified by the rectifying circuit 172 and the output St=1 indicating that the switch SW22 can switch ON/OFF normally is generated and input to the AND circuit 180.

The off-delay time Tof12 of the off-delay circuit 160 is set to be longer than the interval from after the switch SW21 comes on and the input Si'=0 results until the output St=1 from the switch performance verification circuit 170 is generated. Consequently, if the switch SW22 is switching ON/OFF normally, then before the output Sk=0 results from the off-delay circuit 160, the output St=1 is generated from the switch performance verification circuit 170 and while the output Sc=1 from the monitoring circuit 120 is being generated, the output Sm=1 from the AND circuit 180 continues to be generated, so that the switch SW21 is held in the ON condition and the switch SW22 is operated ON/OFF.

With the present embodiment, if for example an ON fault occurs in the switch SW21 (contact point $r_{a21}$), since the back contact point $r_{b21}$ will be off, then even if the push button 151 is pushed ON so that the trigger signal Tg=1 is generated, since Si=1 is not generated, then Sk=1 is not generated from the off-delay circuit 160 so that the switch SW22 does not come ON. Moreover, if an ON fault occurs in the switch SW22, the output Ss from the photocoupler PC22 does not become an AC signal so that the output St=1 from the switch performance verification circuit 170 is not generated. Therefore Sk=0 results after lapse of the off-delay time Tof12 and the switch SW21 goes OFF.

With such a construction, since the output Vo is supplied while verifying that the switch SW22 can switch ON/OFF, then in the case where an ON fault occurs in the switch SW22 after supply of the output Vo, this can be quickly discovered.

Incidentally, when the switch SW21 comes on with the output Sm=1 from the AND circuit 180, if the switch SW22 is off, the AC output Sq is generated from the photocoupler PC21, then the output Sr=1 is generated from the rectifying circuit 171. Due to this, if as shown by the arrow A in FIG. 23, the construction is such that a separate AND circuit is provided between the AND circuit 180 and the on-delay circuit 190, and the output from this AND circuit, being the logical product result of the output Sr and the output Sm, is input to the on-delay circuit 190, then after the switch SW21 is switched on, the switch SW22 can be driven after verifying that the switch SW22 has been off.

When the frequency of the output So is higher than the response frequency of the photocoupler PC21 of the switch performance verification circuit 170, then the phototransistor PT21 of the photocoupler PC21 is fixed in the ON condition. In this case, a separate switch device may be disposed in series in the electrical path of the photodiode PD21, and this switch device driven ON/OFF at frequency equal to or lower than the response frequency of the photocoupler PC21.

Furthermore, after lapse of the on-delay time Ton13, Sn=1 results so that the switch SW22 is driven ON/OFF. However when the switch SW22 is on, Sr=0 results giving Sn=0 so that the switch SW22 goes off. In order to avoid this, the construction may be such that for example an off-delay circuit is inserted before the switching circuit 200 and the output Sn from the on-delay circuit 190 is input thereto and the switching circuit 200 is driven by the output from the off-delay circuit.

Furthermore, the construction may be such that the switching circuit 200 is omitted, and the switch SW22 is driven directly by the output Sn from the on-delay circuit 190.

In this case, if the SW22 goes off, then since the output Sq becomes an AC signal, this gives Sr=1 so that after lapse of the on-delay time Ton13, Sn=1 results and the switch SW22 comes on. If the switch SW22 is on, the output Sq becomes a DC signal, giving Sr=0, Sn=0 so that the switch SW22 goes off. The ON/OFF frequency of the switch SW22 at this time is approximately determined by the ondelay time Ton13 of the on-delay circuit 190, and after the on-delay time Ton13, the switch SW22 momentarily comes on. If it is considered to replace the on-delay circuit 190 with an off-delay circuit, then if the switch SW22 is off, the output Sq becomes an AC signal giving Sr=1, Sn=1 so that the switch SW22 comes on. If the switch SW22 is on, the output Sq becomes a DC signal giving Sr=0, however since Sn=1 continues until lapse of the off-delay time, then in the meanwhile the switch SW22 continues on. When the off-delay time has elapsed, Sn=0 results so that the switch SW22 goes off. The ON/OFF frequency of the switch SW22 at this time is approximately determined by the off-delay time, and after the off-delay time, the switch SW22 momentarily goes off.

Consequently, if the off-delay circuit is connected in series to the on-delay circuit 190 and the switch SW22 is driven by the output therefrom, then the ON/OFF periods can be respectively determined by the on-delay time and the off-delay time.

Figure 25:
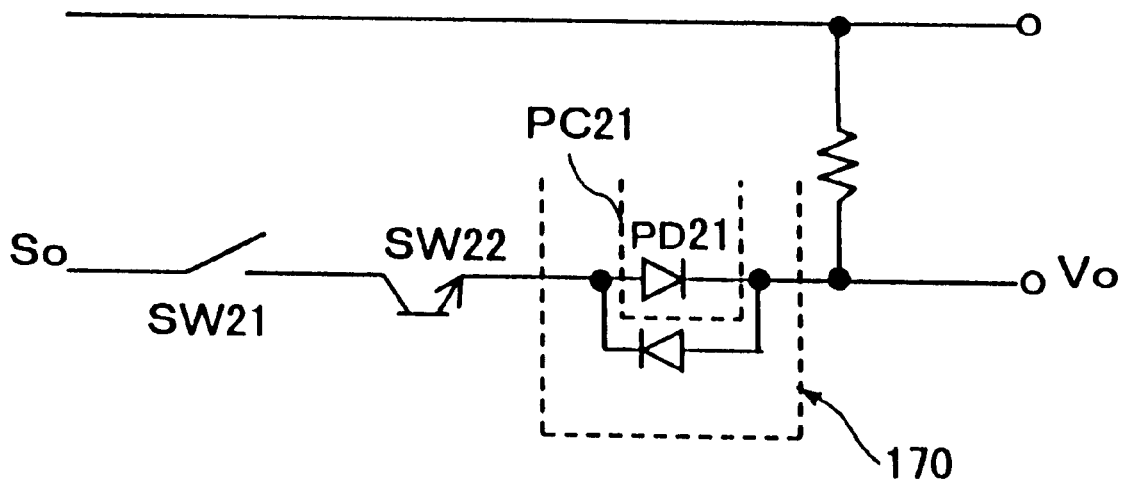
FIG. 25 is a diagram showing a modified form of the embodiment of FIG. 23.

With the photodiode PD21 which detects the ON/OFF condition of the switch SW22, the construction may be such as shown in FIG. 25 with this disposed in series with the switch SW22.

Figure 26:
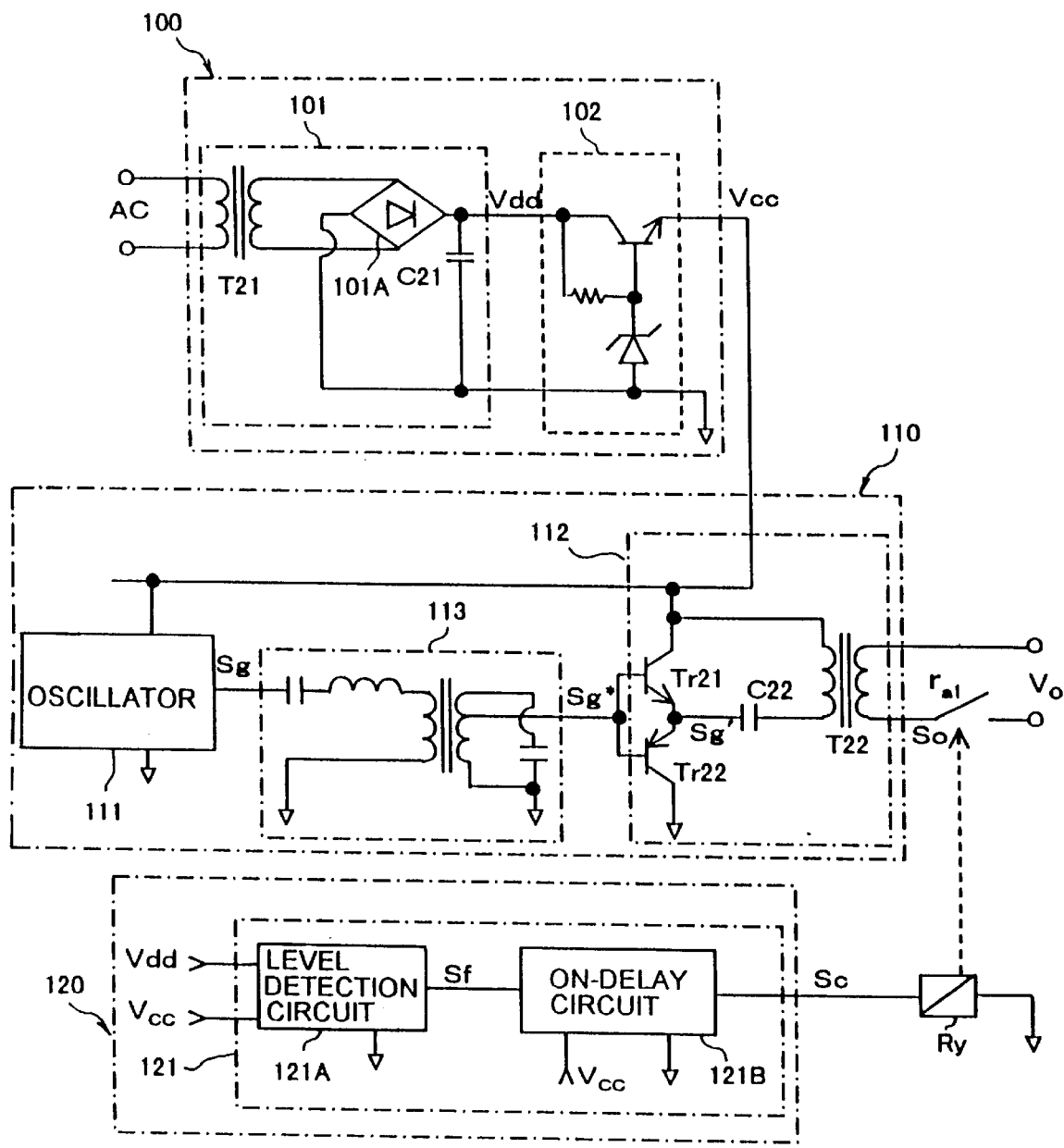
FIG. 26 is a diagram showing another embodiment of the power supply unit according to the present invention applied to an AC power supply.

Next FIG. 26 shows a structural example for another embodiment.

With this embodiment, the construction is such that the oscillation signal from the oscillator 111 based on the frequency verification result is transmitted to the switch circuit 112 to drive the switch circuit 112. Components the same as for the embodiment of FIG. 13 are denoted by the same reference symbols.

In FIG. 26, a frequency detection circuit 113 is inserted in the signal supply path connecting the oscillator 111 and the switch circuit 112 of the output circuit 110. An output Sg* from the frequency detection circuit 113 becomes an AC signal of a predetermined level when the output Sg from the oscillator 111 is within a predetermined frequency range, and becomes an AC signal or a DC signal of a lower level than the predetermined level when outside of the predetermined frequency range. The output Sg* has the same frequency as the output Sg.

With such a construction, when the output Sg from the oscillator 111 is within a predetermined frequency range and the output Sg* is a predetermined level, the switch circuit 112 is driven so that a signal Sg' of the same frequency is generated enabling the output Vo to be supplied. On the other hand, as the frequency of the output Sg deviates from the predetermined frequency, the level of the output Sg* drops so that the output Vo is stopped.

With such a construction, the provision of the frequency verification circuit 122 in the monitoring circuit 120 is no longer necessary, so that the construction of the monitoring circuit 120 can be simplified.

With the respective embodiments of the above AC power supply units, by using known fail-safe components as discussed for the embodiments of the previously described DC power supply units, in the level detection circuit, the AND circuit, the on-delay circuit and the rectifying circuit, then a high safety AC power supply unit which can detect in a fail-safe manner an error in the level or frequency of the output Vo can be constructed.

We claim:

1. A power supply unit which switches a DC signal to produce an AC signal, and supplies a power supply output based on the produced AC signal, comprising:

a monitoring circuit for monitoring a previously set upper and lower limit threshold values to provide a threshold value range for said power supply output, and generating a normal verification signal indicating a normal condition when said power supply output is within said threshold value range;

a first switching element for passing or interrupting said DC signal for input to a primary side of a transformner;

a switching control circuit for generating a control signal for ON/OFF switching of said first switching element, which generates the power supply output based on the AC power supply output generated in a secondary side of said transformer with ON/OFF operation of said first switching element, and at the same time inputs said power supply output to said switching control circuit and compares the power supply output with a target level set within said threshold value range, and controls said control signal so that a level of the power supply output approaches said target level, to stabilize the power supply output; and a start circuit for generating a start signal for starting power supply output, wherein said power supply output is supplied to outside of said power supply unit when the normal verification signal is generated from said monitoring circuit, and when at least one of said start signal and said normal verification signal is being generated, the control signal of said switching control circuit is supplied to the first switching element.

2. The power supply unit according to claim 1, wherein after an abnormality is detected and said normal verification signal is temporarily stopped, said normal verification signal is not generated from said monitoring circuit even if said abnormality is cancelled.

3. The power supply unit according to claim 1, wherein said start circuit generates the start signal for a predetermined time.

4. The power supply unit according to claim 1, wherein said start circuit generates the start signal for a predetermined time on input of a generation command signal after power supply output start-up.

5. The power supply unit according to claim 1, wherein when the normal verification signal is generated from said monitoring circuit, said start signal is not generated.

6. The power supply unit according to claim 1, wherein there is provided a limited output generating circuit for generating at the time of power supply start-up, an output which is limited to a level within said threshold value range, and the generated limited output is input to said monitoring circuit, and said normal verification signal is generated from said monitoring circuit.

7. The power supply unit according to claim 1, wherein switch means is provided in an output supply path for supplying said power supply output, and said switch means is switched on by the normal verification signal from said monitoring circuit, resulting in said output supply path.

8. The power supply unit according to claim 7, wherein said switch means is constructed with a first switch and second switch connected in series, and the first switch is switched on after the second switch is switched on and is switched off prior to the second switch.

9. The power supply unit according to claim 8, wherein said monitoring circuit is able to generate the normal verification signal under the condition that said first switch is off and said second switch is off.

10. The power supply unit according to claim 1, wherein there is provided logical sum means for generating a logical sum output for said normal verification signal and said start signal, and an output from said logical sum means is made a drive power supply for said switching control circuit.

11. The power supply unit according to claim 1, wherein signal transmission means is disposed in a control signal supply path for supplying said control signal of said switching control circuit to said first switching element, for closing said control signal supply path when at least one signal of said start signal and said normal verification signal is generated, and transmitting the control signal to said first switching element.

12. The power supply unit according to claim 1, wherein there is provided a limited output generated circuit for generating, when the start signal is generated from said start circuit, an output which is limited to a level within said threshold value range, and the generated limited output is input to said monitoring circuit, and said normal verification signal is generated from said monitoring circuit.

13. The power supply unit according to claim 12, wherein said limited output is input to said monitoring circuit via said transformer.

14. The power supply unit according to claim 13, wherein a series circuit including a second switching element and an output limiting impedance element is connected in parallel with said first switching element which is connected in series to the primary winding of said transformer and there is provided first and second signal supply paths for respectively supplying the control signal of said switching control circuit to the first and second switching elements, and when the start signal is generated the second signal supply path provides said control signal to the second switching element and a limited output is produced in the secondary side of said transformer, and when based on the limited output, the normal verification signal is generated from said monitoring circuit, the first signal supply path provides said control signal to the first switching element.

15. The power supply unit according to claim 1, wherein a switch means is disposed in an output supply path for supplying said power supply output, and when the normal verification signal is generated from said monitoring circuit, said switch means switches to the output supply path.

16. The power supply unit according to claim 15, wherein said switch means is constructed with a plurality of switches connected in series.

17. The power supply unit according to claim 16, wherein of said plurality of switches, one switch comes on before the other switch and goes off after the other switch.

18. The power supply unit according to claim 17, wherein said monitoring circuit incorporates a level verification means for verifying that a voltage level of the power supply output is within said threshold value range, a ripple verification means for verifying that a ripple level of the power supply output is equal to or less than a predetermined level, a logical product means into which the outputs from the two verification means are connected, off-delay means for generating an output after a predetermined off-delay time lapse from an input of the output from said logical product means, and an on-delay means which takes the output from said off-delay means and generates an output and stops the output after a predetermined on-delay time lapse from said output generation, and said one switch is driven based on the output from said off-delay means, and the output from said on-delay means is said normal verification signal.

19. The power supply unit according to claim 15, wherein there is provided a switch off verification circuit for detecting an OFF condition of said switch means and outputting an OFF verification signal, and said monitoring circuit is able to generate the normal verification signal on the condition that said OFF verification signal is being generated.

20. The power supply unit according to claim 19, wherein said monitoring circuit incorporates a level verification means for verifying that a voltage level of the power supply output is within said threshold value range, a ripple verification means for verifying that a ripple level of the power supply output is less than a predetermined level, a logical product means into which the outputs from the two verification means are connected, an off-delay means for generating an output after a predetermined off-delay time lapse from an input of the output from said logical product means, a self hold means with an output from said off-delay means connected to a hold input terminal, and the off verification signal of said switch off verification circuit input connected to a trigger input terminal, which self holds a trigger output by its own output, and an on-delay means which takes the output from said off-delay means and generates an output and stops the output after a predetermined on-delay time lapse from said output generation, and said switch means is driven based on the output from said self hold means, and the output from said on-delay means is said normal verification signal.

21. The power supply unit according to claim 20, wherein a contact point is disposed in an off verification signal supply path for connecting to the trigger input terminal of said self hold means.

22. The power supply unit according to claim 1, wherein said monitoring circuit incorporates a level verification means for verifying that a voltage level of the power supply output is within said threshold value range, a ripple verification means for verifying that a ripple level of the power supply output is equal to or less than a predetermined level, a logical product means into which the outputs from the two verification means are connected and an off-delay means for generating an output after a predetermined off-delay time lapse from an input of the output from said logical product means, and the output from said off-delay means is said normal verification signal.

23. The power supply unit according to claim 1, wherein said start circuit generates the start signal for a predetermined time from the time of power supply start-up.

24. The power supply unit according to claim 1, wherein when said normal verification signal is generated, the supply of said start signal is stopped.

25. The power supply unit according to claim 1, wherein with an AC power supply unit incorporating an oscillator for generating an oscillating signal with input of said DC signal, and an output circuit having a switch circuit which is switchingly operated with the oscillation signal from said oscillator to generate an AC power supply output, supply of the AC power supply output to outside of said power supply unit is made possible when the normal verification signal is being generated from said monitoring circuit.

26. The power supply unit according to claim 25, wherein the construction is such that when said normal verification signal is being generated, an oscillating signal from said oscillator is transmitted to said switch circuit.

27. The power supply unit according to claim 25, wherein the switching operation of said switching circuit is made possible when said normal verification signal is being generated.

28. The power supply unit according to claim 25, wherein a switch means is disposed in an output supply path for supplying said power supply output, and said switch means is driven by the generation of the normal verification signal from said monitoring circuit to connect to the output supply path and supply the power supply output.

29. The power supply unit according to claim 28, wherein said switch means has two switches connected in series.

30. The power supply unit according to claim 29, wherein of said two switches one switch comes on before the other and goes off after the other.

31. The power supply unit according to claim 28, wherein there is provided a switch off verification circuit for detecting an OFF condition of said switch means and outputting an off verification signal, and said monitoring circuit is able to generate the normal verification signal on the condition that said off verification signal is being generated.

32. The power supply unit according to claim 25, wherein said monitoring circuit incorporates a level verification means for verifying that a voltage level of the power supply output is within said threshold value range, a frequency verification means for verifying that the power supply output frequency is within a predetermined frequency range based on a pulse width of the power supply output, and a logical product means into which the outputs of the two verification means are connected, and the output from said logical product means is said normal verification signal.

33. The power supply unit according to claim 32, wherein the construction is such that said frequency verification means detects the pulse width of the power supply output to verify the power supply output frequency.

34. The power supply unit according to claim 32, wherein said frequency verification means filters the power supply output with a band-pass filter and detects if the output level of the band-pass filter is equal to or above predetermined value to verify the power supply output frequency.

35. The power supply unit according to claim 25, wherein the AC power supply output is supplied from said output circuit when at least one of said start signal and the normal verification signal of said monitoring circuit is being generated.

36. The power supply unit according to claim 25, wherein there is provided a limited output generating circuit for generating a limited output of a level within said upper and lower limited threshold value range, and when the start signal is generated, the limited output of said limited output generating circuit is supplied from said output circuit.

37. A power supply unit which switches a DC signal to produce an AC signal, and supplies a power supply output based on the produced AC signal, comprising;
   a monitoring circuit for monitoring a previously set upper and lower limit threshold values to provide a threshold value range for said power supply output, and generating a normal verification signal indicating a normal condition when the produced AC signal is within said threshold value range;
   a first switching element for passing or interrupting said DC signal for input to a primary side of a transformer; and
   a switching control circuit for generating a control signal for ON/OFF switching of said first switching element, which generates the power supply output based on the AC power supply output generated in a secondary side of said transformer with ON/OFF operation of said first switching element and supplies the power supply output to outside of said power supply unit, and at the same time inputs said power supply output to said switching control circuit and compares this with a target level set within said threshold value range, and controls said control signal so that a level of the power supply output approaches said target level, to stabilize the power supply output, wherein
   said power supply output is supplied to outside of said power supply unit when the normal verification signal is generated from said monitoring circuit, and
   a switch means is provided in an output supply path for supplying said power supply output, and said switch means is driven by the normal verification signal of said monitoring circuit to thereby conduct the output supply path.

38. The power supply unit according to claim 37, wherein said switch means is constructed with a first switch and second switch connected in series, and the construction is such that said first switch is switched on after the second switch is switched on and switched off prior to the second switch.

39. The power supply unit according to claim 38, wherein said monitoring circuit is able to generate the normal verification signal under the condition that said first switch is off and said second switch is off.

40. The power supply unit is according to claim 39, wherein said monitoring circuit incorporates a level verification means for verifying that a voltage level of the power supply output is within said threshold value range, a ripple verification means for verifying that a ripple level of the power supply output is equal to or less than a predetermined level, a logical product means into which the outputs from the two verification means are connected, a first off-delay means for generating an output after a predetermined off-delay time lapse from an input of the output from said logical product means, a self hold means with an output from said first off-delay means connected to a hold input terminal, and an off verification signal off verification circuit for verifying the OFF condition of said first switch input to a trigger input terminal as a result of an off verification of said second switch, which self holds the trigger input by its own output, a second off-delay means for generating an output after a predetermined off-delay time lapse from input of the output from said self hold means, and an on-delay means which takes the output from said self hold means and generates an output and stops the output after a predetermined on-delay time lapse from said output generation, wherein
   said monitoring circuit drives said second switch based on the output from said second off-delay means and drives said first switch based on the output from said on-delay means.

41. A power supply unit which switches a DC signal to produce an AC signal, and supplies a power supply output based on the produced AC signal, comprising:
   a monitoring circuit for monitoring a previously set upper and lower limit threshold values to provide a threshold value range for said power supply output, and generating a normal verification signal indicating a normal condition when said produced AC signal is within said threshold value range, wherein
   said power supply output is supplied to outside of said power supply unit when the normal verification signal is generated from said monitoring circuit,
   with an AC power supply unit incorporating an oscillator for generating an oscillating signal with input of said DC signal, and an output circuit having a switch circuit which is switchingly operated with the oscillation signal from said oscillator to generate an AC power supply output, supply of the AC power supply output to outside of said power supply unit is made possible when the normal verification signal is being generated from said monitoring circuit,
   the construction is such that when said normal verification signal is being generated, said oscillating signal from said oscillator is transmitted to said switch circuit, and
   a band-pass filter with a previously set predetermined frequency for the oscillator signal as a central frequency, is disposed in a signal supply path for supplying the oscillating signal from said oscillator to the switch circuit.

42. A power supply unit which switches a DC signal to produce an AC signal, and supplies a power supply output based on the produced AC signal, comprising:
   a monitoring circuit for monitoring a previously set upper and lower limit threshold values to provide a threshold value range for said power supply output, and generating a normal verification signal indicating a normal condition when the produced AC signal is within said threshold value range, wherein
   said power supply output is supplied to outside of said power supply unit when the normal verification signal is generated from said monitoring circuit,
   with an AC power supply unit incorporating an oscillator for generating an oscillating signal with input of said DC signal, and an output circuit having a switch circuit which is switchingly operated with the oscillation signal from said oscillator to generate an AC power supply output, supply of the AC power supply output to outside of said power supply unit is made possible when the normal verification signal is being generated from said monitoring circuit, a switch means is disposed in an output supply path for supplying said power supply output, and said switch means is driven by the generation of the normal verification signal from said monitoring circuit to conduct the output supply path and supply the power supply output, there is provided a switch off verification circuit for detecting an OFF condition of said switch means and outputting an off verification signal, and said monitoring circuit is able to generate the normal verification signal on the condition that said off verification signal is being generated, said monitoring circuit incorporates a level verification means for verifying that a voltage level of the power output is within said threshold value range, a frequency verification means for verifying that the power supply output frequency is within a predetermined frequency range based on a pulse width of the power supply output, a logical product means into which the outputs of the two verification means are connected and a self hold means with an output from said logical product means connected to a hold input terminal, and the off verification signal from said switch off verification circuit connected to a trigger input terminal, and said self hold means holds the trigger input by its own input, and said switch means is driven based on the output from said self hold means.

43. The power supply unit according to claim 42, wherein a contact point is disposed in an off verification signal supply path for connecting to the trigger input terminal of said self hold means.

44. A power supply unit which switches a DC signal to produce an AC signal, and supplies a power supply output based on the produced AC signal, comprising:

a monitoring circuit for monitoring a previously set upper and lower limit threshold values to provide a threshold value range for said power supply output, and generating a normal verification signal indicating a normal condition when the produced AC signal is within said threshold value range, wherein said power supply output is supplied to outside of said power supply unit when the normal verification signal is generated from said monitoring circuit, with an AC power supply unit incorporating an oscillator for generating an oscillating signal with input of said DC signal, and an output circuit having a switch circuit which is switchingly operated with the oscillation signal from said oscillator to generate an AC power supply output, supply of the AC power supply output to outside of said power supply unit is made possible when the normal verification signal is being generated from said monitoring circuit, a switch means is disposed in an output supply path for supplying said power supply output, and said switch means is driven by the generation of the normal verification signal from said monitoring circuit to conduct the output supply path and supply the power supply output, said switch means has two switches connected in series, and said monitoring circuit generates the normal verification signal on the condition that one switch is off, and there is provided a switch drive means for intermittently switching the other switch off based on said normal verification signal, and a switch performance verification means for detecting ON/OFF switching of said other switch and generating a hold signal so that the normal verification signal continues and inputting the hold signal to said monitoring circuit, and said one switch is driven ON by the normal verification signal of said monitoring circuit.

* * * * *